United States Patent
(12) United States Patent
Moue et al.

(10) Patent No.: US 12,732,720 B2
(45) Date of Patent: Sep. 8, 2026

(54) IMAGING DEVICE

(71) Applicant: Sony Semiconductor Solutions Corporation, Kanagawa (JP)

(72) Inventors: Takashi Moue, Kanagawa (JP); Takuro Kosaka, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 290 days.

(21) Appl. No.: 18/721,376

(22) PCT Filed: Jan. 31, 2023

(86) PCT No.: PCT/JP2023/003013
§ 371 (c)(1),
(2) Date: Jan. 13, 2025

(87) PCT Pub. No.: WO2023/149417
PCT Pub. Date: Aug. 10, 2023

(65) Prior Publication Data

US 2025/0150734 A1 May 8, 2025

(30) Foreign Application Priority Data

Feb. 7, 2022 (JP) ................................ 2022-017376

(51) Int. Cl.
*H04N 25/78* (2023.01)
*H04N 25/76* (2023.01)
*H04N 25/773* (2023.01)

(52) U.S. Cl.
CPC ........... *H04N 25/78* (2023.01); *H04N 25/773* (2023.01); *H04N 25/7795* (2023.01)

(58) Field of Classification Search
CPC .. H04N 25/78; H04N 25/773; H04N 25/7795; H04N 25/59
See application file for complete search history.

(56) References Cited

U.S. PATENT DOCUMENTS

2014/0209784 A1* 7/2014 Morita .................. H04N 25/78 250/208.1
2019/0371828 A1* 12/2019 Ebihara ............... H04N 25/771
(Continued)

FOREIGN PATENT DOCUMENTS

JP 2014146849 A 8/2014
JP 2015111762 A 6/2015
(Continued)

OTHER PUBLICATIONS

International Search Report (PCT/ISA/210), International Application No. PCT/JP2023/003013, dated Apr. 18, 2023.

*Primary Examiner* — Nhan T Tran
(74) *Attorney, Agent, or Firm* — Michael Best & Friedrich LLP

(57) ABSTRACT

To implement a single-exposure HDR function with a simple circuit configuration without increasing noise. In one example, an imaging device includes a first comparison circuit that outputs a first signal according to a result of comparison between signal levels of a first input signal and a first reference signal corresponding to a first gain, a second comparison circuit that outputs a second signal according to a result of comparison between a second input signal and a second reference signal corresponding to a second gain having an amount of gain different from that of the first gain, and a third comparison circuit that outputs a third signal according to a result of comparison between signal levels of the first signal and the first input signal, and a fourth signal according to a result of comparison between the second signal and the second input signal, at timings different from each other.

20 Claims, 30 Drawing Sheets

34: COMPARATOR

(56) References Cited

U.S. PATENT DOCUMENTS

| | | | | |
|---|---|---|---|---|
| 2021/0250530 | A1* | 8/2021 | Paik | H04N 25/59 |
| 2022/0116564 | A1* | 4/2022 | Paik | H03M 1/123 |

FOREIGN PATENT DOCUMENTS

| | | | | |
|---|---|---|---|---|
| JP | 2020136935 | A | 8/2020 | |
| WO | WO-2021084826 | A1 * | 5/2021 | H04N 25/70 |

* cited by examiner

FIG. 5

34
20
32
VDD
VDD
21
22
23
24
25
VVSL
PT11
SWAZ
C11
50
VRAMP
C12
PT13
NT11
bias1
PT12
NT12
bias2
I11
I12
OUT
T13

34: COMPARATOR

34: COMPARATOR

FIG. 15

34: COMPARATOR

FIG. 17

34: COMPARATOR

REFERENCE SIGNAL GENERATION CIRCUIT
16
RAMP
AZC1
AZC2
50
FIRST COMPARISON CIRCUIT
SECOND COMPARISON CIRCUIT
THIRD COMPARISON CIRCUIT
51
52
53
ONE COLUMN
34

FIG. 19

34: COMPARATOR

FIG. 22

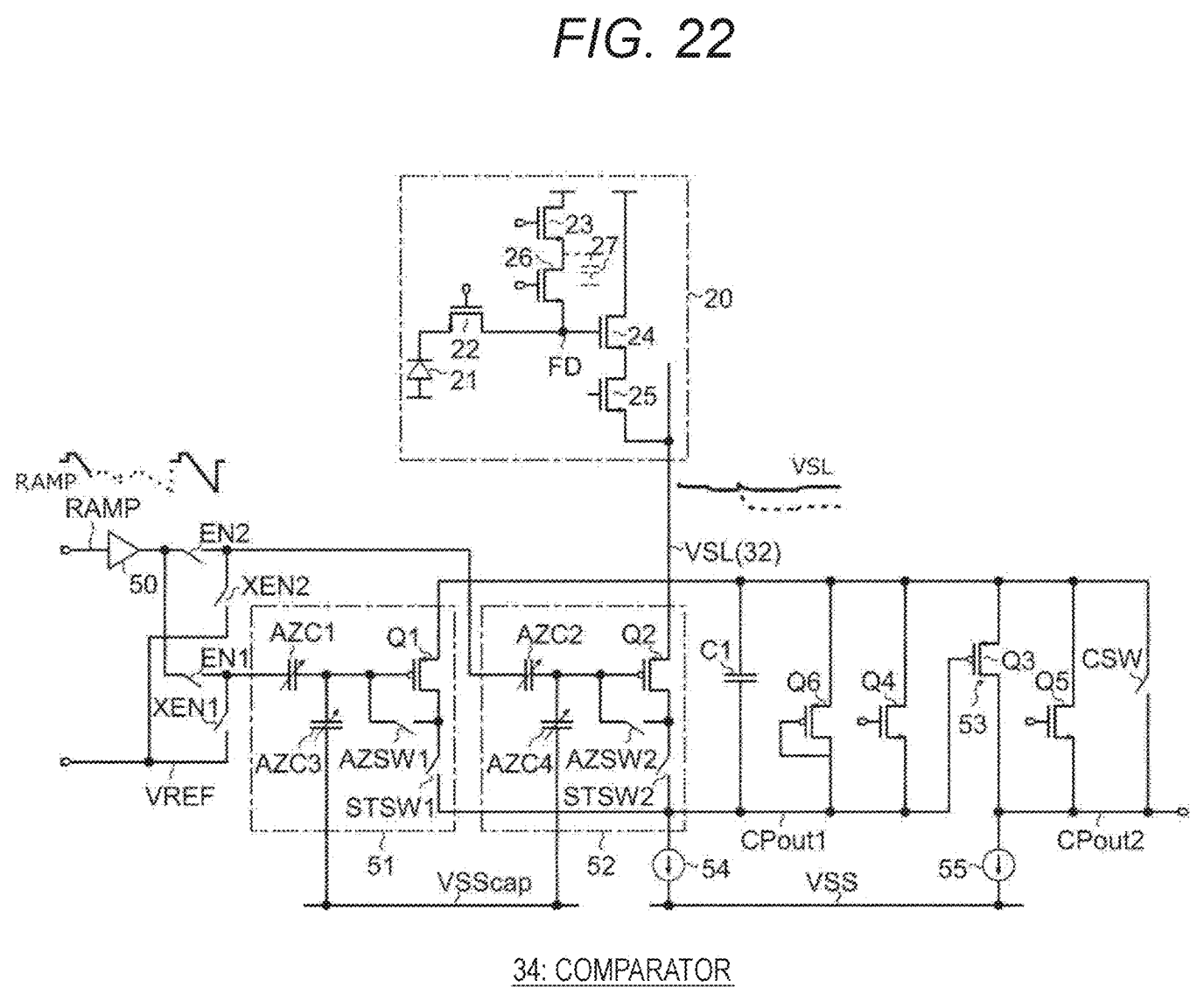

20
23
27
26
FD
24
25
22
21
VSL
VSL(32)
RAMP
RAMP
50
EN2
XEN2
EN1
XEN1
VREF
AZC1
AZC3
AZSW1
STSW1
Q1
51
AZC2
AZC4
AZSW2
STSW2
Q2
52
VSScap
C1
54
Q6
CPout1
Q4
VSS
Q3
53
55
Q5
CSW
CPout2

34: COMPARATOR

Figure 26:
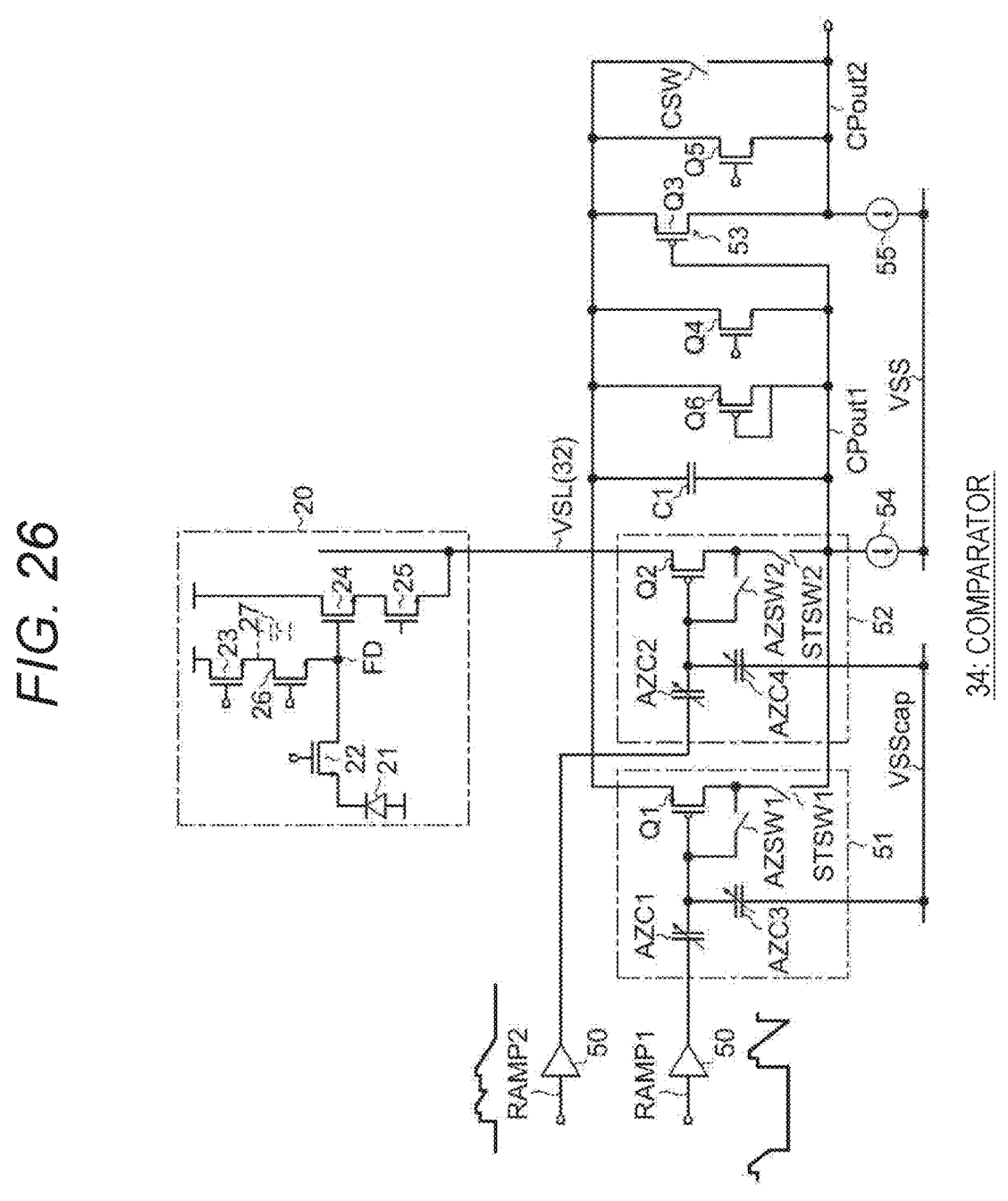

20
VSL(32)
FD
21 22 23 24 25 26 27
AZC1 AZC2 AZC3 AZC4
AZSW1 AZSW2 STSW1 STSW2
Q1 Q2 Q3 Q4 Q5 Q6
C1 CSW
CPout1 CPout2
51 52 53 54 55
VSS VSScap
RAMP1 RAMP2
50 50
34: COMPARATOR

Figure 29:
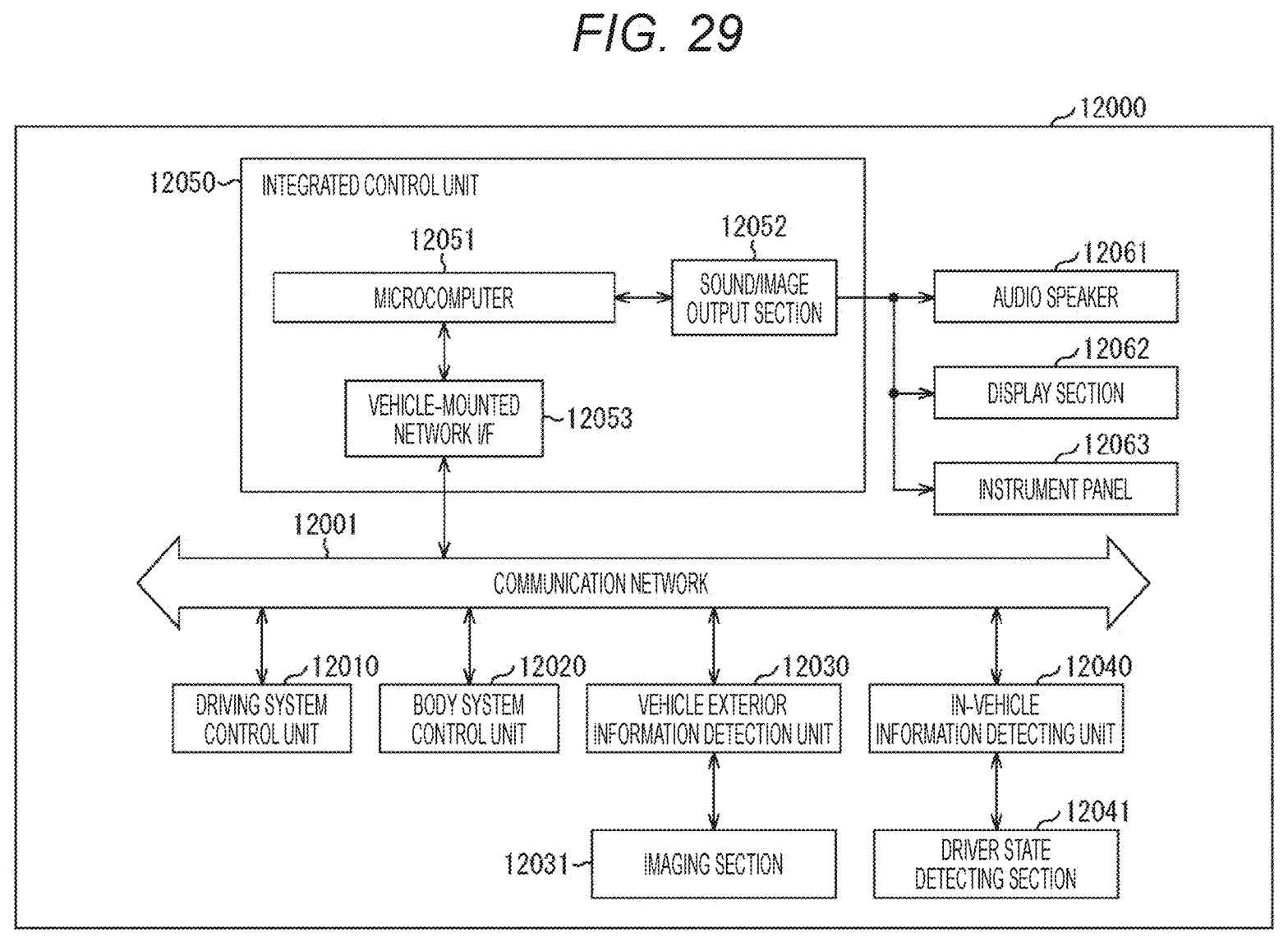

12050 INTEGRATED CONTROL UNIT

12051 MICROCOMPUTER

12052 SOUND/IMAGE OUTPUT SECTION

12053 VEHICLE-MOUNTED NETWORK I/F

12061 AUDIO SPEAKER

12062 DISPLAY SECTION

12063 INSTRUMENT PANEL

12001 COMMUNICATION NETWORK

12010 DRIVING SYSTEM CONTROL UNIT

12020 BODY SYSTEM CONTROL UNIT

12030 VEHICLE EXTERIOR INFORMATION DETECTION UNIT

12031 IMAGING SECTION

12040 IN-VEHICLE INFORMATION DETECTING UNIT

12041 DRIVER STATE DETECTING SECTION

IMAGING DEVICE

TECHNICAL FIELD

The present disclosure relates to an imaging device.

BACKGROUND ART

In an imaging device, AD conversion may be performed using a single-slope analog to digital converter (ADC) having a simple configuration. This type of ADC counts time until a photoelectrically converted pixel signal intersects a sawtooth shaped ramp wave signal with a counter, and generates a digital signal on the basis of a counted value (see Patent Document 1).

CITATION LIST

Patent Document

Patent Document 1: Japanese Patent Application Laid-Open No. 2020-136935

SUMMARY OF THE INVENTION

Problems to be Solved by the Invention

Recent cameras, smartphones, and the like may be equipped with a high-dynamic range (HDR) function in order to increase a dynamic range of a captured image. HDR is a technology for combining images obtained by performing a plurality of times of imaging while changing sensitivity and gain, and while blown out highlights in a captured image can be suppressed, blocked up shadows is also eliminated. In HDR, in order to prevent blurring at the time of combining images, it is desirable not to perform exposure for each image to be combined, but to read a signal acquired in one exposure by changing sensitivity and gain.

In order to implement a single-exposure HDR function using the conventional single-slope ADC, it is necessary to provide a plurality of ADCs for each column or to perform processing of changing sensitivity and gain after resetting once, which leads to complication of a circuit configuration and an increase in noise.

Thus, the present disclosure provides an imaging device capable of implementing a single-exposure HDR function with a simple circuit configuration without increasing noise.

Solutions to Problems

In order to solve the problem described above, according to the present disclosure, there is provided an imaging device including:

a first comparison circuit that outputs a first signal according to a result of comparison between signal levels of a first input signal and a first reference signal corresponding to a first gain;

a second comparison circuit that outputs a second signal according to a result of comparison between a second input signal and a second reference signal corresponding to a second gain having an amount of gain different from that of the first gain; and a third comparison circuit that outputs a third signal according to a result of comparison between signal levels of the first signal and the first input signal, and a fourth signal according to a result of comparison between the second signal and the second input signal, at timings different from each other.

The first reference signal may include a signal period in which the signal level changes with a first slope according to a lapse of time, the second reference signal may include a signal period in which a signal level changes with a second slope different from the first slope according to a lapse of time, the first comparison circuit may cause the signal level of the first signal to transition when the signal levels of the first reference signal and the first input signal coincide with each other, and the second comparison circuit may cause a signal level of the second signal to transition when signal levels of the second reference signal and the second input signal coincide with each other.

The first reference signal may include a first signal period in which the signal level changes with the first slope corresponding to a reset level and a second signal period in which the signal level changes with the first slope corresponding to the signal level, and the second reference signal may include a third signal period in which the signal level changes with the second slope corresponding to a reset level, and a fourth signal period in which the signal level changes with the second slope corresponding to the signal level.

The second gain may have the amount of gain larger than that of the first gain, and the first reference signal may have an amount of signal change per unit time larger than that of the second reference signal.

The first comparison circuit may output the first signal according to a result of comparison between the first input signal and the first reference signal corresponding to the reset level, and the first signal according to a result of comparison between the first input signal and the first reference signal corresponding to the signal level, at respective different timings, and the second comparison circuit may output the second signal according to a result of comparison between the second input signal and the second reference signal corresponding to the reset level, and the second signal according to a result of comparison between the second input signal and the second reference signal corresponding to the signal level, at respective different timings.

A reference signal generation circuit may be included that generates the first reference signal and the second reference signal, in which the first signal output from the first comparison circuit and the second signal output from the second comparison circuit may be input to the third comparison circuit via a common signal line.

The reference signal generation circuit may output the first reference signal for the reset level, the second reference signal for the reset level, the second reference signal for the signal level, and the first reference signal for the signal level in this order.

The reference signal generation circuit may output the second reference signal for the reset level, the first reference signal for the reset level, the first reference signal for the signal level, and the second reference signal for the signal level in this order.

The first comparison circuit may perform processing of comparison with the first input signal and output the first signal during a period in which the reference signal generation circuit outputs the first reference signal, and stop outputting the first signal during a period in which the reference signal generation circuit outputs the second reference signal, and the second comparison circuit may perform processing of comparison with the second input signal and output the second signal during a period in which the reference signal generation circuit outputs the second reference signal, and stop outputting the second signal during a period in which the reference signal generation circuit outputs the first reference signal.

The first comparison circuit may include:

a first transistor including a source to which the first input signal is supplied and a gate to which a voltage according to the first reference signal is supplied;

a first capacitor that is connected to the gate of the first transistor and holds a charge according to an initial voltage of the first reference signal;

a first switch that switches whether or not to short-circuit the gate and a drain of the first transistor; and a second switch that switches whether or not to supply a drain voltage of the first transistor to the third comparison circuit, and the second comparison circuit may include:

a second transistor including a source to which the second input signal is supplied and a gate to which a voltage according to the second reference signal is supplied;

a second capacitor that is connected to the gate of the second transistor and holds a charge according to an initial voltage of the second reference signal;

a third switch that switches whether or not to short-circuit the gate and a drain of the second transistor; and a fourth switch that switches whether or not to supply a drain voltage of the second transistor to the third comparison circuit.

The second switch may supply the drain voltage of the first transistor to the third comparison circuit during a period in which the first reference signal and the first input signal are input to the first comparison circuit, and shut off a connection path between the drain of the first transistor and the third comparison circuit during a period in which the second reference signal and the second input signal are input to the second comparison circuit, and the fourth switch may supply the drain voltage of the second transistor to the third comparison circuit during a period in which the second reference signal and the second input signal are input to the second comparison circuit, and shut off a connection path between the drain of the second transistor and the third comparison circuit during a period in which the first reference signal and the first input signal are input to the first comparison circuit.

The first comparison circuit may include:

a fifth switch that switches whether or not to supply the first reference signal to one end of the first capacitor; and a sixth switch that switches whether or not to supply a standard voltage of a predetermined voltage level to the one end of the first capacitor, the second comparison circuit may include:

a seventh switch that switches whether or not to supply the second reference signal to one end of the second capacitor; and an eighth switch that switches whether or not to supply the standard voltage to the one end of the second capacitor, and during a period in which the first comparison circuit performs processing of comparison between the signal levels of the first reference signal and the first input signal, the fifth switch may supply the first reference signal to the one end of the first capacitor, the sixth switch may not supply the standard voltage to the one end of the first capacitor, the seventh switch may not supply the second reference signal to the one end of the second capacitor, and the eighth switch may supply the standard voltage to the one end of the second capacitor, and during a period in which the second comparison circuit performs processing of comparison between the signal levels of the second reference signal and the second input signal, the fifth switch may not supply the first reference signal to the one end of the first capacitor, the sixth switch may supply the standard voltage to the one end of the first capacitor, the seventh switch may supply the second reference signal to the one end of the second capacitor, and the eighth switch may not supply the standard voltage to the one end of the second capacitor.

The first comparison circuit may include a third capacitor connected between a connection node between the first capacitor and the gate of the first transistor and a standard voltage node, the second comparison circuit may include a fourth capacitor connected between a connection node between the second capacitor and the gate of the second transistor and the standard voltage node, and capacitances of the first capacitor, the second capacitor, the third capacitor, and the fourth capacitor may be able to be variable.

The first comparison circuit may include a first buffer that buffers the first reference signal and supplies the first reference signal to the one end of the first capacitor, and the second comparison circuit may include a second buffer that buffers the second reference signal and supplies the second reference signal to the one end of the second capacitor.

One reference signal line may be included that transmits the first reference signal and the second reference signal at respective different timings, and the reference signal line may be connected to the one end of the first capacitor and the one end of the second capacitor.

A first reference signal line that supplies the first reference signal to the one end of the first capacitor, and a second reference signal line that supplies the second reference signal to the one end of the second capacitor may be included.

A fourth comparison circuit may be further included that outputs a fifth signal according to a result of comparison between a third input signal and a third reference signal corresponding to a third gain having an amount of gain different from those of the first gain and the second gain, in which the third comparison circuit may output the third signal according to the result of comparison between the signal levels of the first signal and the first input signal, the fourth signal according to the result of comparison between the second signal and the second input signal, and a sixth signal according to a result of comparison between the fifth signal and the third input signal, at respective different timings.

A plurality of pixels that is arranged in a first direction and a second direction and each includes a pixel circuit that performs photoelectric conversion, and an analog-digital converter that converts an input signal based on a signal photoelectrically converted by two or more of the pixels arranged in the first direction into a digital signal may be included, in which the analog-digital converter may include the first comparison circuit, the second comparison circuit, and the third comparison circuit for each of the two or more of the pixels arranged in the first direction.

The pixel circuit may include a conversion efficiency switching circuit that switches photoelectric conversion efficiencies in synchronization with processing of comparison by the first comparison circuit and the second comparison circuit, and the conversion efficiency switching circuit may make a photoelectric conversion efficiency during a period in which the second comparison circuit performs processing of comparison higher than a photoelectric conversion efficiency during a period in which the first comparison circuit performs processing of comparison.

A first region in which a first capacitor that holds a charge according to an initial voltage of the first reference signal in the first comparison circuit is disposed, a second region in which a circuit element other than the first capacitor in the first comparison circuit is disposed, a third region in which a second capacitor that holds a charge according to an initial voltage of the second reference signal in the second comparison circuit is disposed, a fourth region in which a circuit element other than the second capacitor in the second comparison circuit is disposed, and a fifth region in which the third comparison circuit is disposed, may be arranged for each pixel in the second direction, the first region and the second region may be arranged adjacent to each other along the first direction, and the third region and the fourth region may be arranged adjacent to each other along the first direction.

BRIEF DESCRIPTION OF DRAWINGS

FIG. 5 is a diagram illustrating an example of a circuit configuration of a comparator according to a reference example.

FIG. 15 is a circuit diagram of a comparator in an imaging device according to a fourth embodiment.

FIG. 17 is a circuit diagram of a comparator in an imaging device according to a fifth embodiment.

FIG. 19 is a circuit diagram of a comparator according to a first modification of FIG. 17.

FIG. 22 is a circuit diagram of a comparator according to a second modification of FIG. 17.

FIG. 23 is a circuit diagram of a comparator in an imaging device according to a sixth embodiment.

FIG. 26 is a circuit diagram of a comparator according to a modification of FIG. 24.

FIG. 29 is a block diagram illustrating an example of a schematic configuration of a vehicle control system.

MODE FOR CARRYING OUT THE INVENTION

Hereinafter, embodiments of an imaging device will be described with reference to the drawings. Although main components of the imaging device will be mainly described below, the imaging device may have components and functions that are not illustrated or described. The following description does not exclude the components and functions that are not illustrated or described.

<Imaging Device to which Technology According to Present Disclosure is Applied>

As an imaging device to which a technology according to the present disclosure is applied, a complementary metal oxide semiconductor (CMOS) image sensor that is a type of X-Y address imaging device will be described as an example. The CMOS image sensor is an image sensor fabricated by applying or partially using a CMOS process.

[Example of Configuration of CMOS Image Sensor]

Figure 1:
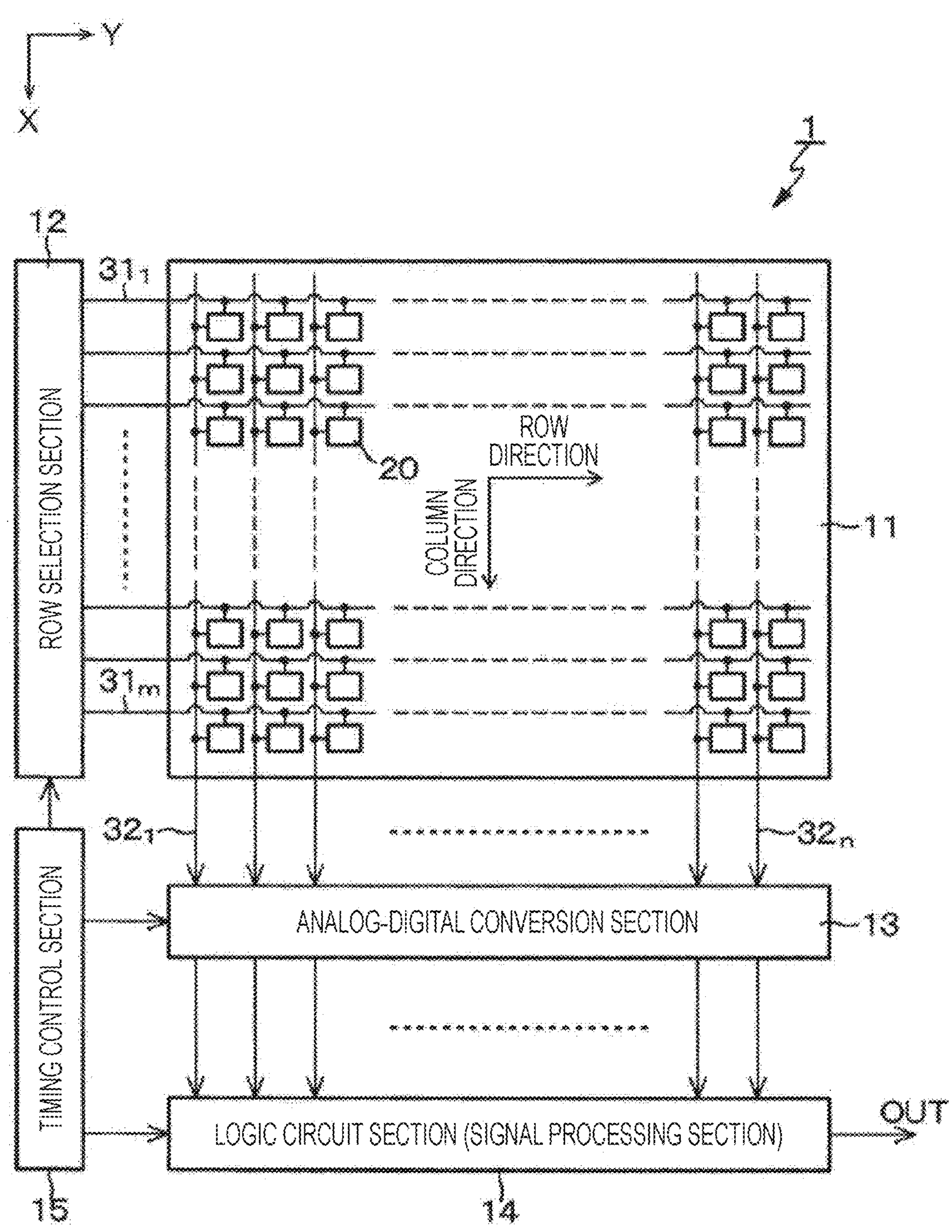
FIG. 1 is a block diagram schematically illustrating an outline of a system configuration of a CMOS image sensor.

FIG. 1 is a block diagram schematically illustrating an outline of a system configuration of a CMOS image sensor that is an example of an imaging device 1 to which the technology according to the present disclosure is applied.

The CMOS image sensor 1 according to the present application example includes a pixel array section 11 and a peripheral circuit section of the pixel array section 11. The pixel array section 11 has a configuration in which pixels (pixel circuits) 20 each including a light receiving element are two-dimensionally arranged in a row direction X and a column direction Y, that is, in a matrix. Here, the row direction X refers to an arrangement direction of each of pixel rows extending in the column direction Y. The pixels 20 each perform photoelectric conversion to generate and accumulate photoelectric charges according to an amount of received light.

The peripheral circuit section of the pixel array section 11 includes, for example, a row selection section 12, an analog-digital conversion section 13, a logic circuit section 14 as a signal processing section, a timing control section 15, and the like.

In the pixel array section 11, a plurality of pixel control lines 31 ($31_1$ to $31_n$) is arranged in the row direction X for the respective pixel rows for a pixel array in a matrix. Furthermore, signal lines 32 ($32_1$ to $32_n$) are arranged in the column direction Y for respective pixel columns. Each pixel control line 31 transmit a drive signal for driving a corresponding pixel row. One end of the pixel control line 31 is connected to a corresponding one of output ends of the row selection section 12, the output ends corresponding to respective rows.

The row selection section 12 includes a shift register, an address decoder, and the like, and controls scanning for the pixel row and addressing of the pixel row when selecting each pixel 20 of the pixel array section 11. Although a specific configuration of the row selection section 12 is not illustrated, this generally includes two scanning systems, which are a read scanning system and a sweep scanning system.

The read scanning system selectively scans in order the pixels 20 in the pixel array section 11 row by row in order to read a pixel signal from each pixel 20. The pixel signal read from the pixel 20 is an analog signal. The sweep scanning system performs sweep scanning on a read row on which read scanning is performed by the read scanning system earlier than the read scanning by a time corresponding to a shutter speed.

By the sweep scanning by the sweep scanning system, unnecessary charges are swept out from photoelectric conversion elements of the pixels 20 in the read row, whereby the photoelectric conversion elements are reset. Then, unnecessary charges are swept out (reset) by the sweep scanning system, whereby so-called electronic shutter operation is performed. Here, the electronic shutter operation is intended to mean an operation of discharging the photoelectric charges of the photoelectric conversion elements and newly starting exposure (starting accumulating photoelectric charges).

The analog-digital conversion section 13 includes a set of a plurality of analog-digital converters (ADCs) provided corresponding to the pixel columns of the pixel array section 11 (for example, for respective pixel columns). The analog-digital conversion section 13 is a column-parallel analog-digital conversion section that converts an analog pixel signal output through each of the signal lines $32_1$ to $32_n$ for respective pixel columns into a digital signal.

As the analog-digital converter in the analog-digital conversion section 13, for example, a single-slope analog-digital converter can be used that is an example of a reference signal comparison type analog-digital converter.

The logic circuit section 14 that is a signal processing section performs reading of the pixel signal digitized by the analog-digital conversion section 13 and predetermined signal processing. Specifically, the logic circuit section 14 performs, as the predetermined signal processing, correction of a vertical line defect or a point defect, or clamping of a signal, and further, digital signal processing such as parallel-to-serial conversion, compression, encoding, addition, averaging, and intermittent operation, for example. The logic circuit section 14 outputs generated image data to a subsequent device as an output signal OUT of the CMOS image sensor 1.

The timing control section 15 generates various timing signals, a clock signal, a control signal, and the like on the basis of a synchronization signal provided from the outside. Then, the timing control section 15 performs drive control of the row selection section 12, the analog-digital conversion section 13, the logic circuit section 14, and the like on the basis of the generated signals.

[Example of Circuit Configuration of Pixel]

Figure 2:
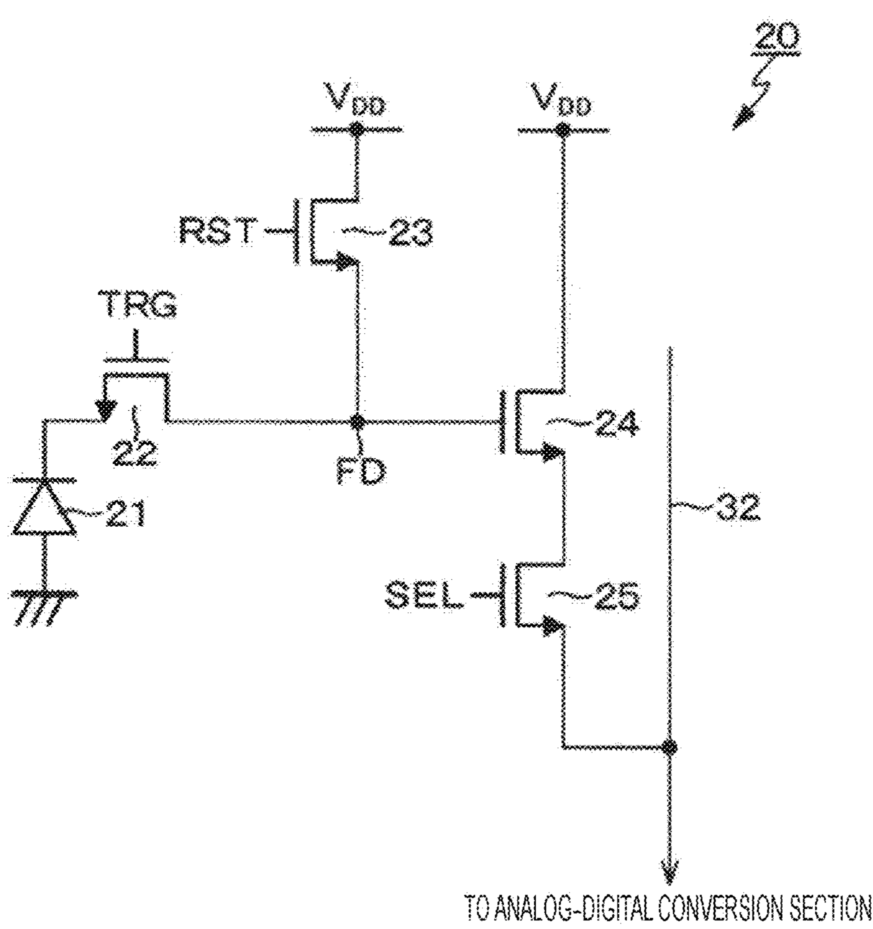
FIG. 2 is a circuit diagram illustrating an example of a circuit configuration of a pixel.

FIG. 2 is a circuit diagram illustrating an example of a circuit configuration of the pixel 20. The pixel 20 includes, for example, a photodiode 21 as the photoelectric conversion element. The pixel 20 includes, in addition to the photodiode 21, a transfer transistor 22, a reset transistor 23, an amplification transistor 24, and a selection transistor 25.

As the four transistors that are the transfer transistor 22, the reset transistor 23, the amplification transistor 24, and the selection transistor 25, N-channel MOS field effect transistors are used, for example. It is to be noted that a combination of conductivity types of the four transistors 22 to 25 illustrated here is merely an example, and the combination is not limited thereto.

For the pixels 20, each of a plurality of pixel control lines as the above-described pixel control lines 31 ($31_1$ to $31_n$) is wired in common to the pixels 20 in a corresponding one of the same pixel rows. The plurality of pixel control lines is connected to the output ends of the row selection section 12 on a pixel-row basis, the output ends corresponding to the respective pixel rows. The row selection section 12 appropriately outputs a transfer signal TRG, a reset signal RST, and a selection signal SEL to the plurality of pixel control lines.

In the photodiode 21, an anode electrode is connected to a low-potential-side power supply (for example, a ground), received light is photoelectrically converted into photoelectric charges (herein, photoelectrons) of an amount of charge corresponding to an amount of the light and the photoelectric charges are accumulated. A cathode electrode of the photodiode 21 is electrically connected to a gate electrode of the amplification transistor 24 via the transfer transistor 22. Here, a region where the gate electrode of the amplification transistor 24 is electrically connected is a floating diffusion (floating diffusion region/impurity diffusion region) FD. The floating diffusion FD is a charge-voltage conversion section that converts a charge into a voltage.

The transfer signal TRG that is active at a high level (for example, a $V_{DD}$ level) is provided from the row selection section 12 to a gate electrode of the transfer transistor 22. The transfer transistor 22 is in a conductive state in response to the transfer signal TRG, thereby transferring the photoelectric charges photoelectrically converted by the photodiode 21 and accumulated in the photodiode 21 to the floating diffusion FD.

The reset transistor 23 is connected between a node of a high-potential-side power supply voltage $V_{DD}$ and the floating diffusion FD. The reset signal RST that is active at the high level is provided from the row selection section 12 to a gate electrode of the reset transistor 23. The reset transistor 23 is in a conductive state in response to the reset signal RST, and resets the floating diffusion FD by discharging the charges of the floating diffusion FD to the node of the voltage $V_{DD}$.

In the amplification transistor 24, the gate electrode is connected to the floating diffusion FD, and a drain electrode is connected to the node of the high-potential-side power supply voltage $V_{DD}$. The amplification transistor 24 serves as an input section of a source follower that reads a signal obtained by photoelectric conversion in the photodiode 21. That is, in the amplification transistor 24, a source electrode is connected to the signal line 32 via the selection transistor 25.

In the selection transistor 25, a drain electrode is connected to the source electrode of the amplification transistor 24, and a source electrode is connected to the signal line 32. The selection signal SEL that is active at the high level is provided from the row selection section 12 to a gate electrode of the selection transistor 25. The selection transistor 25 is in a conductive state in response to the selection signal SEL, thereby putting the pixel 20 into a selected state to transmit the signal output from the amplification transistor 24 to the signal line 32.

Note that, in the circuit example described above, as the pixel 20, an example has been described of a 4-transistor (Tr) configuration including four transistors, which are the transfer transistor 22, the reset transistor 23, the amplification transistor 24, and the selection transistor 25, but the configuration is not limited thereto. For example, a 3-Tr configuration may be employed in which the selection transistor 25 is omitted and the amplification transistor 24 has a function of the selection transistor 25, or a configuration of 5-Tr or more may be employed in which the number of transistors is increased, as necessary.

[Semiconductor Chip Structure]

As a semiconductor chip structure of the CMOS image sensor 1 having the configuration described above, a flat-type semiconductor chip structure and a stacked-type semiconductor chip structure can be exemplified. Furthermore, regarding a pixel structure, when a substrate surface on a side on which a wiring layer is formed is defined as a front surface (front), a back-illuminated pixel structure can be employed that receives light emitted from a back surface side that is an opposite side from the front surface, or a front-illuminated pixel structure can be employed that receives light emitted from a front surface side.

The flat-type semiconductor chip structure and the stacked-type semiconductor chip structure will be schematically described below.

(Flat-Type Semiconductor Chip Structure)

Figure 3A:
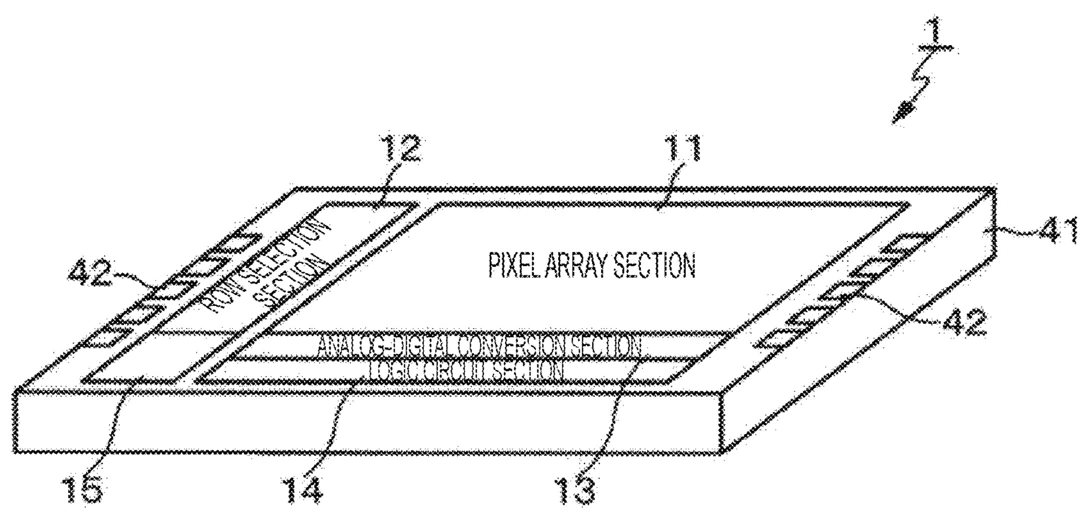
FIG. 3A is a perspective view schematically illustrating a flat-type chip structure of the CMOS image sensor.

FIG. 3A is a perspective view schematically illustrating a flat-type chip structure of the CMOS image sensor 1. As illustrated in FIG. 3A, the flat-type semiconductor chip structure is a structure in which components of the peripheral circuit section of the pixel array section 11 are formed on a semiconductor substrate 41 that is the same substrate on which the pixel array section 11 is formed that includes the pixels 20 arranged in a matrix. Specifically, the row selection section 12, the analog-digital conversion section 13, the logic circuit section 14, the timing control section 15, and the like are formed on the semiconductor substrate 41 that is the same substrate on which the pixel array section 11 is formed. Pads 42 for external connection and power supply are provided, for example, at both left and right end portions of the semiconductor substrate 41 in the first layer.

(Stacked-Type Semiconductor Chip Structure)

Figure 3B:
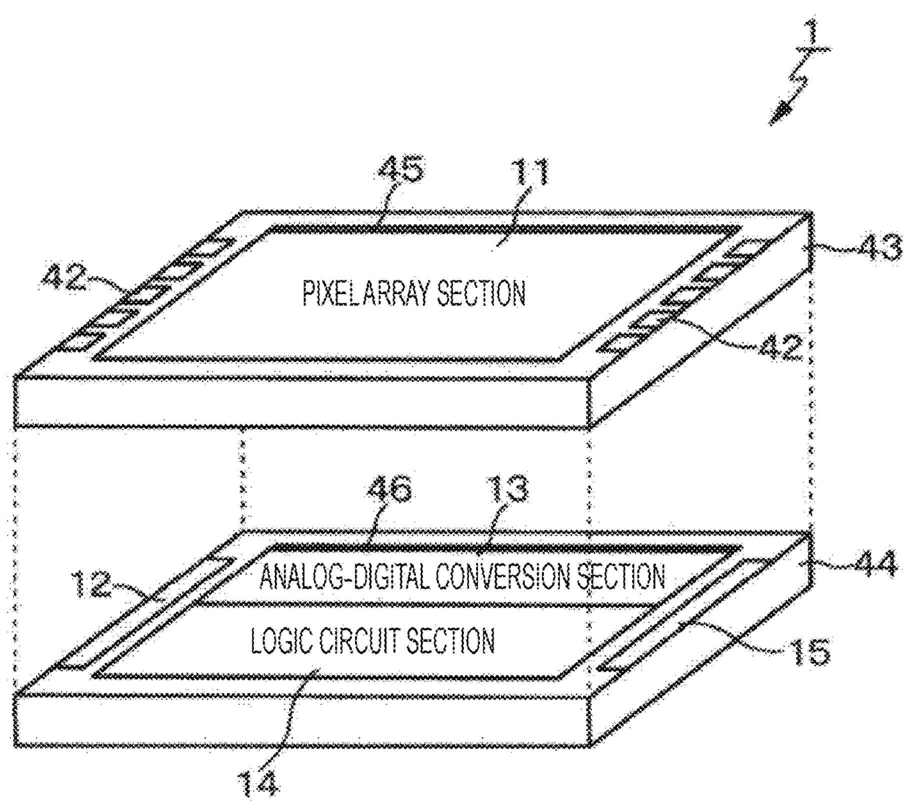
FIG. 3B is an exploded perspective view schematically illustrating a stacked-type semiconductor chip structure of the CMOS image sensor.

FIG. 3B is an exploded perspective view schematically illustrating a stacked-type semiconductor chip structure of the CMOS image sensor 1. As illustrated in FIG. 3B, the stacked-type semiconductor chip structure, so-called stacked structure has a structure in which at least two semiconductor chips that are a semiconductor chip 43 in the first layer and a semiconductor chip 44 in the second layer are stacked.

In the stacked-type semiconductor chip structure, the semiconductor chip 43 in the first layer is a pixel chip in which the pixel array section 11 is formed that includes the pixels 20 two-dimensionally arrayed in a matrix, the pixels 20 including photoelectric conversion elements (for example, photodiodes 21). The pads 42 for external connection and power supply are provided, for example, at both left and right end portions of the semiconductor chip 43 in the first layer.

The semiconductor chip 44 in the second layer is a circuit chip in which the peripheral circuit section of the pixel array section 11 is formed, that is, the row selection section 12, the analog-digital conversion section 13, the logic circuit section 14, the timing control section 15, and the like are formed. Note that the arrangement of the row selection section 12, the analog-digital conversion section 13, the logic circuit section 14, and the timing control section 15 is an example, and is not limited to this arrangement example.

The pixel array section 11 on the semiconductor chip 43 in the first layer and the peripheral circuit section on the semiconductor chip 44 in the second layer are electrically connected to each other via bonding portions 45 and 46 including a metal-metal bond including a Cu—Cu bond, a through silicon via (TSV), a micro-bump, and the like.

According to the stacked-type semiconductor chip structure described above, a process suitable for fabricating the pixel array section 11 can be applied to the semiconductor chip 43 in the first layer, and a process suitable for fabricating a circuit portion can be applied to the semiconductor chip 44 in the second layer. As a result, the process can be optimized during manufacturing of the CMOS image sensor 1. As a result, the process can be optimized during manufacturing of the CMOS image sensor 1. In particular, an advanced process may be applied when the circuit portion is fabricated.

[Example of Configuration of Analog-Digital Conversion Section]

Next, an example of a configuration of the analog-digital conversion section 13 will be described. Here, a single-slope analog-digital converter is used as each analog-digital converter of the analog-digital conversion section 13.

Figure 4:
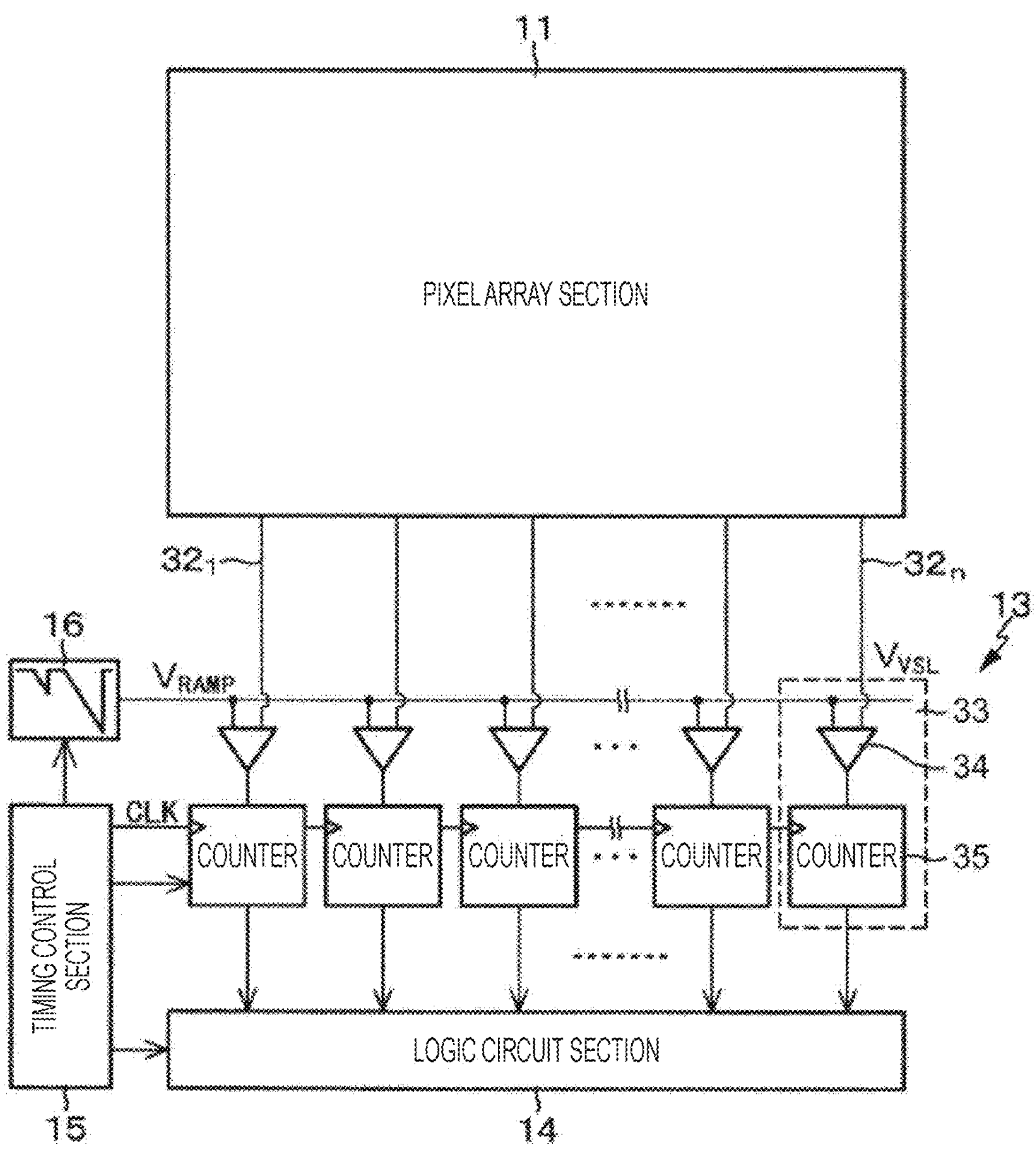
FIG. 4 is a diagram illustrating an example of a configuration of an analog-digital conversion section.

FIG. 4 illustrates an example of the configuration of the analog-digital conversion section 13. In the CMOS image sensor 1, the analog-digital conversion section 13 includes a set of a plurality of single-slope analog-digital converters provided corresponding to respective pixel columns of the pixel array section 11. Here, a single-slope analog-digital converter 33 of the nth column will be described as an example.

The analog-digital converter 33 has a circuit configuration including a comparator 34 and a counter 35. Then, the single-slope analog-digital converter 33 uses a reference signal generated by a reference signal generation circuit 16. The reference signal generation circuit 16 includes, for example, a digital-analog converter (DAC), generates a reference signal $V_{RAMP}$ having an inclined waveform (so-called ramp wave) whose level (voltage) monotonously decreases according to a lapse of time, and provides the reference signal $V_{RAMP}$ to the comparator 34 provided for each pixel column as a standard signal.

The comparator 34 uses an analog pixel signal $V_{VSL}$ read from the pixel 20 as a comparison input and the reference signal $V_{RAMP}$ having the ramp wave generated by the reference signal generation circuit 16 as a standard input, and compares both signals with each other. Then, when the reference signal $V_{RAMP}$ is larger than the pixel signal $V_{VSL}$, an output of the comparator 34 has a first state (for example, high level), and when the reference signal $V_{RAMP}$ is less than or equal to the pixel signal $V_{VSL}$, the output has a second state (for example, low level). As a result, the comparator 34 outputs, as a result of comparison, a pulse signal having a pulse width corresponding to a signal level of the pixel signal $V_{VSL}$, specifically, a magnitude of the signal level.

A clock signal CLK is provided from the timing control section 15 to the counter 35 at the same timing as a supply start timing of the reference signal $V_{RAMP}$ to the comparator 34. Then, the counter 35 performs count operation in synchronization with the clock signal CLK to measure a period of a pulse width of an output pulse of the comparator 34, that is, a period from the start of comparison operation to the end of the comparison operation. A count result (count value) by the counter 35 is supplied to the logic circuit section 14 as a digital value obtained by digitizing the analog pixel signal $V_{VSL}$.

According to the analog-digital conversion section 13 including a set of the single-slope analog-digital converters 33 described above, it is possible to obtain a digital value from information regarding a time until a magnitude relationship changes between the reference signal $V_{RAMP}$ having the ramp wave generated by the reference signal generation circuit 16 and the analog pixel signal $V_{VSL}$ read from the pixel 20 through the signal line 32.

Note that, in the example described above, a configuration has been exemplified in which the analog-digital converters 33 are arranged in a one-to-one correspondence with the pixel columns of the pixel array section 11 as the analog-digital conversion section 13; however, a configuration can be employed in which the analog-digital converters 33 are arranged on a plurality of pixel columns basis.

[Comparator of Analog-Digital Converter]

In the single-slope analog-digital converter 33 described above, a comparator having a differential amplifier configuration is generally used as the comparator 34. However, in a case of the comparator having the differential amplifier configuration, it is necessary to separately prepare a load current source for the pixel and a current source for the comparator, and thus, there is a problem that it is difficult to reduce power consumption of the analog-digital converter 33, and thus, it is difficult to reduce power consumption of the CMOS image sensor 1.

On the other hand, there is a conventional technology having a configuration in which a P-channel metal-oxide-semiconductor (MOS) transistor is provided in which an analog pixel signal is input to a source electrode and a predetermined reference signal is input to a gate electrode, and a load current source for a pixel (pixel circuit) is shared as a current source for a comparator (see, for example, Patent Document 1). According to the conventional technology, power consumption can be reduced as compared with a case of a configuration in which a current source is also provided for the comparator separately from that for the pixel circuit.

However, in the above-described connection configuration of the conventional technology, when the analog pixel signal and the predetermined reference signal coincide with each other, a drain voltage of the P-channel MOS transistor varies according to a level of the pixel signal, and thus, a timing at which a result of comparison by the comparator is inverted may deviate from an ideal timing at which the pixel signal and the reference signal coincide with each other. There is a problem that, due to an error in the inversion timing, an error or nonlinearity occurs in a digital signal obtained by analog-digital conversion of the pixel signal, and image quality of image data deteriorates.

[Comparator According to Reference Example]

A comparator for solving the above-described problems of the conventional technology will be described below as a comparator according to a reference example.

(Example of Circuit Configuration of Comparator According to Reference Example)

Figure 5:
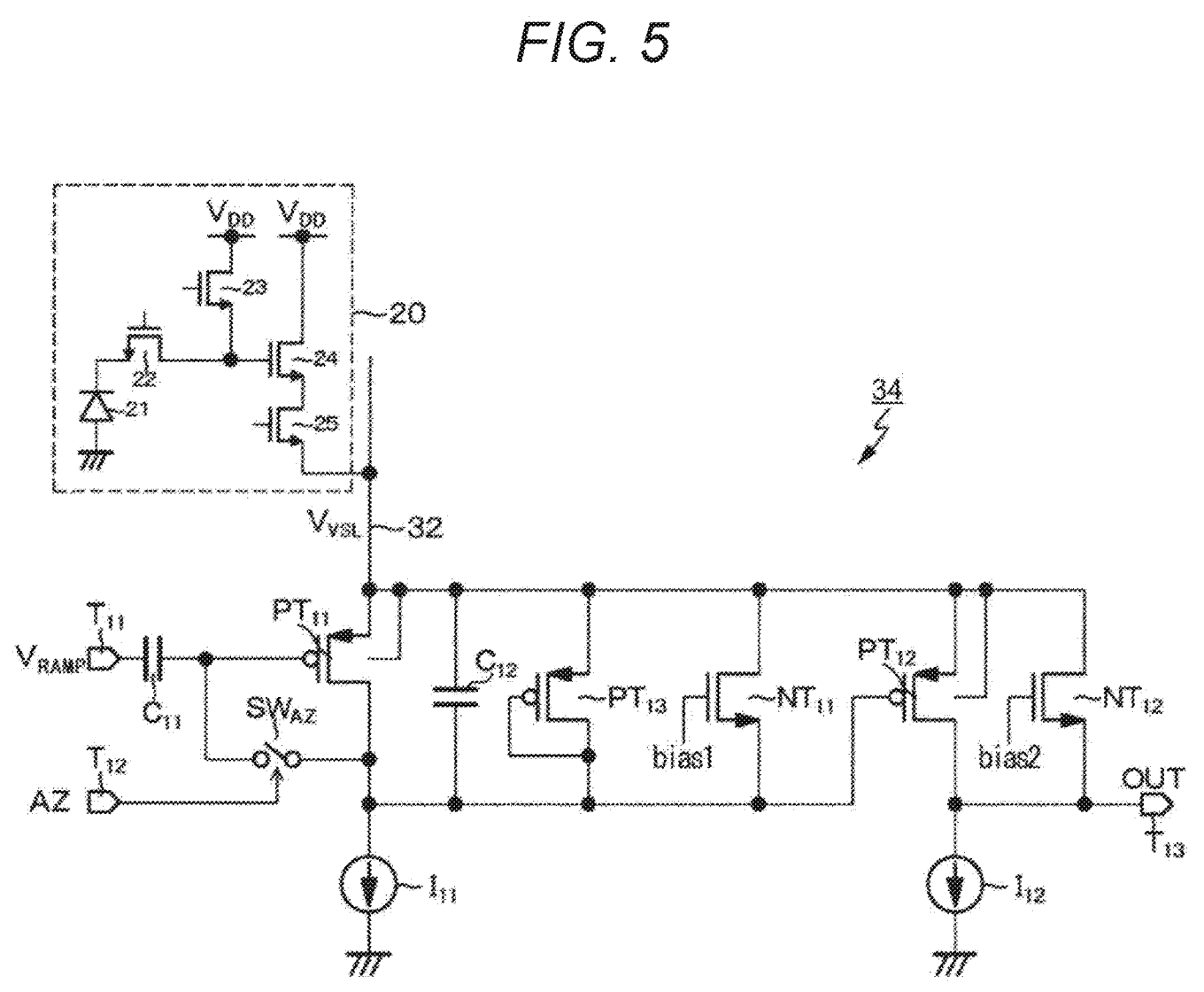

FIG. 5 illustrates an example of a circuit configuration of the comparator according to the reference example. Here, in order to simplify the drawing, a circuit configuration for one pixel column is illustrated.

As illustrated in FIG. 5, the comparator 34 according to the reference example includes a capacitive element $C_{11}$, an auto-zero switch $SW_{AZ}$, an input transistor $PT_{11}$, an input-side load current source $I_{11}$, a capacitive element $C_{12}$, an input-side clamp transistor $PT_{13}$, an input-side clamp transistor $NT_{11}$, an output transistor $PT_{12}$, an output-side load current source $I_{12}$, and an output-side clamp transistor $NT_{12}$.

The input transistor $PT_{11}$ includes a P-channel MOS transistor, and is connected between the signal line 32 and the input-side load current source $I_{11}$. Specifically, a source electrode of the input transistor $PT_{11}$ is connected to the signal line 32, and a drain electrode is connected to one end of the input-side load current source $I_{11}$. As a result, the analog pixel signal $V_{VSL}$ is input to the source electrode of the input transistor $PT_{11}$ through the signal line 32. A back gate and the source electrode of the input transistor $PT_{11}$ may be short-circuited to suppress a back gate effect.

The other end of the input-side load current source $I_{11}$ is connected to a low-potential-side power supply, for example, a ground GND. The input-side load current source $I_{11}$ supplies a constant current to a series connection circuit of the input transistor $PT_{11}$ and the signal line 32.

The capacitive element $C_{11}$ is connected between an input terminal $T_{11}$ for the reference signal $V_{RAMP}$ having the ramp wave and a gate electrode of the input transistor $PT_{11}$, serves as an input capacitance to the reference signal $V_{RAMP}$, and absorbs an offset. As a result, the analog pixel signal $V_{VSL}$ is input to the source electrode of the input transistor $PT_{11}$ through the signal line 32, and the reference signal $V_{RAMP}$ having the ramp wave is input to the gate electrode of the input transistor $PT_{11}$ through the capacitive element $C_{11}$.

The input transistor $PT_{11}$ amplifies a difference between the reference signal $V_{RAMP}$ having the ramp wave input to the gate electrode and the analog pixel signal $V_{VSL}$ input to the source electrode, that is, a gate-source voltage $V_{gs}$ of the input transistor $PT_{11}$, and outputs the amplified difference as a drain voltage $V_d$ from the drain electrode.

The auto-zero switch $SW_{AZ}$ is connected between the gate electrode and the drain electrode of the input transistor $PT_{11}$, and is controlled to be turned on (closed) or off (opened) by a drive signal AZ input from the timing control section 15 illustrated in FIG. 1 via an input terminal $T_{12}$. The auto-zero switch $SW_{AZ}$ is turned on to perform auto zero (initialization operation) of short-circuiting the gate electrode and the drain electrode of the input transistor $PT_{11}$. The auto-zero switch $SW_{AZ}$ can be formed using a P-channel or N-channel MOS transistor.

The capacitive element $C_{12}$ is connected in parallel to the input transistor $PT_{11}$. Specifically, one end of the capacitive element $C_{12}$ is connected to the source electrode of the input transistor $PT_{11}$, and the other end of the capacitive element $C_{12}$ is connected to the drain electrode of the input transistor $PT_{11}$. The capacitive element $C_{12}$ is a band-limiting capacitance.

The input-side clamp transistor $PT_{13}$ includes, for example, a P-channel MOS transistor, and is connected between the source electrode and the drain electrode of the input transistor $PT_{11}$. The input-side clamp transistor $PT_{13}$ has a diode-connected configuration in which the gate electrode and the source electrode are commonly connected together, and acts to suppress a decrease in the drain voltage of the input transistor $PT_{11}$ when the input transistor $PT_{11}$ is in a non-conductive state.

The input-side clamp transistor $NT_{11}$ includes an N-channel MOS transistor, in which a drain electrode is connected to the source electrode of the input transistor $PT_{11}$, and a source electrode is connected to the drain electrode of the input transistor $PT_{11}$. A predetermined bias voltage bias1 is applied to a gate electrode of the input-side clamp transistor $NT_{11}$.

In the input-side clamp transistor $NT_{11}$, the predetermined bias voltage bias1 is applied to the gate electrode. As a result, a lower limit of the drain voltage $V_d$ of the input transistor $PT_{11}$ can be limited regardless of a voltage of the signal line 32, and a stop of supply of a drain current can be directly prevented.

The output transistor $PT_{12}$ includes, for example, a P-channel MOS transistor, and is connected between the signal line 32 and the output-side load current source $I_{12}$. Specifically, a source electrode of the output transistor $PT_{12}$ is connected to the signal line 32, and a drain electrode is connected to one end of the output-side load current source $I_{12}$. As a result, the pixel signal $V_{VSL}$ is input to the source electrode of the output transistor $PT_{12}$ through the signal line 32. The back gate and the source electrode of the output transistor $PT_{12}$ may be short-circuited to suppress the back gate effect.

The other end of the output-side load current source $I_{12}$ is connected to a low-potential-side power supply, for example, the ground GND. The output-side load current source $I_{12}$ supplies a constant current to a series connection circuit of the output transistor $PT_{12}$ and the signal line 32.

A gate electrode of the output transistor $PT_{12}$ is connected to the drain electrode of the input transistor $PT_{11}$. As a result, the drain voltage of the input transistor $PT_{11}$ is input to the gate electrode of the output transistor $PT_{12}$.

The output transistor $PT_{12}$ outputs the signal OUT indicating whether or not a voltage difference between the analog pixel signal $V_{VSL}$ input to the source electrode through the signal line 32 and the drain voltage $V_d$ of the input transistor $PT_{11}$ input to the gate electrode exceeds a predetermined threshold voltage, from the drain electrode through an output terminal $T_{13}$, as a result of comparison between the analog pixel signal $V_{VSL}$ and the reference signal $V_{RAMP}$ having the ramp wave.

The output-side clamp transistor $NT_{12}$ includes an N-channel MOS transistor, in which a drain electrode is connected to the source electrode of the output transistor $PT_{12}$ and a source electrode is connected to the drain electrode of the output transistor $PT_{12}$. A predetermined bias voltage bias2 is applied to a gate electrode of the output-side clamp transistor $NT_{12}$. The output-side clamp transistor $NT_{12}$ including the N-channel MOS transistor can limit a lower limit of a drain voltage of the output transistor $PT_{12}$.

As described above, the comparator 34 according to the reference example has a basic circuit configuration in which the load current source $I_{11}$ and the load current source $I_{12}$ that supply a current to the signal line 32 are shared as current sources for the comparator 34. According to the comparator 34 having the circuit configuration, it is possible to reduce the power consumption of the analog-digital converter 33, and thus, it is possible to reduce the power consumption of the CMOS image sensor 1. That is, the comparator 34 according to the reference example is an ultra-low power consumption type comparator.

Moreover, in the comparator 34 according to the reference example, the input transistor $PT_{11}$ supplies a drain-source voltage across the gate and the source of the output transistor $PT_{12}$, so that the result of comparison can be inverted at a timing at which a change of the analog pixel signal $V_{VSL}$ coincides with a change of the reference signal $V_{RAMP}$ having the ramp wave. As a result, the nonlinearity caused by an error in the inversion timing can be reduced, and the image quality of the image data can be improved.

(Example of Circuit Operation of Comparator)

Figure 6:
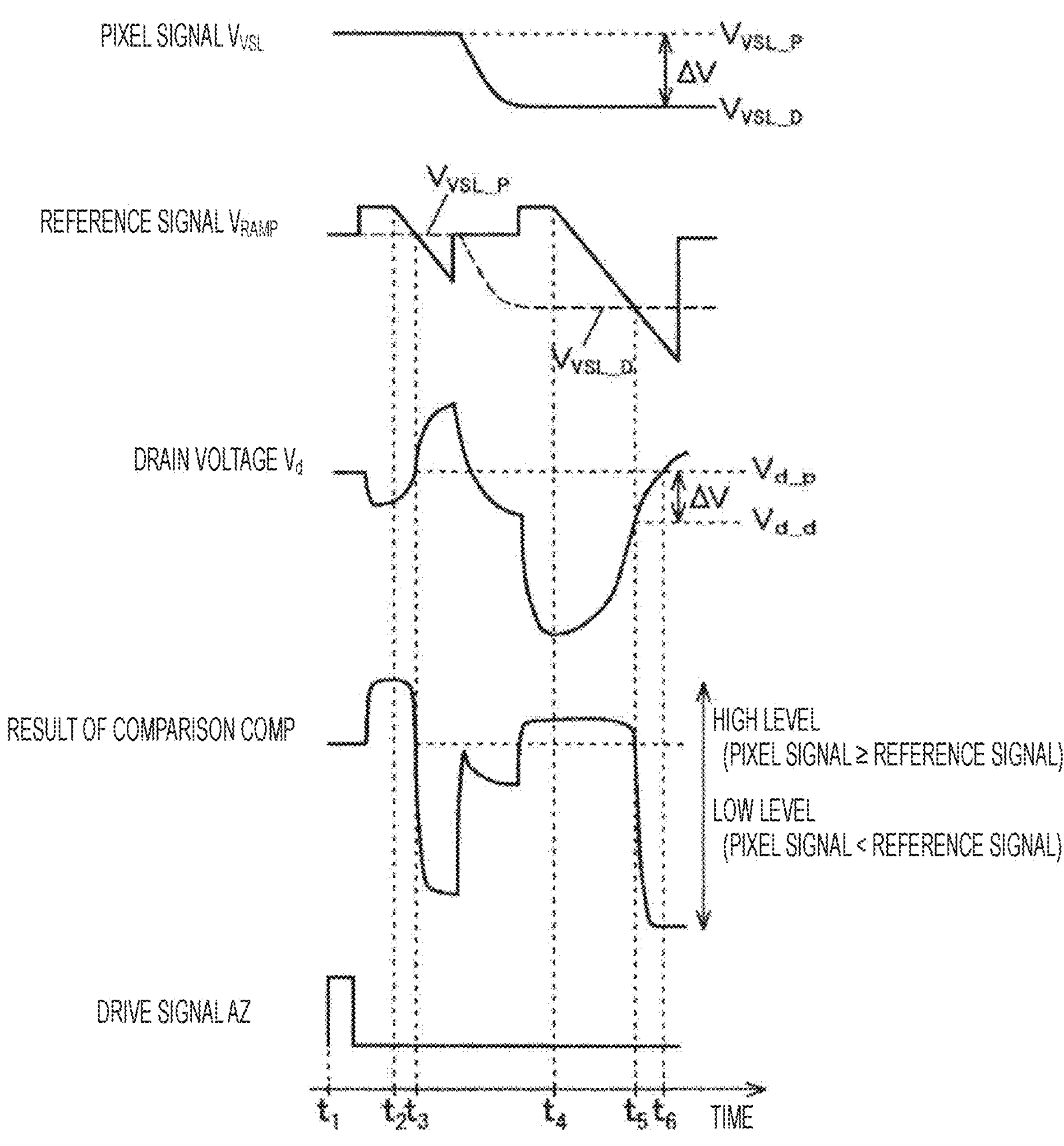
FIG. 6 is a timing diagram for explaining an example of circuit operation of the comparator according to the reference example.

Next, an example will be described of circuit operation of the comparator 34 having the basic circuit configuration described above. FIG. 6 is a timing diagram for explaining an example of the circuit operation of the comparator 34 according to the reference example. The timing diagram of FIG. 6 illustrates a timing relationship among waveforms of the analog pixel signal $V_{VSL}$, the reference signal $V_{RAMP}$ having the ramp wave, the drain voltage $V_d$ of the input transistor $PT_{11}$, the result of comparison COMP by the comparator 34, and the drive signal AZ for the auto-zero switch $SW_{AZ}$.

The drive signal AZ for the auto-zero switch $SW_{AZ}$ enters an active state (high-level state) at time $t_1$ immediately before the start of the analog-digital conversion (AD conversion), over a predetermined auto-zero period. As a result, the auto-zero switch $SW_{AZ}$ is turned on (closed) in response to the drive signal AZ, thereby short-circuiting the gate electrode and the drain electrode of the input transistor $PT_{11}$, and performing the initialization operation of the comparator 34, that is, auto-zero operation.

After the auto-zero operation, the reference signal generation circuit 16 starts outputting the reference signal $V_{RAMP}$ at time $t_2$. The reference signal $V_{RAMP}$ is a signal having a ramp wave whose level (voltage) monotonously decreases according to a lapse of time.

Meanwhile, in the CMOS image sensor 1, noise removal processing by correlated double sampling (CDS) is generally performed in order to remove noise at the time of a reset operation of the pixel 20. For this reason, a reset level (first mode) $V_{VSL\_P}$ and a signal level (second mode) $V_{VSL\_D}$ are read from the pixel 20 as the pixel signal, for example.

The reset level $V_{VSL\_P}$ corresponds to a potential of the signal line 32 according to a potential of the floating diffusion FD when the floating diffusion FD of the pixel 20 is reset. The signal level $V_{VSL\_D}$ corresponds to a potential of the signal line 32 according to a potential obtained by photoelectric conversion in the photodiode 21, that is, a potential of the floating diffusion FD when the charges accumulated in the photodiode 21 are transferred to the floating diffusion FD.

It is assumed that, at time $t_3$, the reference signal $V_{RAMP}$ whose voltage gradually decreases according to a lapse of time intersects the reset level $V_{VSL\_P}$ via an offset voltage (not illustrated) determined at the time of the auto-zero operation. Here, when the drain voltage $V_d$ of the input transistor $PT_{11}$ at time $t_3$ is $V_{d\_p}$, and a voltage less than the drain voltage $V_{d\_p}$ is a low level, and a voltage greater than or equal to the drain voltage $V_{d\_p}$ is a high level, the drain voltage $V_d$ of the input transistor $PT_{11}$ is inverted from the low level to the high level near time $t_3$.

Thereafter, initialization of the reference signal $V_{RAMP}$ is performed, and the reference signal $V_{RAMP}$ starts to gradually decrease again from time $t_4$. On the other hand, in the pixel 20, the charges are transferred from the photodiode 21 to the floating diffusion FD, and a signal level $V_{VSL\_D}$ is output as a pixel signal. The signal level $V_{VSL\_D}$ is a level lower than the reset level $V_{VSL\_P}$ by ΔV.

Then, it is assumed that, at time $t_5$, the reference signal $V_{RAMP}$ whose voltage gradually decreases according to a lapse of time intersects the signal level $V_{VSL\_D}$ via the offset voltage (not illustrated) determined at the time of the auto-zero operation. Here, the drain voltage $V_d$ of the input transistor $PT_{11}$ at time $t_5$ is defined as $V_{d\_d}$. The drain voltage $V_{d\_d}$ has a value lower than that of the drain voltage $V_{d\_p}$ by ΔV. That is, the drain voltage $V_{d\_d}$ at time $t_5$ has a lower value as the signal level $V_{VSL\_D}$ that is the pixel signal at that time is lower.

The drain voltage $V_{d\_d}$ of the input transistor $PT_{11}$ drops by ΔV from the drain voltage $V_{d\_p}$ at the time of conversion of the reset level $V_{VSL\_p}$. In the conventional technology, it is determined that the drain voltage $V_d$ is inverted at time $t_6$ after time $t_5$. For this reason, if the drain voltage $V_{d\_p}$ is used for generation of the result of comparison COMP by the comparator 34, a timing (near time $t_6$) at which the result of comparison COMP is inverted deviates from an ideal timing (near time $t_5$) at which the reference signal $V_{RAMP}$ intersects the signal level $V_{VSL\_D}$. As a result, a linearity error and an offset occur in the analog-digital converter 33, and the image quality of the image data may deteriorate due to this error.

On the other hand, in the comparator 34 according to the reference example, the output transistor $PT_{12}$ is provided at the subsequent stage of the input transistor $PT_{11}$, and the source electrode and the drain electrode of the input transistor $PT_{11}$ are connected to the source electrode and the gate electrode of the output transistor $PT_{12}$. With this connection, a drain-source voltage $V_{ds}$ of the input transistor $PT_{11}$ is input to the output transistor $PT_{12}$ as a gate-source voltage thereof.

As illustrated in the timing diagram of FIG. 6, the amount of voltage drop ΔV of the pixel signal $V_{VSL}$ is the same as an amount of voltage drop of the drain voltage $V_d$ of the input transistor $PT_{11}$ at time $t_3$ and time $t_5$ at which the reference signal $V_{RAMP}$ intersects the pixel signal $V_{VSL}$ via the offset voltage (not illustrated) determined at the time of the auto-zero operation. For this reason, the drain-source voltage $V_{ds}$ has the same value at these timings. The value of the drain-source voltage $V_{ds}$ at this time (that is, time $t_3$ and time $t_5$) is the same as that at the time of auto zero. Since the drain-source voltage $V_{ds}$ of the input transistor $PT_{11}$ is the gate-source voltage of the output transistor $PT_{12}$, the drain voltage of the output transistor $PT_{12}$ is inverted near time $t_3$ and near time $t_5$.

Since the inversion timing of the result of comparison COMP by the comparator 34 corresponds to an ideal timing at which the reference signal $V_{RAMP}$ intersects the signal level $V_{VSL\_D}$, an error in the inversion timing is suppressed. As a result, the linearity error and the offset can be reduced, and the image quality of the image data can be improved, as compared with a case where only the drain voltage $V_{d\_p}$ of the input transistor $PT_{11}$ is used for generation of the result of comparison COMP.

Next, a reason will be described that, at time $t_3$ and time $t_5$, the amount of voltage drop ΔV of the drain voltage $V_d$ of the input transistor $PT_{11}$ is the same as an amount of voltage drop of the pixel signal $V_{VSL}$ input to the source electrode of the input transistor $PT_{11}$.

Figure 7:
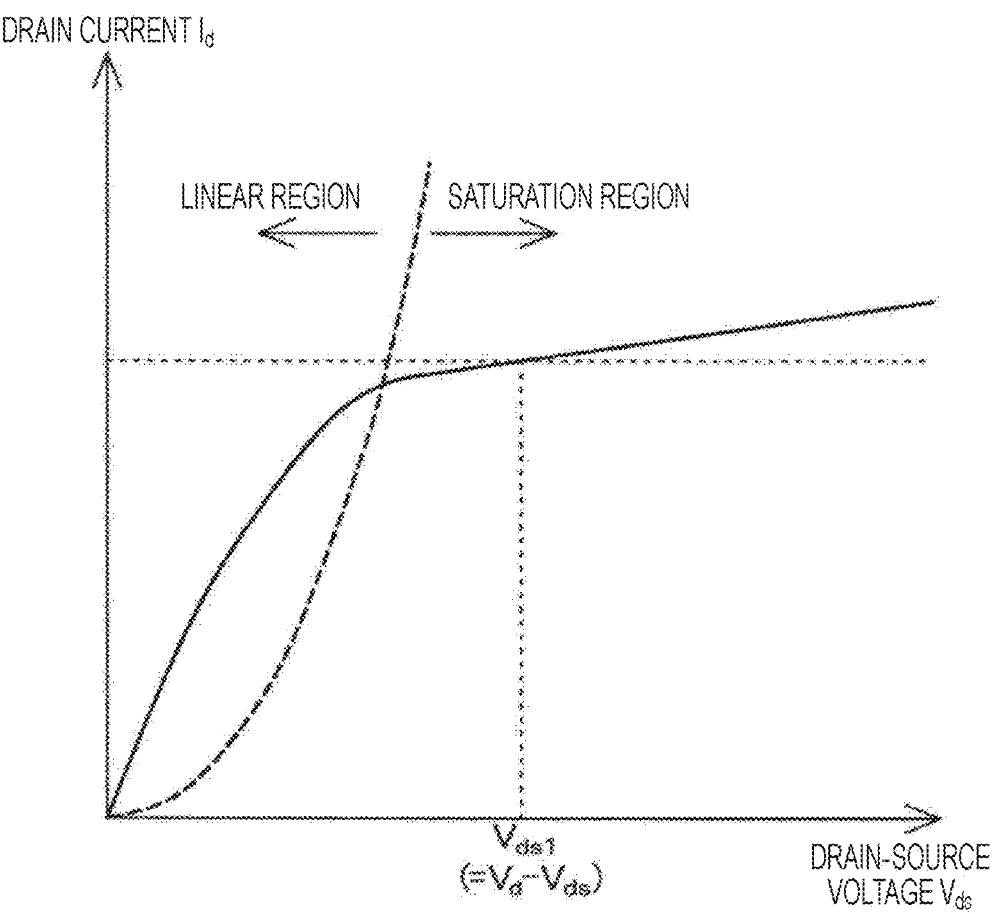
FIG. 7 is a characteristic diagram illustrating an example of characteristics of a P-channel MOS transistor used as an input transistor in the comparator according to the reference example.

FIG. 7 is a characteristic diagram illustrating an example of characteristics of a P-channel MOS transistor used as the input transistor $PT_{11}$ in the comparator 34 according to the reference example. In the characteristic diagram of FIG. 7, the vertical axis represents the drain current, and the horizontal axis represents the drain-source voltage. Furthermore, a broken line indicates a boundary between a linear region and a saturation region.

Generally, an operating point of a P-channel MOS transistor is determined so that the P-channel MOS transistor operates in the saturation region at the time of auto zero. A drain current $I_d$ in the saturation region of the P-channel MOS transistor is expressed by following Equation (1).

$$I_d = (1/2)\cdot\mu C_{ox}(W/L)\cdot(V_{GS} - V_{th})^2(1+\lambda V_{ds}) \tag{1}$$

Here, μ is electron mobility, $C_{OX}$ is capacitance per unit area of a MOS capacitor, W is a gate width, L is a gate length, $V_{th}$ is a threshold voltage, and λ is a predetermined coefficient.

Since the input transistor $PT_{11}$ is a P-channel MOS transistor, Equation (1) is established in the saturation region. At this time, the drain current Id of the input transistor $PT_{11}$ has a constant value $I_{d1}$ supplied by the input-side load current source $I_{11}$. Furthermore, the electron mobility μ, the unit capacitance $C_{OX}$, the gate width W, the gate length L, the threshold voltage $V_{th}$, and the coefficient λ are constant values.

Furthermore, when it is said that the reference signal $V_{RAMP}$ input to the gate electrode of the input transistor $PT_{11}$ intersects the pixel signal $V_{VSL}$ input to the source electrode via the offset voltage (not illustrated) determined at the time of the auto-zero operation, the gate-source voltage $V_{gs}$ is a constant value determined at the time of auto zero.

Thus, when the reference signal $V_{RAMP}$ input to the gate electrode of the input transistor $PT_{11}$ intersects the pixel signal $V_{VSL}$ input to the source electrode via the offset voltage (not illustrated) determined at the time of the auto-zero operation, the drain-source voltage $V_{ds}$ also has a constant value according to Equation (1). When the constant drain-source voltage is $V_{ds1}$, following Equations (2) and (3) are established at time $t_3$ and time $t_5$.

$$V_{ds1} = V_{VSL\_P} - V_{d\_p} \tag{2}$$

$$V_{ds1} = V_{VSL\_D} - V_{d\_d} \tag{3}$$

When the drain-source voltage $V_{ds1}$ is deleted from Equations (2) and (3), following Equation (4) is obtained.

$$V_{VSL\_P} - V_{VSL\_D} = V_{d\_p} - V_{d\_d} \tag{4}$$

Note that, in a case where the operating point is determined so that the P-channel MOS transistor operates in the linear region at the time of auto zero, Equation (1) has a different form, but Equation (4) similarly holds.

From Equation (4), the amount of voltage drop ΔV of the drain voltage $V_d$ of the input transistor $PT_{11}$ is the same as the amount of voltage drop of the pixel signal $V_{VSL}$ input to the source electrode. Thus, the timing relationship illustrated in the timing diagram of FIG. 6 is obtained.

(Buffer Noise)

In the single-slope analog-digital converter, a buffer may be disposed before the capacitive element $C_{11}$ for absorbing the offset for the purpose of increasing driving power of the reference signal $V_{RAMP}$ having the ramp wave supplied to the comparator of each pixel column and decreasing an output impedance. At this time, noise of the buffer may adversely affect the comparator. For this reason, for example, in a conventional comparator having a differential amplifier configuration, as illustrated in buffers 50 of FIG. 8, output ends of the buffers 50 are connected together among pixel columns, and noises of the buffers 50 are averaged to reduce noise.

Figure 8:
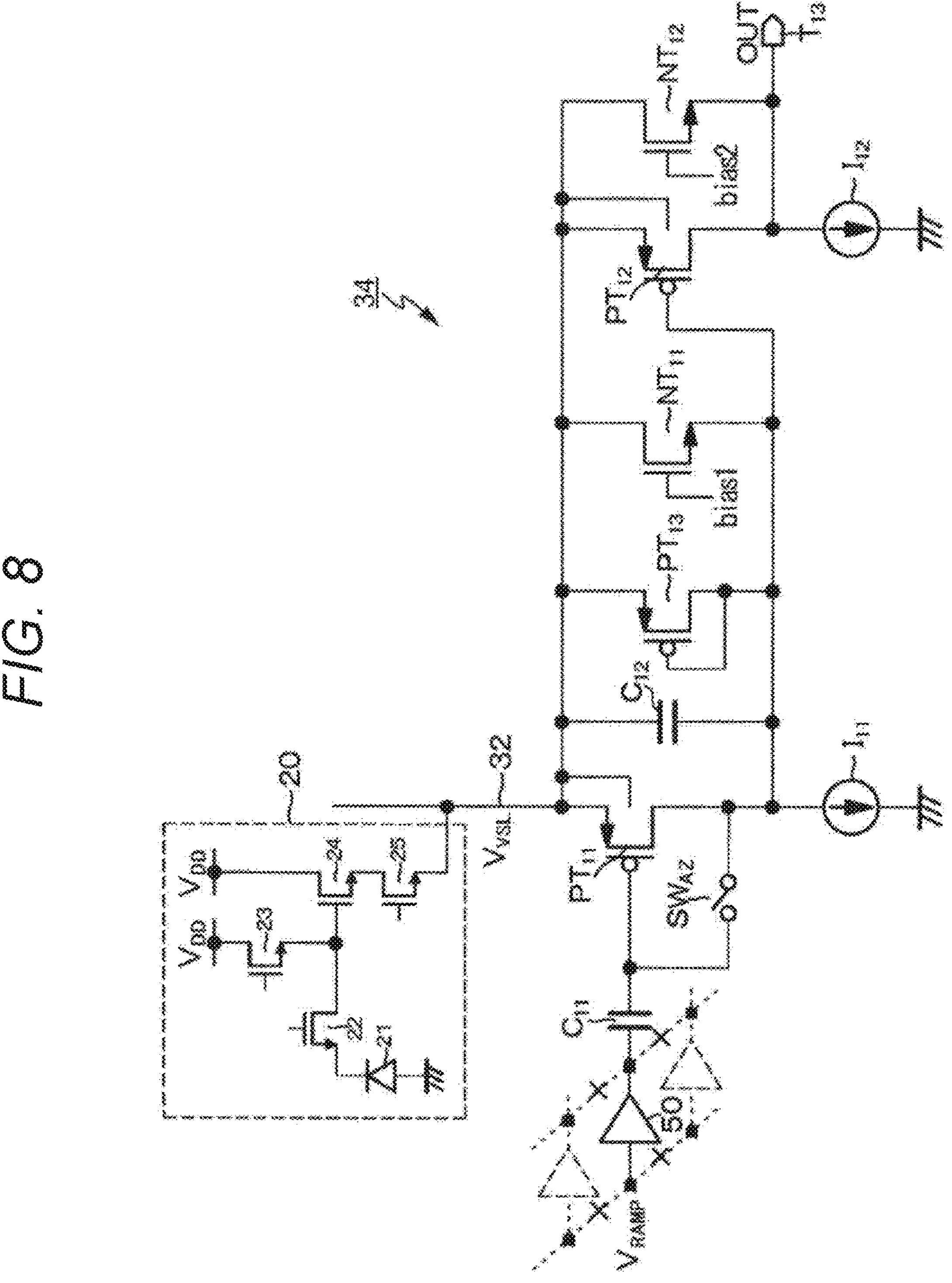
FIG. 8 is a circuit diagram of the comparator according to the reference example in which a buffer is disposed.

However, in the ultra-low power consumption type comparator 34 according to the reference example described above, since kickback is large, the output ends of the buffers 50 cannot be connected together among the pixel columns as indicated by a cross mark of FIG. 8 in order to avoid interference with other pixel columns, specifically, streaking (streaky noise). As a result, since the noises of the buffers 50 cannot be averaged among the pixel columns, the noise of the buffer 50 remains without being attenuated, and the noise of the entire comparator 34 becomes worse. Here, the "kickback" is a phenomenon in which a potential varies (fluctuates) as charges are injected or drawn.

Note that, here, regarding the noise adversely affecting the analog-digital conversion section 13, the noise of the buffer 50 disposed before the capacitive element $C_{11}$ has been taken as an example, and the problem has been described; however, the noise adversely affecting the analog-digital conversion section 13 is not limited to the noise of the buffer 50. For example, even in a case where the buffer 50 is not disposed before the capacitive element $C_{11}$, noise of the reference signal generation circuit 16 that is on the reference signal $V_{RAMP}$ having the ramp wave may also cause a problem in the image quality of the image data.

First Embodiment

The imaging device 1 according to a first embodiment has an HDR function, and combines images obtained by performing imaging a plurality of times while changing sensitivity (gain) in one exposure. At this time, a circuit is devised so that noise is not on the image data obtained by AD conversion of an imaging result.

Figure 9:
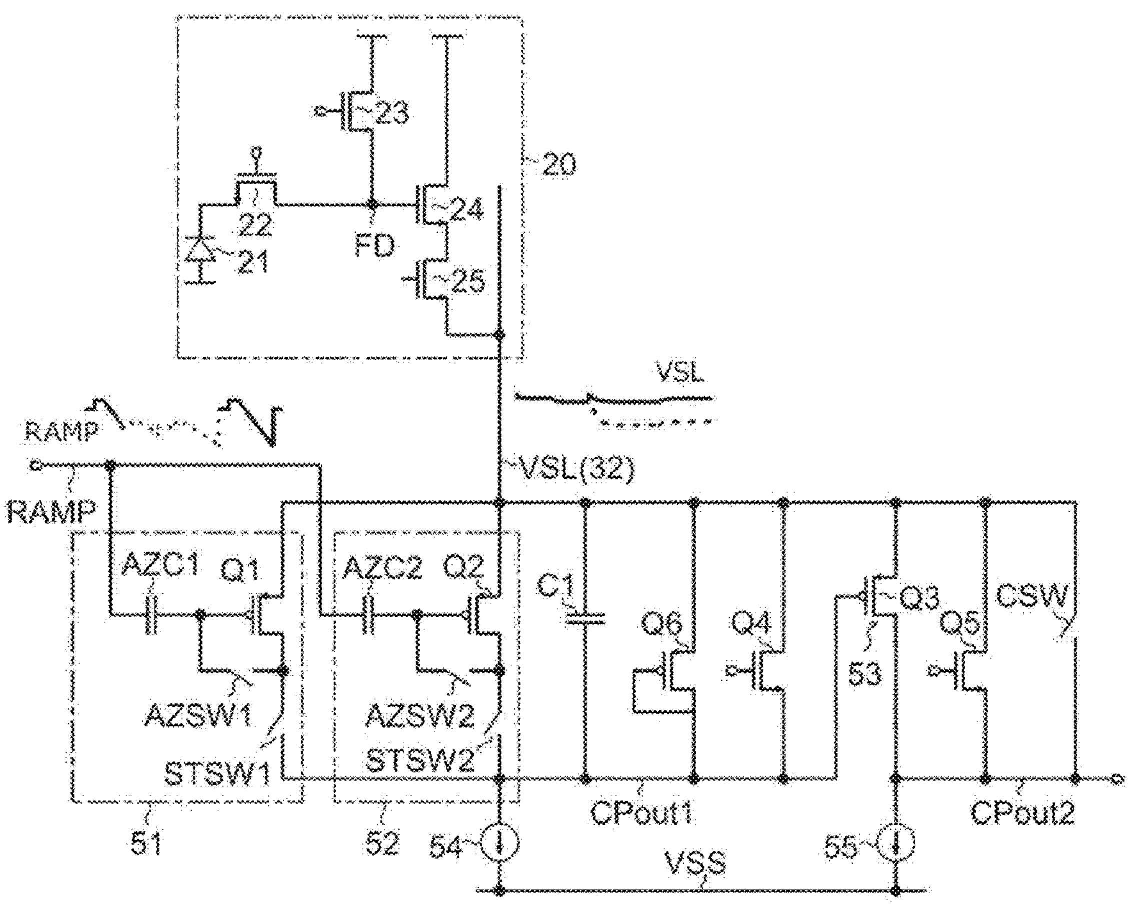
FIG. 9 is a circuit diagram of a comparator in an imaging device according to a first embodiment.

FIG. 9 is a circuit diagram of the comparator 34 in the imaging device 1 according to the first embodiment. The comparator 34 of FIG. 9 includes a first comparison circuit 51, a second comparison circuit 52, a third comparison circuit 53, a first current source 54, and a second current source 55.

The first comparison circuit 51 outputs a first signal according to a result of comparison between signal levels of a first input signal and a first reference signal corresponding to a first gain. In the present specification, the first gain may be referred to as a low gain (LG). The first reference signal is a reference signal corresponding to the first gain LG supplied from the reference signal generation circuit 16 through a reference signal line RAMP. The first input signal is a pixel signal corresponding to the first gain LG supplied from a pixel via the signal line (VSL) 32. An internal configuration of the first comparison circuit 51 will be described later.

The second comparison circuit 52 outputs a second signal corresponding to a result of comparison between a second input signal and a second reference signal corresponding to a second gain HG having an amount of gain different from that of the first gain LG. In the present specification, the second gain HG may be referred to as a high gain (HG). The second reference signal is a reference signal corresponding to the second gain HG supplied from the reference signal generation circuit 16 through the reference signal line RAMP. The second input signal is a pixel signal corresponding to the second gain HG supplied from the pixel via the signal line 32. An internal configuration of the second comparison circuit 52 will be described later.

In the example of FIG. 9, the first reference signal and the second reference signal are supplied from the reference signal generation circuit 16 via the common reference signal line RAMP. Furthermore, the first signal output from the first comparison circuit 51 and the second signal output from the second comparison circuit 52 are input to the third comparison circuit 53 via a common wiring line CPout1.

The third comparison circuit 53 outputs a third signal according to a result of comparison between signal levels of the first signal and the first input signal, and a fourth signal according to a result of comparison between the second signal and the second input signal, at timings different from each other. The third signal and the fourth signal are output via a common wiring line CPout2. The third signal and the fourth signal are input to the counter 35 illustrated in FIG. 4 via the wiring line CPout2.

An output node of the first comparison circuit 51 and an output node of the second comparison circuit 52 are both connected to an input node of the third comparison circuit 53 and connected to one end of the first current source 54. The other end of the first current source 54 is connected to a ground node. The output wiring line CPout2 of the third comparison circuit 53 is connected to one end of the second current source 55. The other end of the second current source 55 is connected to the ground node.

In the comparator 34 of FIG. 9, the first comparison circuit 51 and the second comparison circuit 52 constitute a comparison section of the first stage, and the third comparison circuit 53 constitutes a comparison section of the second stage. The first comparison circuit 51 and the second comparison circuit 52 operate alternately, and the third comparison circuit 53 performs comparison operation in accordance with comparison operation of the first comparison circuit 51 and the second comparison circuit 52.

The reference signal generation circuit 16 illustrated in FIG. 4 supplies the first reference signal to the reference signal line RAMP in accordance with a timing at which the first comparison circuit 51 performs the comparison operation, and supplies the second reference signal to the reference signal line RAMP in accordance with a timing at which the second comparison circuit 52 performs the comparison operation.

The first reference signal includes a signal period in which the signal level changes with a first slope according to a lapse of time. The second reference signal includes a signal period in which the signal level changes with a second slope different from the first slope according to a lapse of time. The first slope is steeper than the second slope, and an amount of change of the signal level of the first reference signal is larger than an amount of change of the signal level of the second reference signal.

The first comparison circuit 51 outputs the first signal according to a difference between the signal level of the first reference signal and the signal level of the first input signal.

The second comparison circuit 52 outputs the second signal according to a difference between the signal level of the second reference signal and the signal level of the second input signal.

More specifically, the first reference signal includes a first signal period LG_RST in which the signal level changes with the first slope corresponding to the reset level, and a second signal period LG_SIG in which the signal level changes with the first slope corresponding to the signal level. The second reference signal includes a third signal period HG_RST in which the signal level changes with the second slope corresponding to the reset level and a fourth signal period HG_SIG in which the signal level changes with the second slope corresponding to the signal level.

Since the second gain HG is larger in the amount of gain than the first gain LG, the second slope is gentler than the first slope, and an amount of signal change per unit time of the second reference signal is smaller than an amount of signal change per unit time of the first reference signal.

The first comparison circuit 51 outputs the first signal according to a result of comparison between the first input signal and the first reference signal corresponding to the reset level, and the first signal according to a result of comparison between the first input signal and the first reference signal corresponding to the signal level, at respective different timings.

The second comparison circuit 52 outputs the second signal according to a result of comparison between the second input signal and the second reference signal corresponding to the reset level, and the second signal according to a result of comparison between the second input signal and the second reference signal corresponding to the signal level, at respective different timings.

The first comparison circuit 51 performs processing of comparison with the first input signal and outputs the first signal during a period in which the reference signal generation circuit 16 outputs the first reference signal, and stops outputting the first signal during a period in which the reference signal generation circuit 16 outputs the second reference signal.

The second comparison circuit 52 performs processing of comparison with the second input signal and outputs the second signal during a period in which the reference signal generation circuit 16 outputs the second reference signal, and stops outputting the second signal during a period in which the reference signal generation circuit 16 outputs the first reference signal.

The first comparison circuit 51 includes an input transistor Q1, a capacitive element AZC1, an auto-zero switch AZSW1, and a shut-off switch STSW1.

The input transistor Q1 is a P-channel MOS transistor, and the signal line 32 is connected to a source of the input transistor Q1. The capacitive element AZC1 is connected between a gate of the input transistor Q1 and the reference signal line RAMP. The auto-zero switch AZSW1 is connected between the gate and a drain of the input transistor Q1. The shut-off switch STSW1 is connected between the drain of the input transistor Q1 and the output node of the first comparison circuit 51.

The auto-zero switch AZSW1 is turned on in accordance with a timing of an initial voltage immediately before the signal level of the first reference signal starts to change with the first slope, and holds charges according to the initial voltage in the capacitive element AZC1. The shut-off switch STSW1 is provided to improve a speed (hereinafter, response speed) at which the output node of the first comparison circuit 51 is caused to transition to a low level.

The second comparison circuit 52 includes an input transistor Q2, a capacitive element AZC2, an auto-zero switch AZSW2, and a shut-off switch STSW2.

The input transistor Q2 is a P-channel MOS transistor, and the signal line 32 is connected to a source of the input transistor Q2. The capacitive element AZC2 is connected between a gate of the input transistor Q2 and the reference signal line RAMP. The auto-zero switch AZSW2 is connected between the gate and a drain of the input transistor Q2. The shut-off switch STSW2 is connected between the drain of the input transistor Q2 and the output node of the second comparison circuit 52.

The auto-zero switch AZSW2 is turned on in accordance with a timing of an initial voltage immediately before the signal level of the second reference signal starts to change with the second slope, and holds charges according to the initial voltage in the capacitive element AZC2. The shut-off switch STSW2 is provided to improve a speed (hereinafter, response speed) at which the output node of the second comparison circuit 52 is caused to transition to a low level.

The third comparison circuit 53 includes an input transistor Q3. The input transistor Q3 is, for example, a P-channel MOS transistor, and a gate of the input transistor Q3 is connected to the output wiring line CPout1 connected to a drain of the first comparison circuit 51 and a drain of the second comparison circuit 52. A drain of the input transistor Q3 is connected to the signal line 32, and a source is connected to the output wiring line CPout2 of the comparator 34.

In addition, the comparator 34 of FIG. 9 may have a band-limiting capacitance C1. The band-limiting capacitance C1 is connected between the signal line 32 and the output nodes of the first comparison circuit 51 and the second comparison circuit 52. The band-limiting capacitance C1 is provided, whereby a noise component greater than or equal to a cutoff frequency can be limited.

In addition, the comparator 34 of FIG. 9 may include a first clamp transistor Q4 and a second clamp transistor Q5. The first clamp transistor Q4 and the second clamp transistor Q5 are N-channel MOS transistors. A drain of the first clamp transistor Q4 is connected to the signal line 32, and a source of the first clamp transistor Q4 is connected to the output wiring line CPout1 of the first comparison circuit 51 and the second comparison circuit 52. A drain of the second clamp transistor Q5 is connected to the signal line 32, and a source of the second clamp transistor Q5 is connected to the output wiring line CPout2 of the third comparison circuit 53. The first clamp transistor Q4 and the second clamp transistor Q5 are provided to suppress a decrease in drain voltages thereof when the input transistors Q1 and Q2 are turned off.

Furthermore, the comparator 34 of FIG. 9 may include a third clamp transistor Q6. The third clamp transistor Q6 is, for example, a P-channel MOS transistor, in which a gate and a drain are short-circuited.

In addition, the third comparison circuit 53 of FIG. 9 may include a comparison output switch CSW. The comparison output switch CSW switches whether or not to short-circuit the output wiring line CPout2 of the third comparison circuit 53 and the signal line 32. The comparison output switch CSW is temporarily turned on in accordance with a timing of the reference signal line RAMP.

Figure 10:
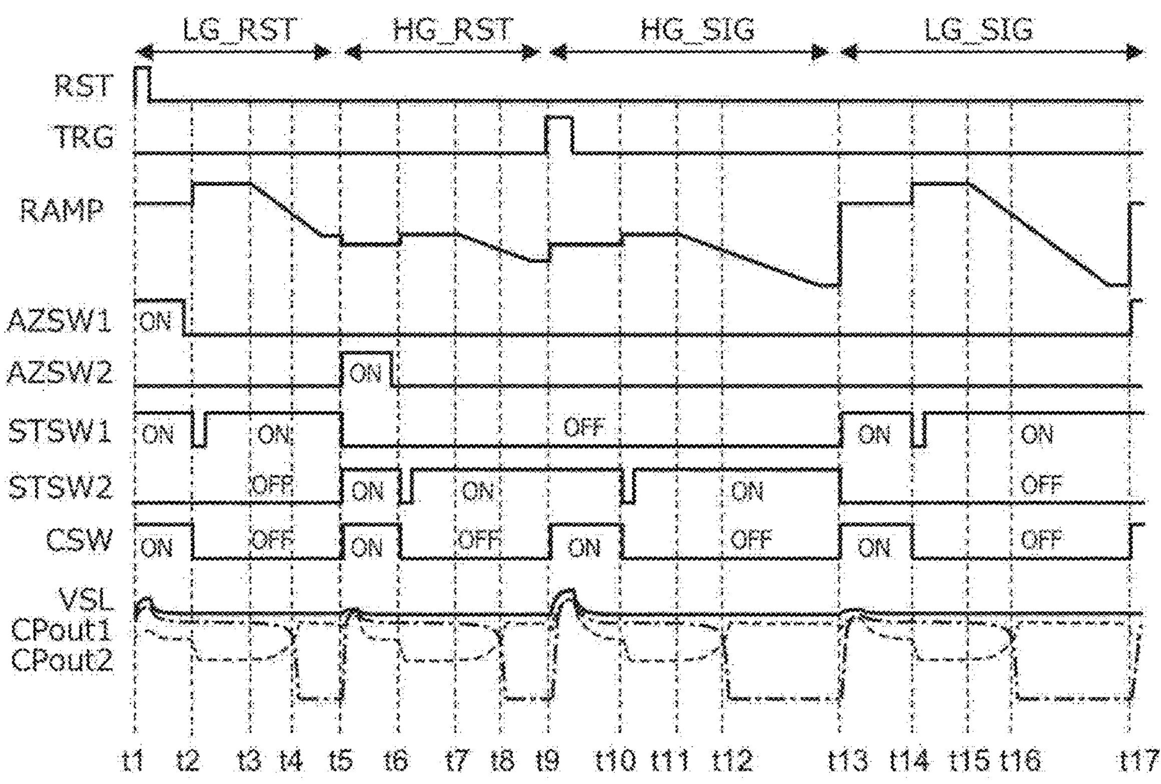
FIG. 10 is a timing diagram of the comparator of FIG. 9.

FIG. 10 is a timing diagram of the comparator 34 of FIG. 9. FIG. 10 illustrates an example in which processing of comparison is performed while implementing the HDR function.

The reference signal generation circuit 16 supplies in order the first reference signal for a reset level LG_RST of the first gain LG, the second reference signal for a reset level HG_RST of the second gain HG, the second reference signal for a signal level HG_SIG of the second gain HG, and the first reference signal for a signal level LG_SIG of the first gain LG to the reference signal line RAMP.

The timing diagram of FIG. 10 illustrates an example in which a dark place is imaged. When a dark place is imaged, a signal voltage (the first input signal and the second input signal) VSL on the signal line 32 has almost the same voltage level in both the reset level and the signal level. In FIG. 10, the signal voltage VSL is indicated by a solid line, the output wiring line CPout1 of the first comparison circuit 51 is indicated by a broken line, and the output wiring line CPout2 of the second comparison circuit 52 is indicated by a one-dot chain line.

At time t1, the reset transistor 23 in the pixel 20 is turned on, and the pixel 20 outputs a pixel signal according to the reset level to the corresponding signal line 32. During a period from time t1 to time t2, the auto-zero switch AZSW1 and the shut-off switch STSW1 in the first comparison circuit 51 are turned on. At this time, the auto-zero switch AZSW2 and the shut-off switch STSW2 in the second comparison circuit 52 are turned off. Furthermore, the comparison output switch CSW in the third comparison circuit 53 is turned on. As a result, charges according to an initial voltage for the reset level LG_RST of the first gain LG are held in the capacitive element AZC1 in the first comparison circuit 51. At this time, the shut-off switch STSW1 in the first comparison circuit 51 is turned on, and a current of the first current source 54 is supplied to the input transistor Q1.

At time t2, the signal level of the first reference signal is once raised, and thereafter, the signal level decreases with the first slope during a period from time t3 to time t5. At time t4, the input transistor Q1 in the first comparison circuit 51 operates to be turned on, and the signal level of the output node in the first comparison circuit 51 increases. Since the output wiring line CPout1 in the first comparison circuit 51 is input to the gate of the input transistor Q3 in the third comparison circuit 53, the input transistor Q3 in the third comparison circuit 53 operates to be turned off, and a current is drawn by the second current source 55 in the output wiring line CPout2 of the third comparison circuit 53, so that the voltage of the output wiring line CPout2 of the third comparison circuit 53 decreases.

During a period from time t5 to time t6, the auto-zero switch AZSW2 and the shut-off switch STSW2 in the second comparison circuit 52 are turned on. At this time, the auto-zero switch AZSW1 and the shut-off switch STSW1 in the first comparison circuit 51 are turned off. Furthermore, the comparison output switch CSW in the third comparison circuit 53 is turned on. As a result, charges according to an initial voltage for the reset level HG_RST of the second gain HG are held in the capacitive element AZC2 in the second comparison circuit 52. At this time, the shut-off switch STSW2 in the second comparison circuit 52 is turned on, and the current of the first current source 54 is supplied to the input transistor Q2.

At time t6, the signal level of the second reference signal is once raised, and thereafter, the signal level decreases with the second slope during a period from time t7 to time t9. At time t8, the input transistor Q2 in the second comparison circuit 52 operates to be turned on, and the signal level of the output node in the second comparison circuit 52 increases. Since the output wiring line CPout1 in the second comparison circuit 52 is input to the gate of the input transistor Q3 in the third comparison circuit 53, the input transistor Q3 operates to be turned off, and the voltage of the output wiring line CPout2 of the third comparison circuit 53 decreases.

At time t9, the transfer transistor in the pixel 20 is temporarily turned on, and the charges photoelectrically converted by the photodiode are transferred to the floating diffusion.

The comparison output switch CSW in the third comparison circuit 53 is turned on during a period from time t9 to time t10, and the output wiring line CPout2 of the third comparison circuit 53 coincides with the signal voltage on the signal line 32.

Thereafter, from time t10 to time t13, the shut-off switch STSW2 in the second comparison circuit 52 is turned on, and the second reference signal for the signal level HG_SIG of the second gain HG is supplied to the gate of the input transistor Q2. At time t12, the input transistor Q2 in the second comparison circuit 52 operates to be turned on, the signal level of the output wiring line CPout1 in the second comparison circuit 52 increases, the input transistor Q3 in the third comparison circuit 53 operates to be turned off, and the voltage of the output wiring line CPout2 of the third comparison circuit 53 decreases.

During a period from time t13 to time t14, the shut-off switch STSW1 in the first comparison circuit 51 is turned on, and the comparison output switch CSW in the third comparison circuit 53 is turned on.

Thereafter, from time t14 to time t17, the shut-off switch STSW1 in the first comparison circuit 51 is turned on, and the first reference signal for the signal level LG_SIG of the first gain LG is supplied to the gate of the input transistor Q1. At time t16, the input transistor Q1 in the first comparison circuit 51 operates to be turned on, the signal level of the output node in the first comparison circuit 51 increases, the input transistor Q3 in the third comparison circuit 53 operates to be turned off, and the output wiring line CPout2 of the third comparison circuit 53 decreases.

As can be seen from FIG. 10, the comparator 34 according to the first embodiment performs in order processing of comparison of the reset level LG_RST of the first gain LG, processing of comparison of the reset level HG_RST of the second gain HG, processing of comparison of the signal level HG_SIG of the second gain HG, and processing of comparison of the signal level LG_SIG of the first gain LG. In these four types of processing of comparison, lowest signal levels of the first reference signal and the second reference signal are brought to a ground potential side. As a result, a potential level of the reference signal line RAMP can be entirely suppressed, and the power consumption of the imaging device 1 can be reduced.

As described above, the comparator 34 according to the first embodiment is provided with the first comparison circuit 51 that performs the processing of comparison of the reset level of the first gain LG and the processing of comparison of the signal level of the first gain LG, and the second comparison circuit 52 that performs the processing of comparison of the reset level of the second gain HG and the processing of comparison of the signal level of the second gain HG, so that it is possible to perform AD conversion processing with two different gains in one exposure, and it is possible to perform the processing of the single-exposure HDR function in the comparator 34.

The comparator 34 according to the first embodiment continuously performs the processing of comparison of the reset level of the first gain LG and the processing of comparison of the reset level of the second gain HG, and thereafter, continuously performs the processing of comparison of the signal level of the second gain HG and the processing of comparison of the signal level of the first gain LG, so that a plurality of times of the AD conversion processing can be performed while the number of resets of the pixel 20 is minimized, and thus, an S/N ratio can be improved.

Furthermore, in the present embodiment, since the processing of comparison in the first comparison circuit 51 and the second comparison circuit 52 is switched using the shut-off switch STSW1 and the shut-off switch STSW2 originally provided for improving responsiveness, a separate signal or switch for switching the processing of comparison is not required, and the circuit configuration can be simplified.

Moreover, the lowest signal levels of the first reference signal and the second reference signal supplied via the reference signal line RAMP are brought to the ground potential side, whereby power consumption can be reduced.

Second Embodiment

In a second embodiment, a function of switching photoelectric conversion efficiency is provided in the pixel 20.

Figure 11:
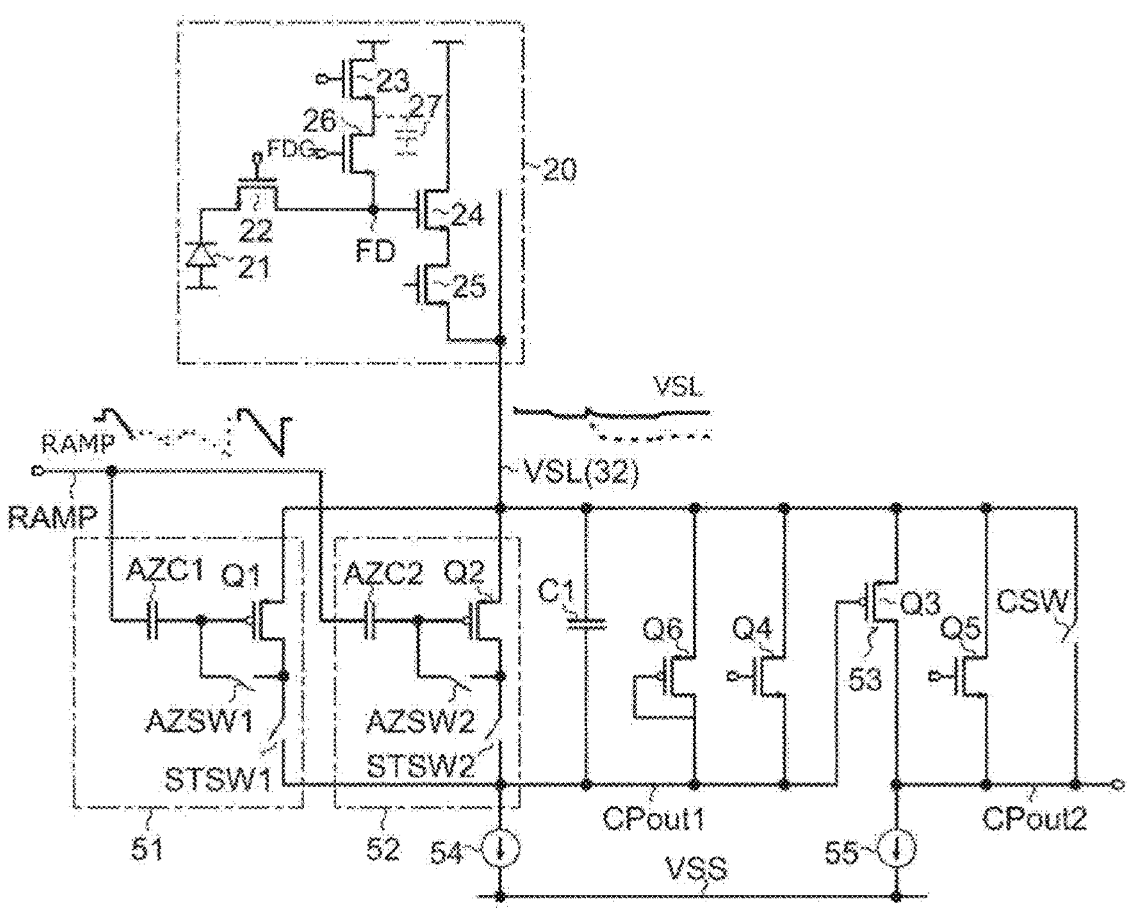
FIG. 11 is a circuit diagram of a pixel and a comparator in an imaging device according to a second embodiment.

FIG. 11 is a circuit diagram of the pixel 20 and the comparator 34 in the imaging device 1 according to the second embodiment. An internal configuration of the comparator 34 of FIG. 11 is the same as that of FIG. 9. The pixel 20 of FIG. 11 includes a conversion efficiency switching transistor 26 in addition to the configuration of the pixel 20 of FIG. 9.

The conversion efficiency switching transistor 26 is connected between the reset transistor 23 and the floating diffusion. The conversion efficiency switching transistor 26 is, for example, an N-channel MOS transistor, and between a drain thereof and the ground node, a charge accumulation section 27 is provided. The charge accumulation section 27 may be an individual capacitive element, or a parasitic capacitance of the conversion efficiency switching transistor 26 and the reset transistor 23.

A control signal FDG is input to a gate of the conversion efficiency switching transistor 26, and on/off of the conversion efficiency switching transistor 26 is switched by the control signal FDG. When the conversion efficiency switching transistor 26 is turned on, the charge accumulation section 27 and the floating diffusion are coupled with each other, and a total amount capable of storing photoelectrically converted charges increases. As a result, while the photoelectric conversion efficiency is lowered, the charges can be accumulated without overflowing even with high luminance. Conversely, when the conversion efficiency switching transistor 26 is turned off, the photoelectrically converted charges can be accumulated only in the floating diffusion. As a result, while the photoelectric conversion efficiency increases, the charges easily overflows with high luminance.

As described above, it is desirable to turn on the conversion efficiency switching transistor 26 under a high luminance environment, and it is desirable to turn off the conversion efficiency switching transistor 26 under a low luminance environment. That is, it is desirable that the conversion efficiency switching transistor 26 is turned on when the processing of comparison of a first level LG is performed, and the conversion efficiency switching transistor 26 is turned off when the processing of comparison of a second level HG is performed.

Figure 12:
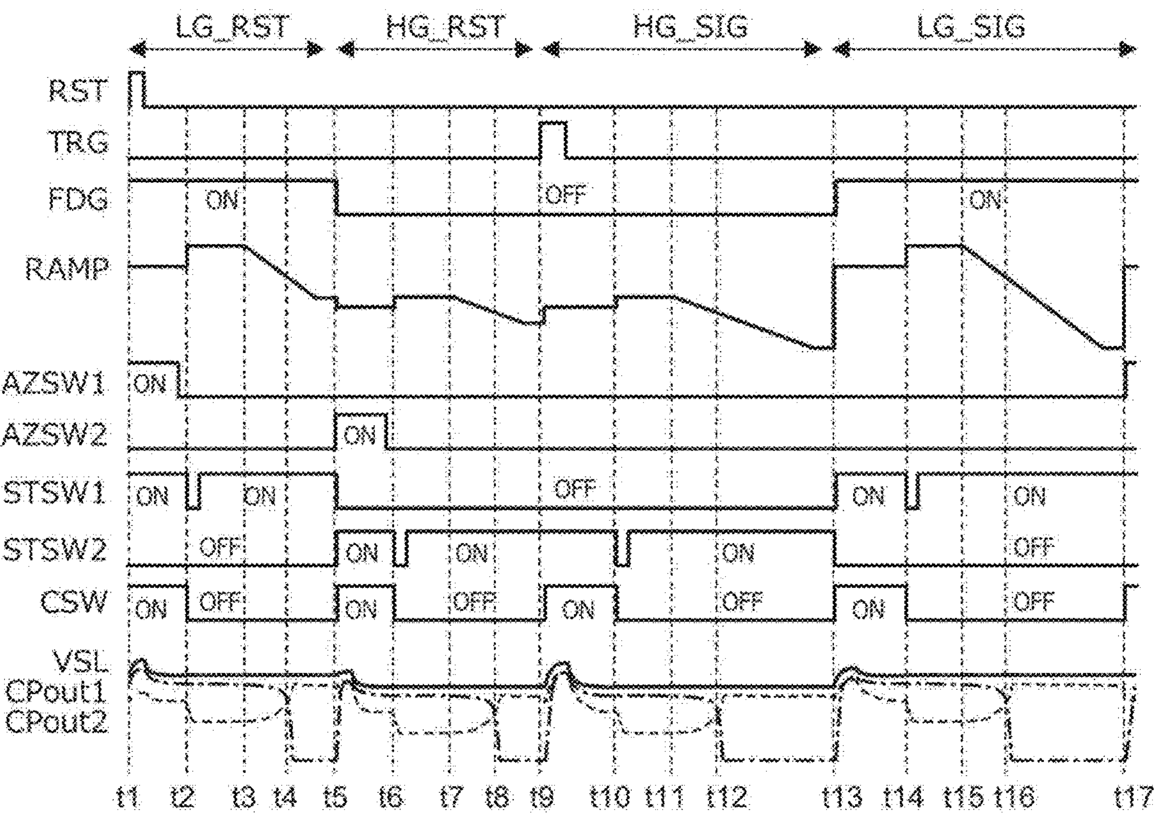
FIG. 12 is a timing diagram of the comparator of FIG. 11.

FIG. 12 is a timing diagram of the comparator 34 of FIG. 11. The timing diagram of FIG. 12 is obtained by adding a signal waveform of the control signal FDG to the timing diagram of FIG. 10, and timings of the other signals are similar to those of FIG. 10. Note that, in a case where conversion efficiency switching is used in combination with switching of gain, the first slope of the first reference signal and the second slope of the second reference signal may be different from each other or the same as each other.

As illustrated in FIG. 12, the conversion efficiency switching transistor 26 is turned on in a period (from time t1 to time t5) of processing of comparison of the reset level of the first gain LG and a period (from time t13 to time t17) of processing of comparison of the signal level of the first gain LG, and the conversion efficiency switching transistor 26 is turned off in a period (from time t5 to time t9) of the processing of comparison of the reset level of the second gain HG and a period (from time t9 to time t13) of the processing of comparison of the signal level of the second gain HG.

When the conversion efficiency switching transistor 26 is turned on, the pixel signal can be output from the pixel 20 without causing blown out highlights even under the high luminance environment, so that a dynamic range of the processing of comparison in the comparator 34 is improved.

As described above, in the second embodiment, since the photoelectric conversion efficiency of the pixel 20 is switched in synchronization with the switching of the gain, AD conversion can be accurately performed from low luminance to high luminance.

Third Embodiment

In the first, an example has been described in which the processing of comparison between the reference signal and the input signal is performed in the order of the reset level of the first gain LG→the reset level of the second gain HG→the signal level of the second gain HG→the signal level of the first gain LG; however, this order can be changed.

Figure 13:
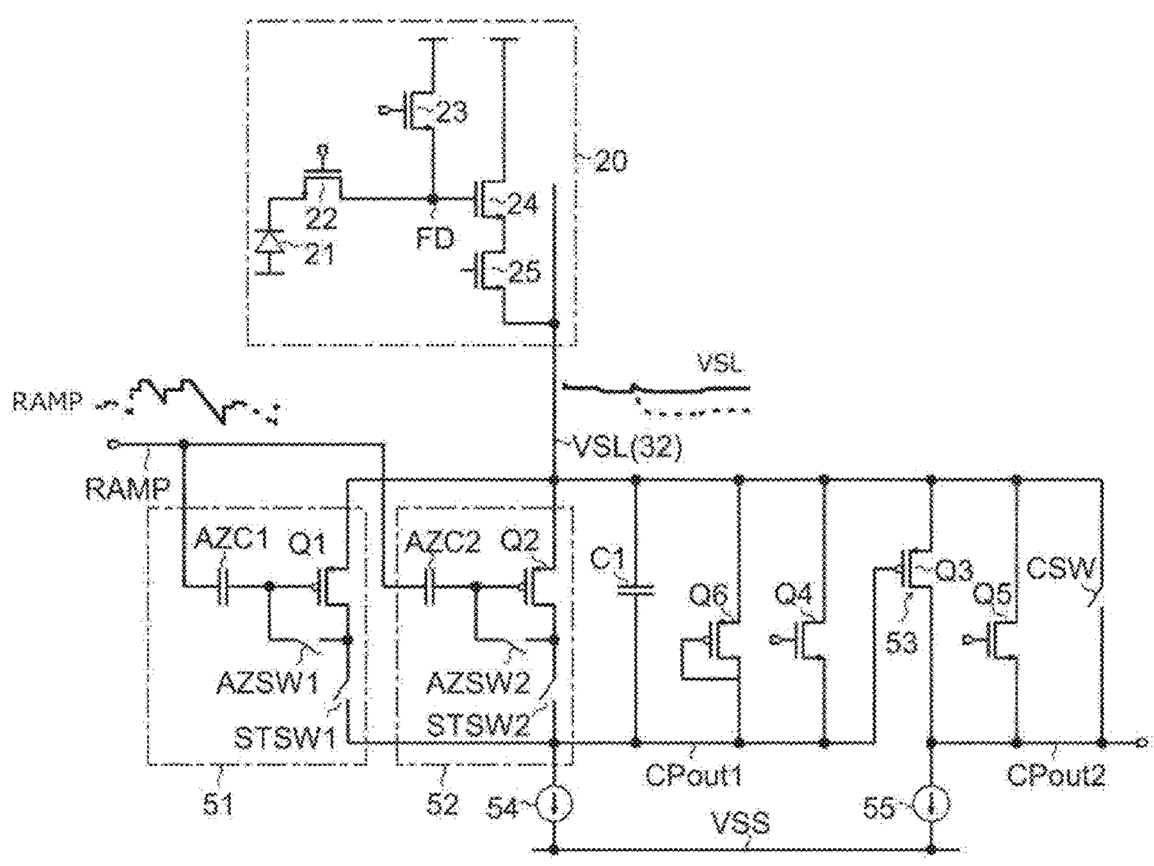
FIG. 13 is a circuit diagram of a comparator in an imaging device according to a third embodiment.
Figure 14:
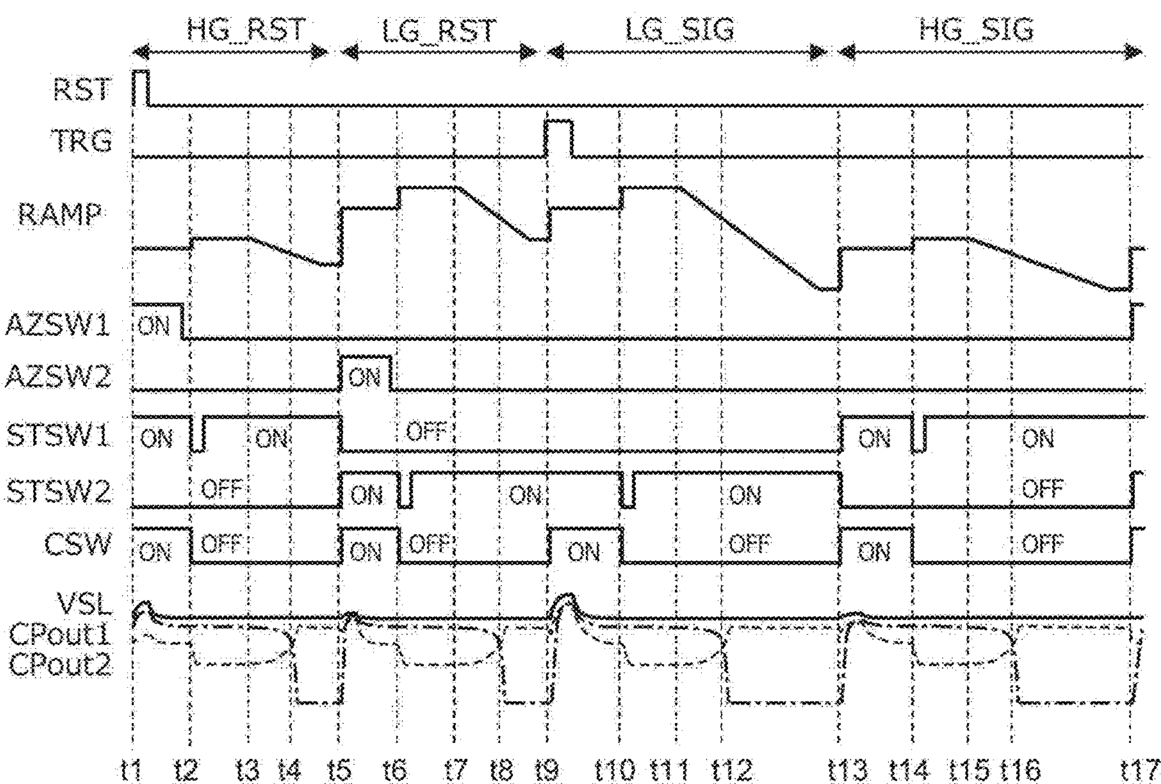
FIG. 14 is a timing diagram of the comparator of FIG. 13.

FIG. 13 is a circuit diagram of the comparator 34 in the imaging device 1 according to a third embodiment, and FIG. 14 is a timing diagram of the comparator 34 of FIG. 13. The circuit configuration of the comparator 34 of FIG. 13 is the same as that of FIG. 9, but the signal waveform on the reference signal line RAMP is different from that of FIG. 9.

The first reference signal and the second reference signal are supplied to the reference signal line RAMP connected to the comparator 34 of FIG. 13 at a timing different from that for the reference signal line RAMP connected to the comparator 34 of FIG. 9. More specifically, the signals are supplied via the reference signal line RAMP to the comparator 34 of FIG. 9 in the order of the first reference signal of the reset level of the first gain LG→the second reference signal of the reset level of the second gain HG→the second reference signal of the signal level of the second gain HG→the first reference signal of the signal level of the first gain LG. On the other hand, the signals are supplied via the reference signal line RAMP to the comparator 34 of FIG. 13 in the order of the second reference signal of the reset level of the second gain HG→the first reference signal of the reset level of the first gain LG→the first reference signal of the signal level of the first gain LG→the second reference signal of the signal level of the second gain HG.

In the comparator 34 of FIG. 9, the processing of comparison of the reset level of the second gain HG and the processing of comparison of the signal level are continuously performed in the second and third processing of comparison among the four types of processing of comparison. Since the processing of comparison of the second gain HG is more sensitive to noise than the processing of comparison of the first gain LG, it is desirable to continuously perform the processing of comparison of the reset level of the second gain HG and the processing of comparison of the signal level as illustrated in FIG. 9. However, the processing of comparison of the reset level of the second gain HG and the processing of comparison of the signal level can be performed without being continuous as illustrated in FIG. 13.

In a case where the conversion efficiency switching transistor 26 similar to that of FIG. 11 is provided in the pixel 20 connected to the comparator 34 of FIG. 13, it is necessary to perform the processing of comparison of the signal level of the first gain LG before performing the processing of comparison of the signal level of the second gain HG. This is because the charges of the floating diffusion cannot be restored after redistribution of the charges of the floating diffusion is performed using the charge accumulation section 27. For this reason, in a case where the processing of comparison of the signal level of the first gain LG is performed after the processing of comparison of the signal level of the second gain HG as illustrated in FIG. 14, the photoelectric conversion efficiency cannot be switched by the conversion efficiency switching transistor 26.

As described above, even in a case where the processing of comparison is performed in an order different from that in the first embodiment, the HDR function can be implemented.

Fourth Embodiment

In a fourth embodiment, a switch is provided on the reference signal line RAMP connected to the first comparison circuit 51 and the second comparison circuit 52, and it is enabled to provide a standard signal having a fixed signal level to the reference signal line RAMP.

Figure 15:
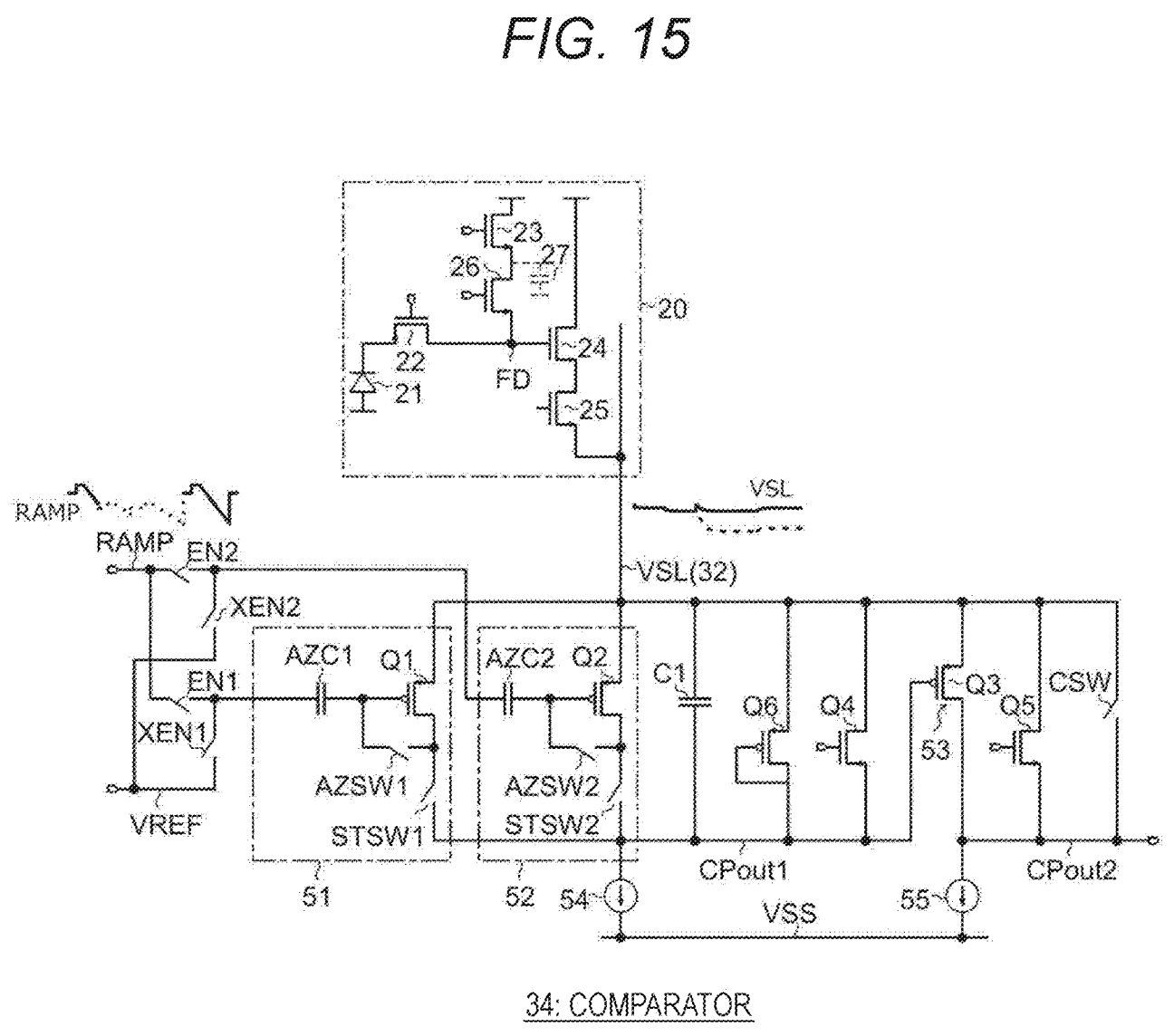
Figure 16:
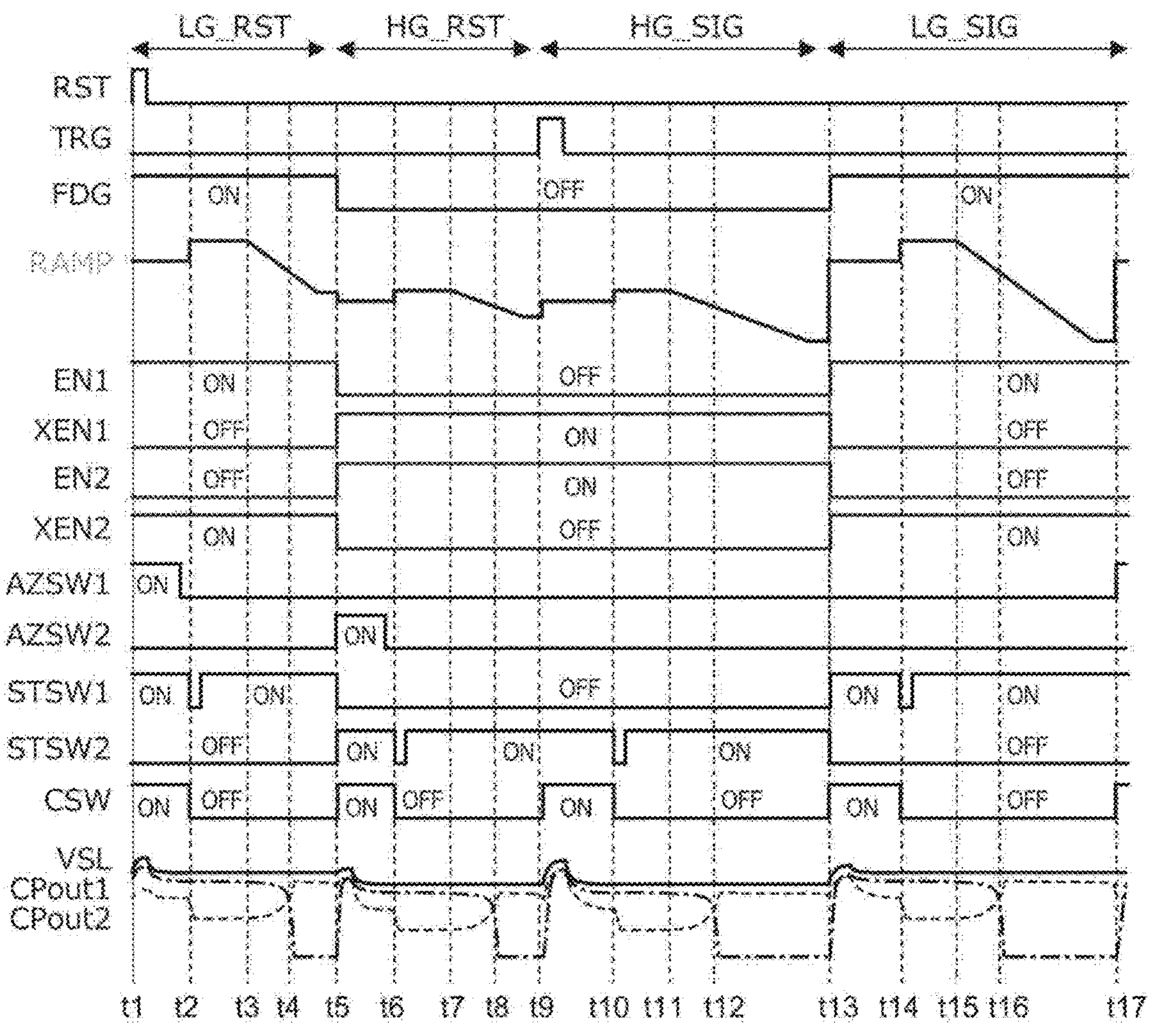
FIG. 16 is a timing diagram of the comparator of FIG. 15.

FIG. 15 is a circuit diagram of the comparator 34 in the imaging device 1 according to the fourth embodiment, and FIG. 16 is a timing diagram of the comparator 34 of FIG. 15.

The comparator 34 of FIG. 15 includes a switch EN1, a switch EN2, a switch XEN1, and a switch XEN2 in addition to the configuration of the comparator 34 of FIG. 11. Note that the pixel 20 connected to the comparator 34 of FIG. 15 includes the conversion efficiency switching transistor 26, but this transistor may be omitted. That is, the switch EN1, the switch EN2, the switch XEN1, and the switch XEN2 may be added to the comparator 34 of FIG. 9.

The switch EN1 switches whether or not to input the first reference signal on the reference signal line RAMP to the first comparison circuit 51. The switch EN2 switches whether or not to input the second reference signal on the reference signal line RAMP to the second comparison circuit 52. The switch XEN1 switches whether or not to input a standard signal VREF to the first comparison circuit 51. The switch XEN2 switches whether or not to input the standard signal VREF to the second comparison circuit 52.

When the processing of comparison of the reset level or the signal level of the first gain LG is performed (from time t1 to time t5 and from time t13 to time t17 in FIG. 16), the switch EN1 is turned on, and the first reference signal on the reference signal line RAMP is input to the first comparison circuit 51. At this time, the switch XEN1 and the switch EN2 are turned off, and the switch XEN2 is turned on. Thus, the standard signal VREF is input to the second comparison circuit 52.

On the other hand, when the processing of comparison of the reset level or the signal level of the second gain HG is performed (from time t5 to time t13 in FIG. 16), the switch EN2 is turned on, and the second reference signal on the reference signal line RAMP is input to the second comparison circuit 52. At this time, the switch XEN2 and the switch EN1 are turned off, and the switch XEN1 is turned on. Thus, the standard signal VREF is input to the first comparison circuit 51.

The standard signal VREF is a voltage signal having a fixed voltage level, and may be, for example, a ground voltage or another voltage. Among the first comparison circuit 51 and the second comparison circuit 52, the standard signal VREF is input to processing of comparison that does not perform processing of comparison, so that a possibility can be prevented that a potential of the output node of the comparison circuit that does not perform processing of comparison unintentionally varies.

Although the first comparison circuit 51 and the second comparison circuit 52 turn off the shut-off switch STSW1 or STSW2 when the processing of comparison is not performed, there may be a possibility that the result of comparison may deviate due to an influence of an unintended parasitic capacitance or the like. In the comparator 34 of FIG. 15, the standard signal VREF is input to the comparison circuit that does not perform the processing of comparison among the first comparison circuit 51 and the second comparison circuit 52, so that it is possible to suppress variation in an output potential of the comparator 34 of FIG. 13 in combination with the shut-off switches STSW1 and STSW2.

As described above, in the fourth embodiment, since the switch EN1, the switch EN2, the switch XEN1, and the switch XEN2 are provided at input stages of the first comparison circuit 51 and the second comparison circuit 52, the first reference signal or the second reference signal is input only to the comparison circuit that performs the processing of comparison, and the standard signal VREF is input to the comparison circuit that does not perform the processing of comparison. As a result, the result of comparison is not affected by the parasitic capacitance or the like.

Fifth Embodiment

In a fifth embodiment, a buffer is connected on the reference signal line RAMP.

Figure 17:
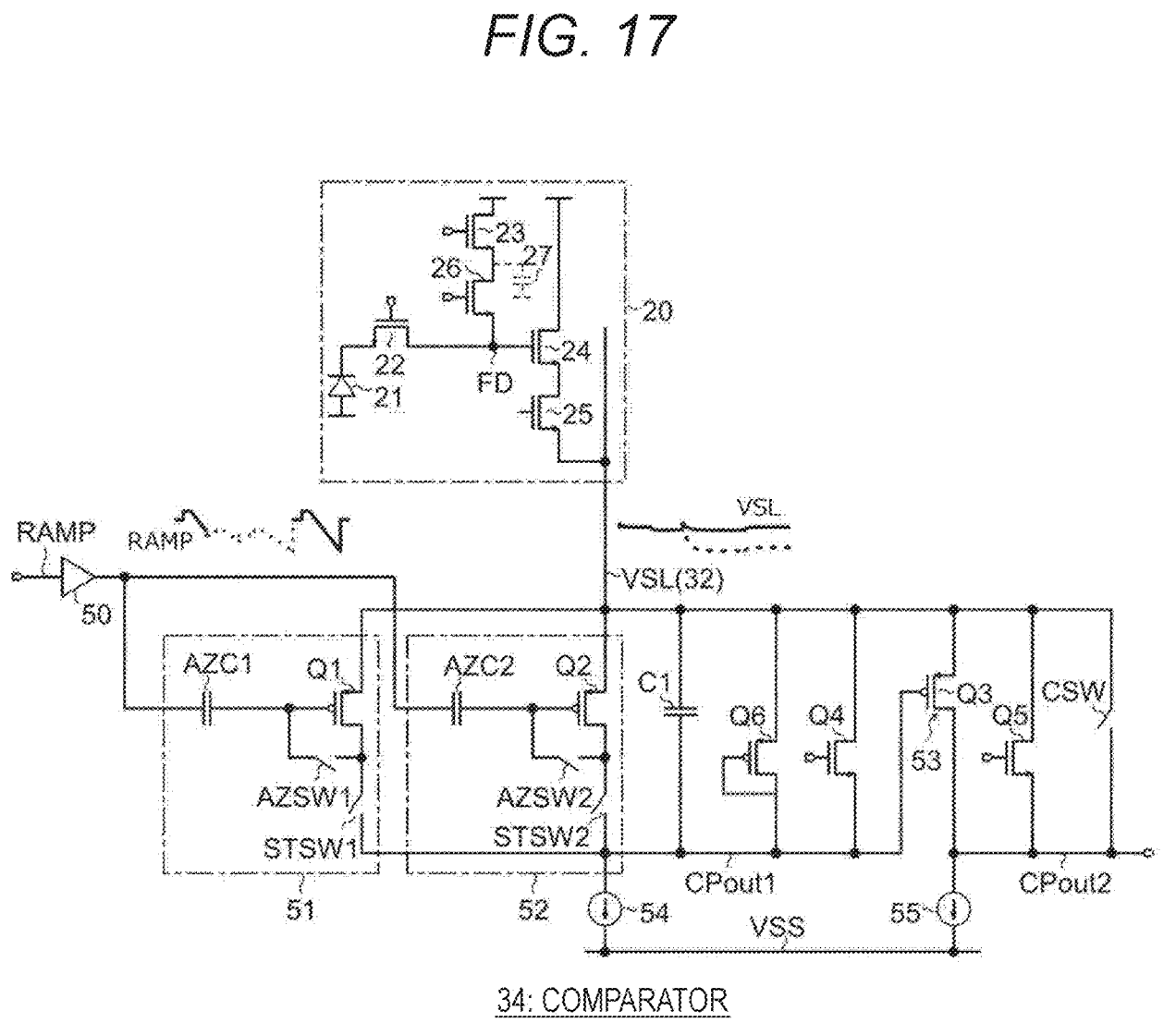

FIG. 17 is a circuit diagram of the comparator 34 in the imaging device 1 according to the fifth embodiment. The comparator 34 of FIG. 17 has a configuration in which the buffer 50 is added to the comparator 34 of FIG. 11. Note that the buffer 50 may be added to the comparator 34 of FIG. 9.

The buffer 50 is connected to the reference signal line RAMP. The first reference signal on the reference signal line RAMP is input to the first comparison circuit 51 after being subjected to buffer 50 ring in the buffer 50. The second reference signal on the reference signal line RAMP is input to the second comparison circuit 52 after being subjected to buffer 50 ring in the buffer 50.

The buffer 50 increases driving power of the first reference signal and the second reference signal and reduces an output impedance. The buffer 50 is provided, whereby the capacitive elements AZC1 and AZC2 can be easily driven, and inter-column interference can be prevented.

Figure 18:
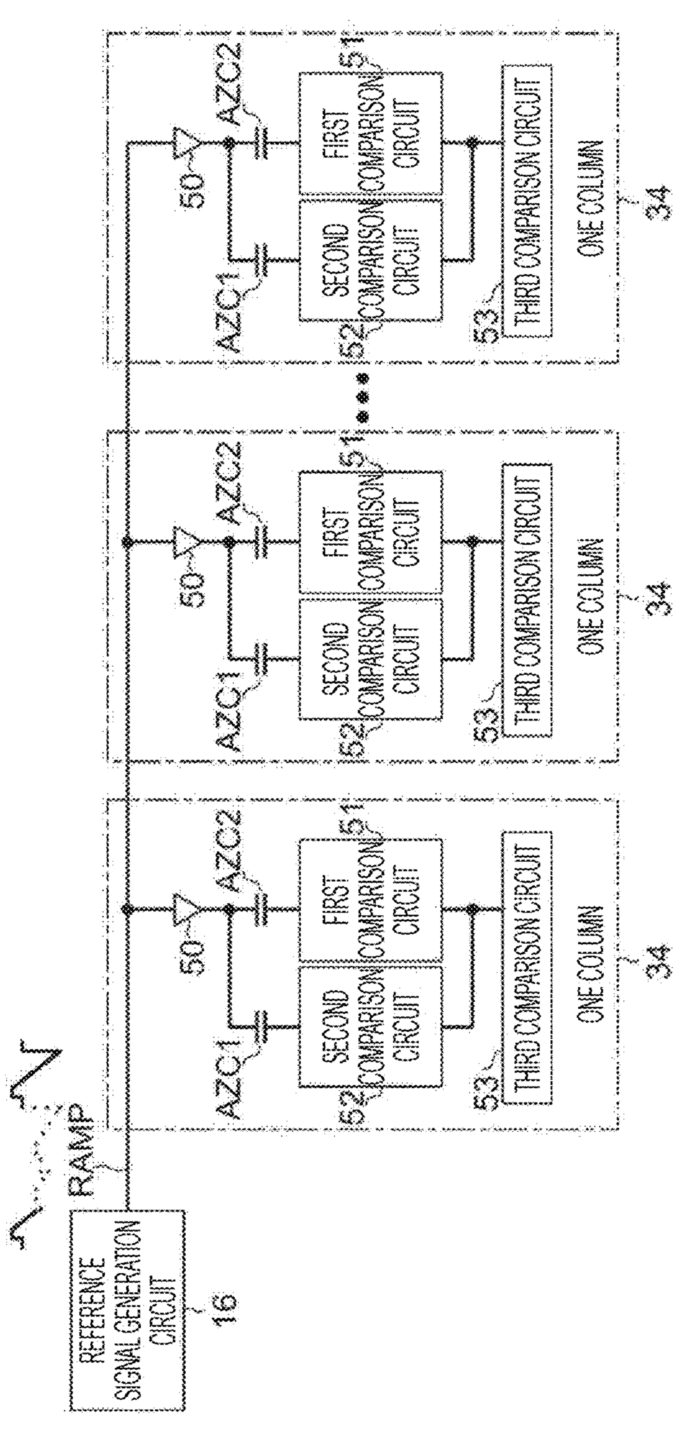
FIG. 18 is a diagram illustrating an example in which the comparator of FIG. 17 is disposed for each column.

FIG. 18 is a diagram illustrating an example in which the comparator 34 of FIG. 17 is disposed for each column. The buffer 50 is provided for each column. As a result, inter-column interference can be suppressed.

Figure 19:
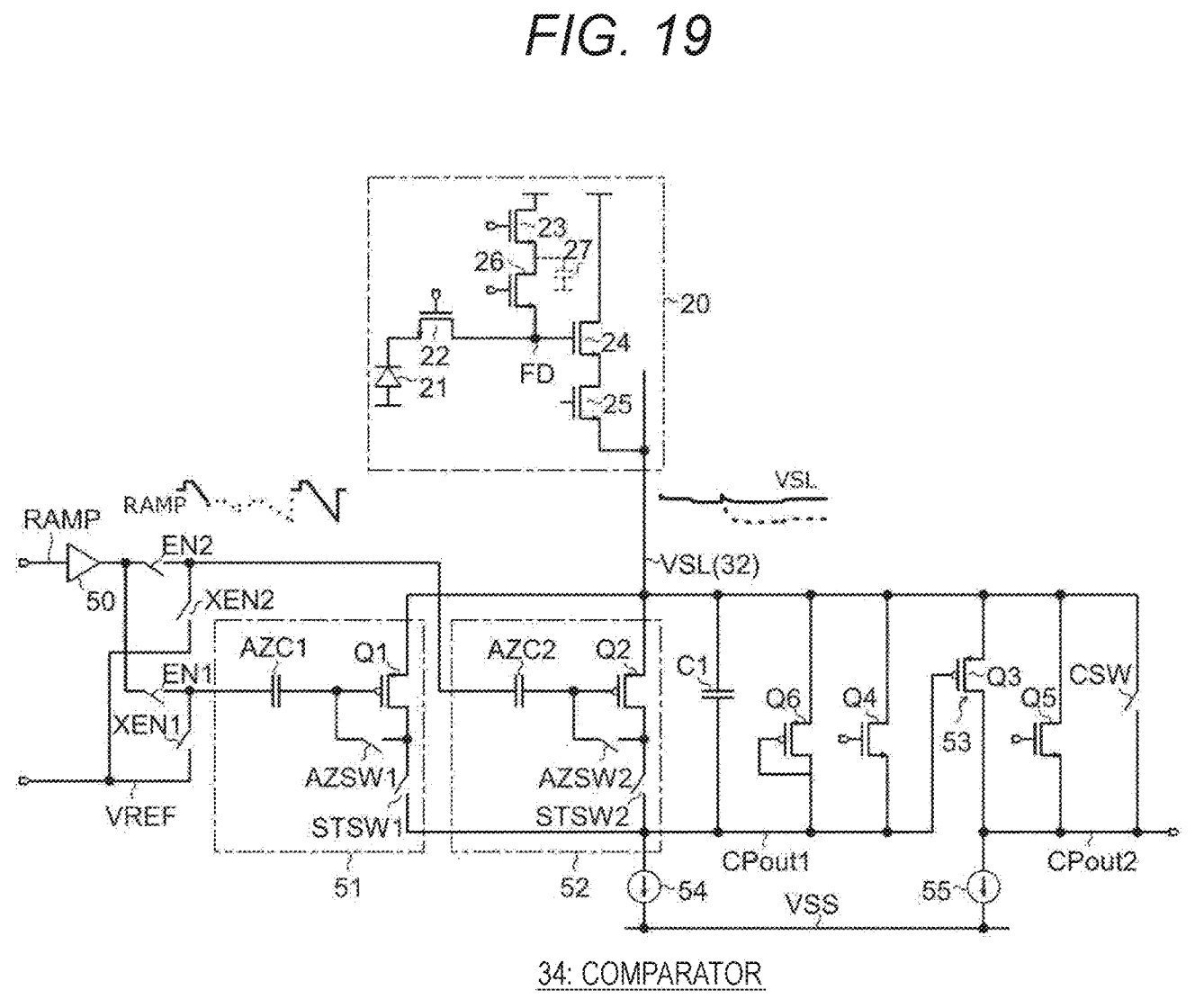

FIG. 19 is a circuit diagram of the comparator 34 according to a first modification of FIG. 17. The comparator 34 of FIG. 19 includes the switch EN1, the switch EN2, the switch XEN1, and the switch XEN2 in addition to the configuration of the comparator 34 of FIG. 17, similarly to FIG. 15.

In the example of FIG. 19, the buffer 50 is connected to the reference signal line RAMP, but the buffer 50 is not connected to a standard signal VREF line. However, another buffer 50 may also be connected to the standard signal VREF line.

Figure 20:
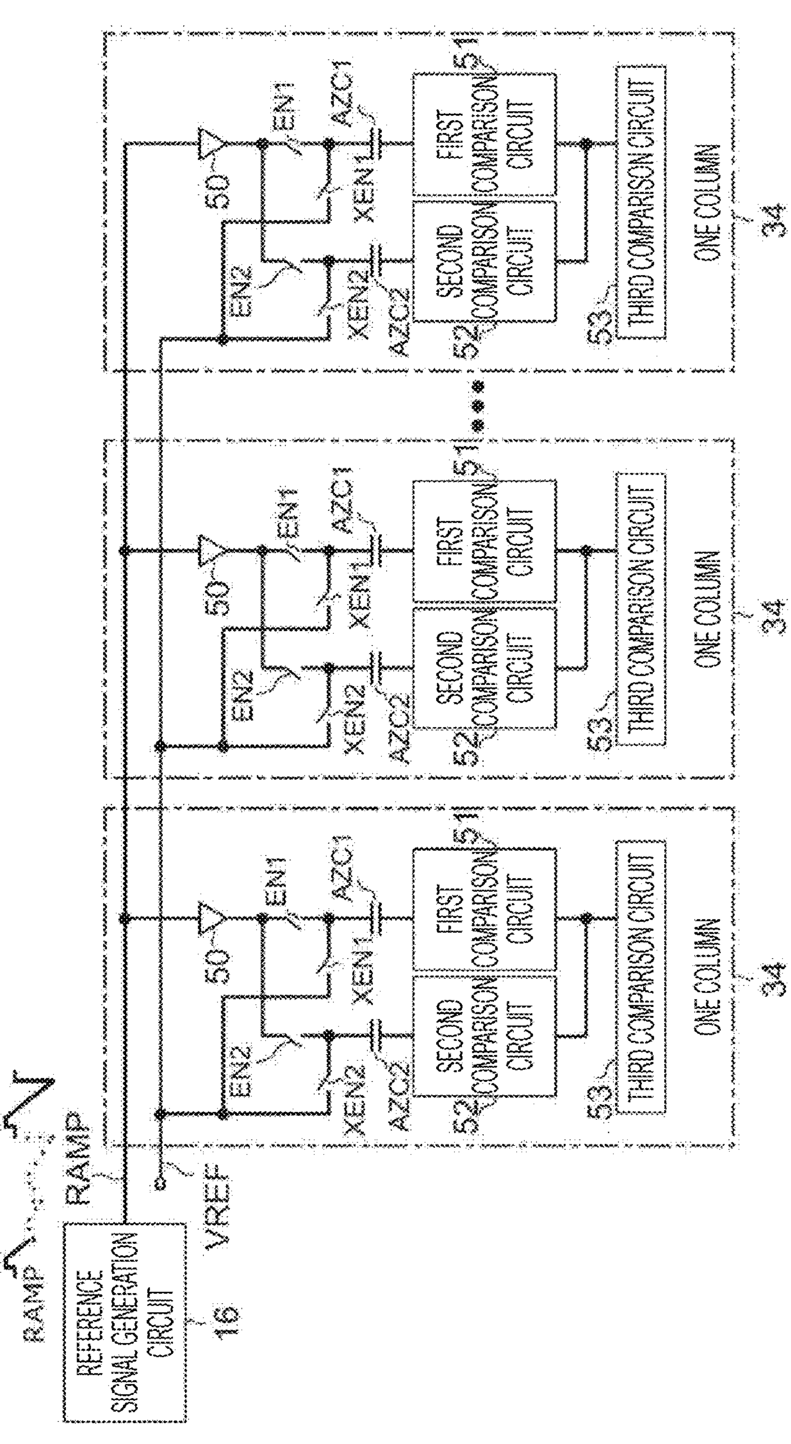
FIG. 20 is a diagram illustrating an example in which the comparator of FIG. 19 is disposed for each column.

FIG. 20 is a diagram illustrating an example in which the comparator 34 of FIG. 19 is disposed for each column. As illustrated, the buffer 50, the switch EN1, the switch EN2, the switch XEN1, and the switch XEN2 are provided for each column.

Figure 21:
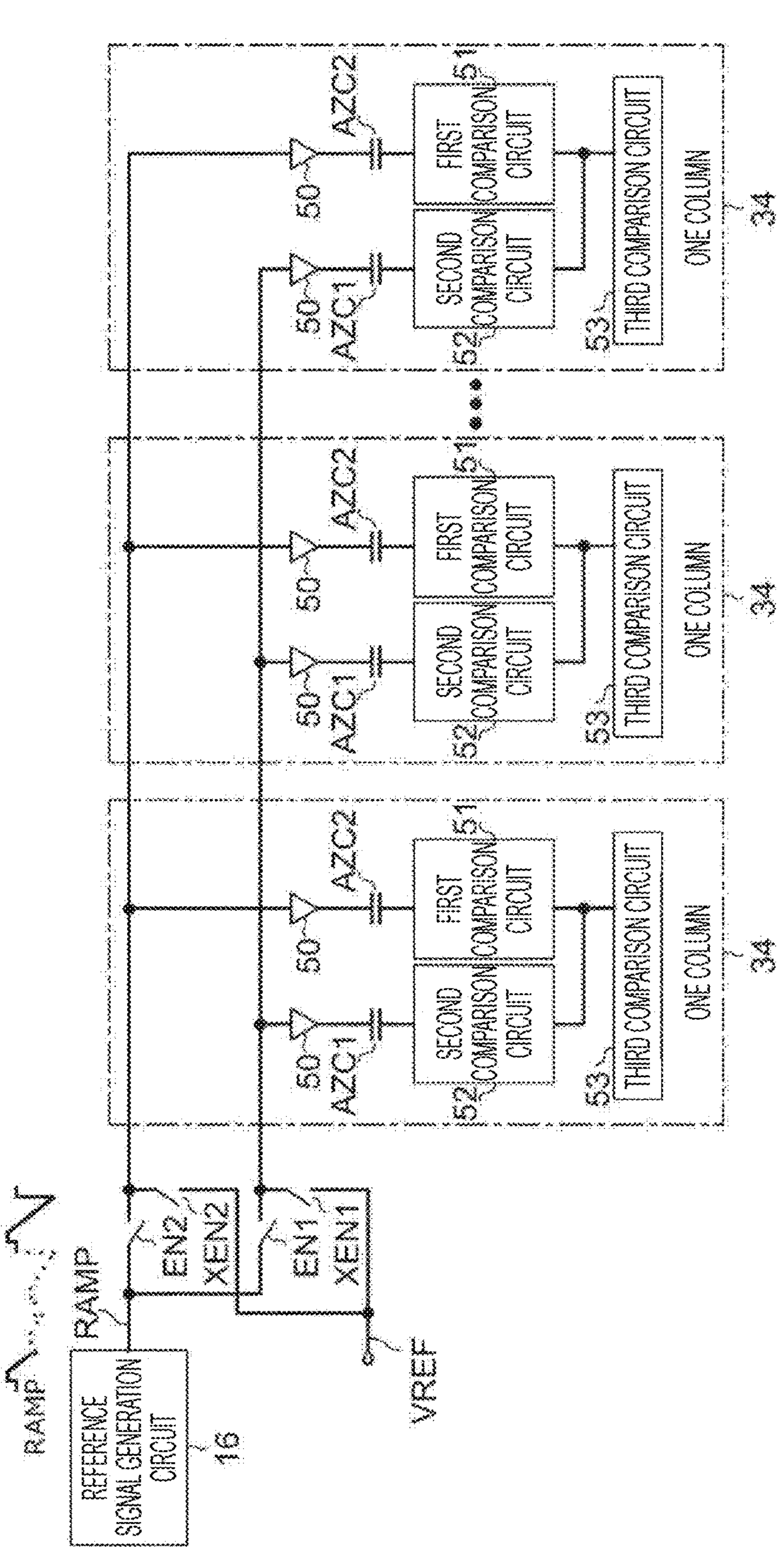
FIG. 21 is a diagram illustrating a modification of FIG. 20, which is an example in which a buffer is also connected to a standard signal line.

FIG. 21 is a diagram illustrating a modification of FIG. 20, which is an example in which the buffer 50 is also connected to the standard signal VREF line. Furthermore, in FIG. 21, the switch EN1, the switch EN2, the switch XEN1, and the switch XEN2 are shared by all the columns, and two buffers 50 are provided for each column at the subsequent stage of these switches. With such a configuration, the number of switches can be greatly reduced. Furthermore, since the buffer 50 is provided for each column, load capacitances of the reference signal line RAMP and the standard signal VREF line can be reduced, and inter-column interference can be suppressed.

FIG. 22 is a circuit diagram of the comparator 34 according to a second modification of FIG. 17. The comparator 34 of FIG. 22 includes capacitive elements AZC3 and AZC4 in addition to the configuration of the comparator 34 of FIG. 19. The capacitive element AZC1 and the capacitive element AZC3 in the first comparison circuit 51 are both variable capacitive elements. Similarly, both the capacitive element AZC2 and the capacitive element AZC4 in the second comparison circuit 52 are variable capacitive elements.

The capacitive element AZC3 in the first comparison circuit 51 is connected between the gate of the input transistor Q1 and a standard potential VSScap. The capacitive element AZC4 in the second comparison circuit 52 is connected between the gate of the input transistor Q2 and the standard potential VSScap.

The capacitive element AZC3 is added, whereby a signal subjected to capacitive voltage division by the capacitive element AZC1 and the capacitive element AZC3 is input to the gate of the input transistor Q1 in the first comparison circuit 51. The same applies to the second comparison circuit 52. Noise superimposed on the first reference signal and the second reference signal can be reduced by capacitance attenuation by the capacitive voltage division.

Since the capacitive element AZC1 and the capacitive element AZC3 are variable capacitive elements, an attenuation ratio of the capacitance attenuation can be arbitrarily set. For example, the attenuation ratio of the capacitance attenuation by the variable capacitive element AZC1 and the variable capacitive element AZC3 can be set according to an analog gain of the analog-digital converter 33 including the comparator 34.

In a case where the buffer 50 is provided on the reference signal line RAMP as illustrated in FIG. 17, there is a possibility that the result of comparison is affected by noise of the buffer 50 itself, but it is possible to reduce the noise by performing capacitance attenuation by the capacitive voltage division.

Note that the capacitive elements AZC3 and AZC4 of FIG. 22 may be provided in the comparator 34 including no buffer 50 on the reference signal line RAMP as in the comparator 34 of FIG. 9, 11, 13, or 15.

As described above, in the fifth embodiment, the buffer 50 is provided on the reference signal line RAMP, whereby interference between columns can be suppressed. Furthermore, characteristics of the result of comparison may be deteriorated due to the noise of the buffer 50 itself; however, the variable capacitive elements AZC3 and AZC4 are provided, whereby the noise can be reduced by capacitance attenuation by the capacitive voltage division.

Sixth Embodiment

A sixth embodiment implements the HDR function by switching between three or more types of gains.

Figure 23:
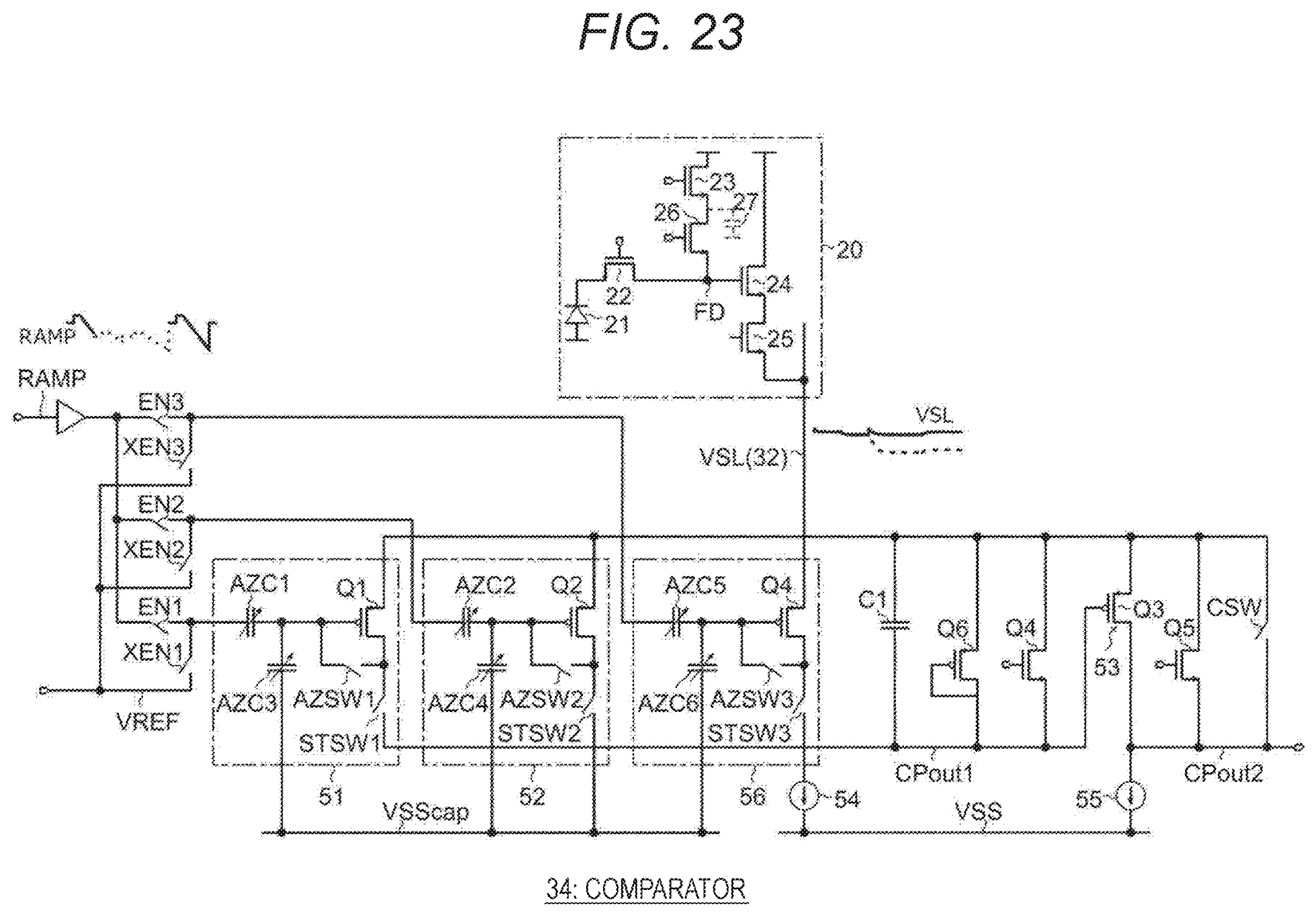

FIG. 23 is a circuit diagram of the comparator 34 in the imaging device 1 according to the sixth embodiment. The comparator 34 of FIG. 23 includes a fourth comparison circuit 56 in addition to the configuration of the comparator 34 of FIG. 11.

The fourth comparison circuit 56 outputs a fifth signal according to a result of comparison between a third input signal and a third reference signal corresponding to a third gain having an amount of gain different from those of the first gain LG and the second gain HG. By providing the fourth comparison circuit 56, it is possible to combine images captured with respective three different types of gains by one exposure.

The third gain may be an intermediate gain between the first gain LG and the second gain HG, may be a gain lower than the first gain LG, or may be a gain higher than the second gain HG.

The fourth comparison circuit 56 includes an input transistor Q5, a capacitive element AZC5, an auto-zero switch AZSW3, and a shut-off switch STSW3. Furthermore, a capacitive element AZC6 may be connected between the gate of the input transistor Q5 and the standard potential VSScap, and the capacitive elements AZC5 and AZC6 may be variable capacitive elements.

The result of comparison by the fourth comparison circuit 56 is input to the third comparison circuit 53 similarly to the results of comparison by the first comparison circuit 51 and the second comparison circuit 52.

As a modification of the comparator 34 of FIG. 23, a comparison circuit may be further provided corresponding to an amount of gain different from those of the first comparison circuit 51, the second comparison circuit 52, and the fourth comparison circuit 56, and the number of comparison circuits having different amounts of gain is not limited.

As described above, in the sixth embodiment, since the results of comparison of the first comparison circuit 51, the second comparison circuit 52, and the fourth comparison circuit 56 corresponding to the first gain to the third gain are input to the third comparison circuit 53, it is possible to perform AD conversion processing of each pixel signal imaged while changing the gain in three ways in one exposure.

Seventh Embodiment

Figure 24:
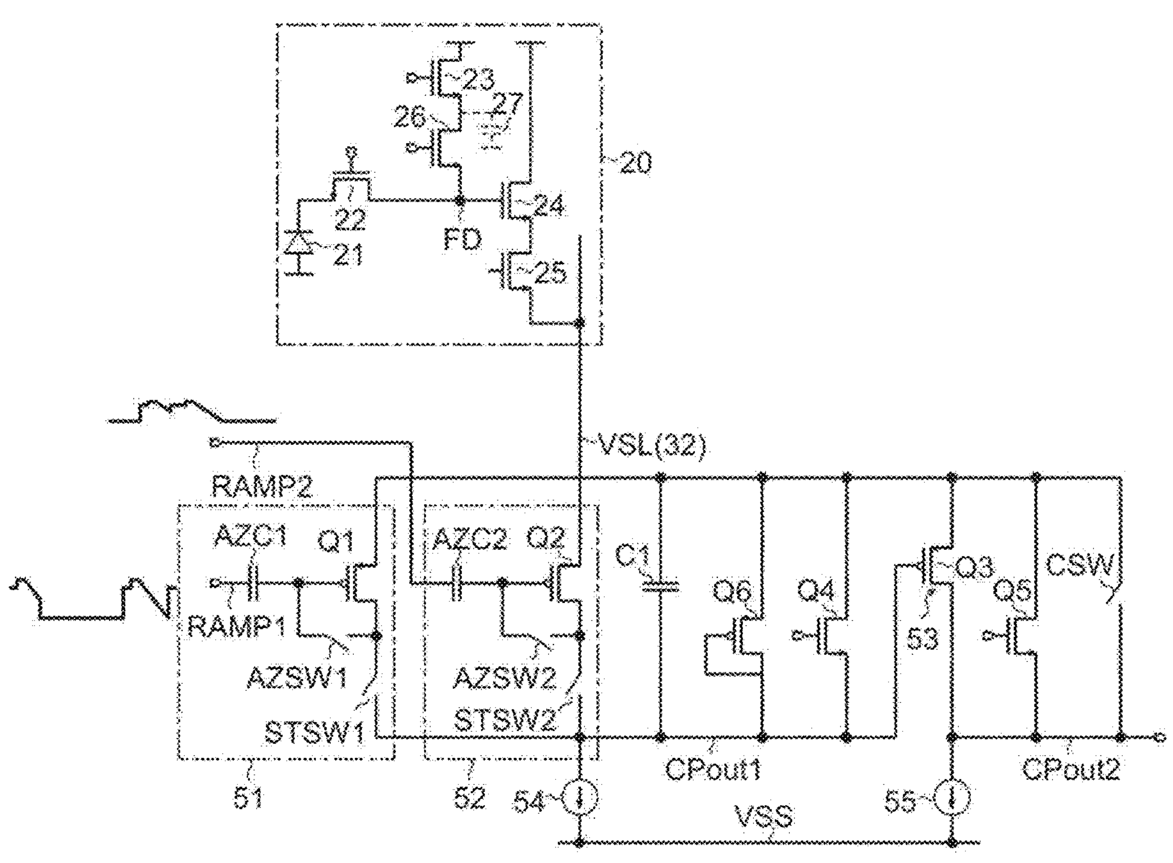
FIG. 24 is a circuit diagram of a comparator in an imaging device according to a seventh embodiment.
Figure 25:
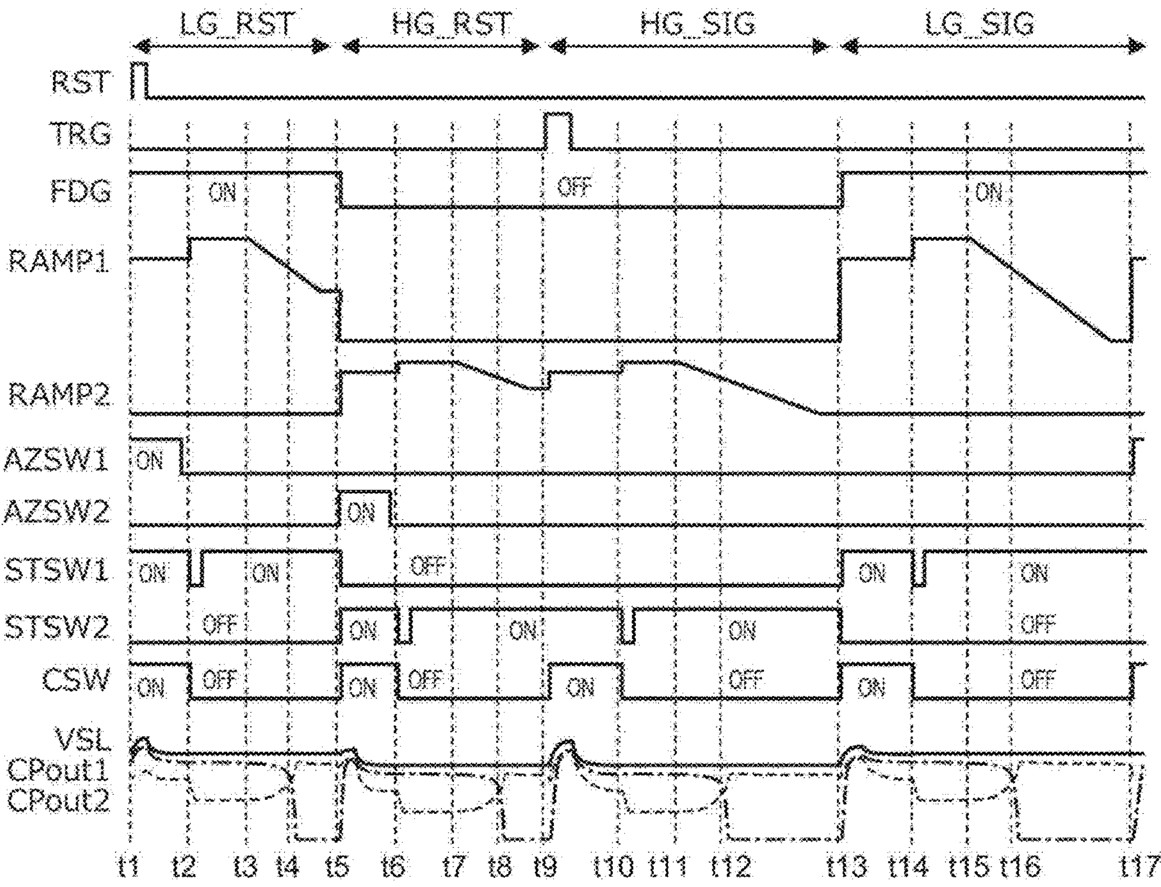
FIG. 25 is a timing diagram of the comparator of FIG. 24.

FIG. 24 is a circuit diagram of the comparator 34 in the imaging device 1 according to a seventh embodiment, and FIG. 25 is a timing diagram of the comparator 34 of FIG. 24.

In comparison with the comparator 34 of FIG. 11, the comparator 34 of FIG. 24 is provided with a first reference signal line RAMP1 input to the first comparison circuit 51 and a second reference signal line RAMP2 input to the second comparison circuit 52. The first reference signal line RAMP is a signal line for inputting the first reference signal to the first comparison circuit 51. The second reference signal line RAMP is a signal line for inputting the second reference signal to the second comparison circuit 52.

As illustrated in FIG. 25, the reference signal generation circuit 16 inputs the first reference signal to the first comparison circuit 51 via the first reference signal line RAMP in a period (from time t1 to time t5) in which the first comparison circuit 51 performs the processing of comparison of the reset level of the first gain LG, and a period (from time t13 to time t17) in which the processing of comparison of the signal level of the first gain LG is performed. Furthermore, the reference signal generation circuit 16 inputs the second reference signal to the second comparison circuit 52 via the second reference signal line RAMP in a period (from time t5 to time t9) in which the second comparison circuit 52 performs the processing of comparison of the reset level of the second gain HG, and a period (from time t9 to time t13) in which the processing of comparison of the signal level of the second gain HG is performed.

The first reference signal line RAMP is set to a fixed potential (for example, ground potential) during a period in which the first reference signal is not transmitted. Similarly, the second reference signal line RAMP is set to a fixed potential (for example, ground potential) during a period in which the second reference signal is not transmitted.

Furthermore, the first comparison circuit 51 of FIG. 24 turns off the shut-off switch STSW1 during a period in which the first reference signal is not input through the first reference signal line RAMP. Similarly, the second comparison circuit 52 turns off the shut-off switch STSW2 during a period in which the second reference signal is not input through the second reference signal line RAMP.

The shut-off switch STSW1 or STSW2 is turned off, whereby the output of the comparator 34 that does not perform the processing of comparison can be fixed, but there is a possibility that the output potential of the comparator 34 varies due to an influence of an unintended parasitic capacitance or the like. Thus, by providing the first reference signal line RAMP and the second reference signal line RAMP and fixing the signal level of the reference signal line RAMP on which the processing of comparison is not performed, it is possible to reliably prevent the variation in the output potential of the comparator 34 that does not perform the processing of comparison.

FIG. 26 is a circuit diagram of the comparator 34 according to a modification of FIG. 24. The comparator 34 of FIG. 26 includes the buffers 50 and the variable capacitive elements AZC3 and AZC4 in addition to the configuration of the comparator 34 of FIG. 24.

The buffers 50 are separately connected respectively to the first reference signal line RAMP and the second reference signal line RAMP. Furthermore, the variable capacitive element AZC1 is connected between the buffer 50 of the first comparison circuit 51 and the gate of the input transistor Q1, and the variable capacitive element AZC3 is connected between the gate of the input transistor Q1 and the standard potential VSScap. Similarly, the variable capacitive element AZC2 is connected between the buffer 50 of the second comparison circuit 52 and the gate of the input transistor Q2, and the variable capacitive element AZC4 is connected between the gate of the input transistor Q2 and the standard potential VSScap.

By capacitive voltage division of the variable capacitive element AZC1, it is possible to reduce noise of the first reference signal and the second reference signal input to the gates of the input transistors Q1 and Q2.

Note that the buffers 50 may be added to the comparator 34 of FIG. 24 without adding the variable capacitive elements AZC3 and AZC4 of FIG. 26. Alternatively, the variable capacitive elements AZC3 and AZC4 may be added to the comparator 34 of FIG. 24 without adding the buffers 50 of FIG. 26.

Figure 27:
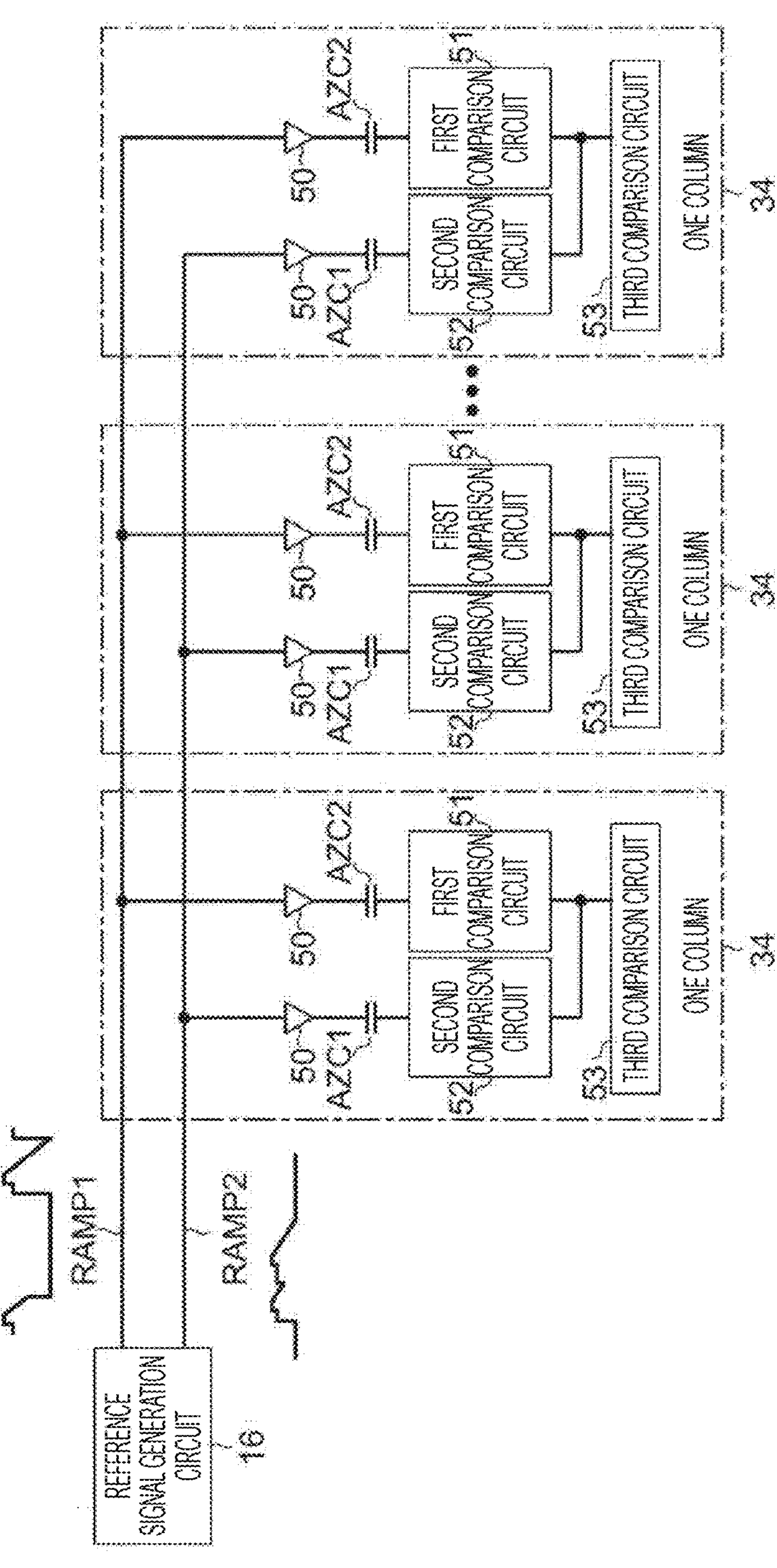
FIG. 27 is a diagram illustrating an example in which the comparator of FIG. 24 or 26 is disposed for each column.

FIG. 27 is a diagram illustrating an example in which the comparator 34 of FIG. 24 or 26 is disposed for each column. In FIG. 27, the first reference signal line RAMP1 and the second reference signal line RAMP2 are shared by all columns, and the buffer 50 for the first comparison circuit 51 and the buffer 50 for the second comparison circuit 52 are provided for each column.

As described above, in the seventh embodiment, the first reference signal line RAMP1 for the first comparison circuit 51 and the second reference signal line RAMP2 for the second comparison circuit 52 are provided, the first reference signal is transmitted through the first reference signal line RAMP1 in accordance with a timing at which the processing of comparison is performed by the first comparison circuit 51, and the second reference signal is transmitted through the second reference signal line RAMP2 in accordance with a timing at which the processing of comparison is performed by the second comparison circuit 52. The first reference signal line RAMP1 is set to a fixed potential during a period in which the processing of comparison is not performed by the first comparison circuit 51, and the second reference signal line RAMP2 is set to a fixed potential during a period in which the processing of comparison is not performed by the second comparison circuit 52. As a result, there is no possibility that the output node of the first comparison circuit 51 and the output node of the second comparison circuit 52 unintentionally vary during a period in which the comparison operation is not performed.

Eighth Embodiment

The comparator 34 in the imaging device 1 according to an eighth embodiment relates to layout arrangement of the comparator 34 according to the first to seventh embodiments.

Figure 28A:
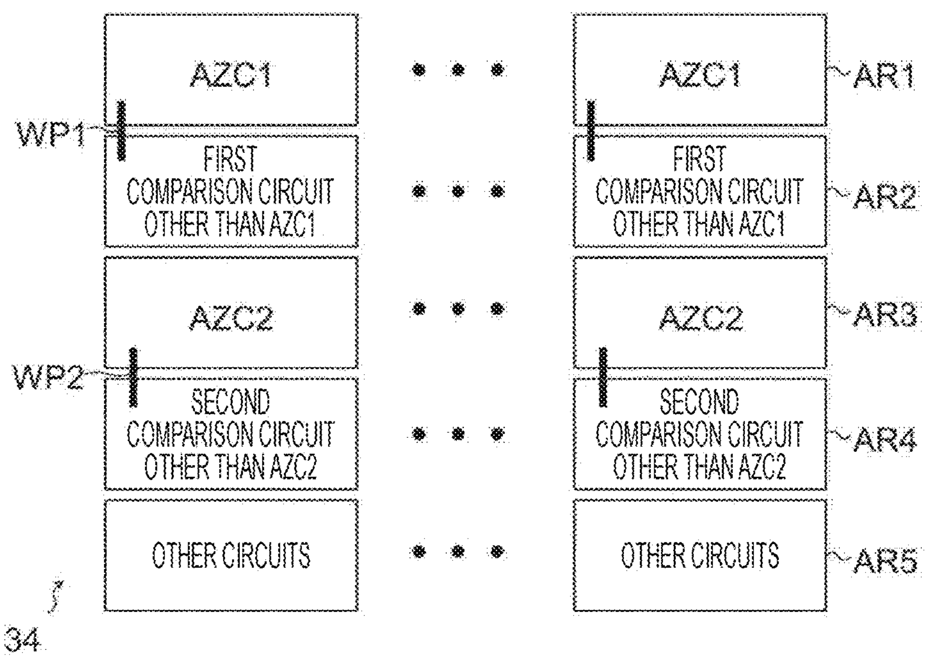
FIG. 28A is a schematic layout diagram of a comparator according to an eighth embodiment.
Figure 28B:
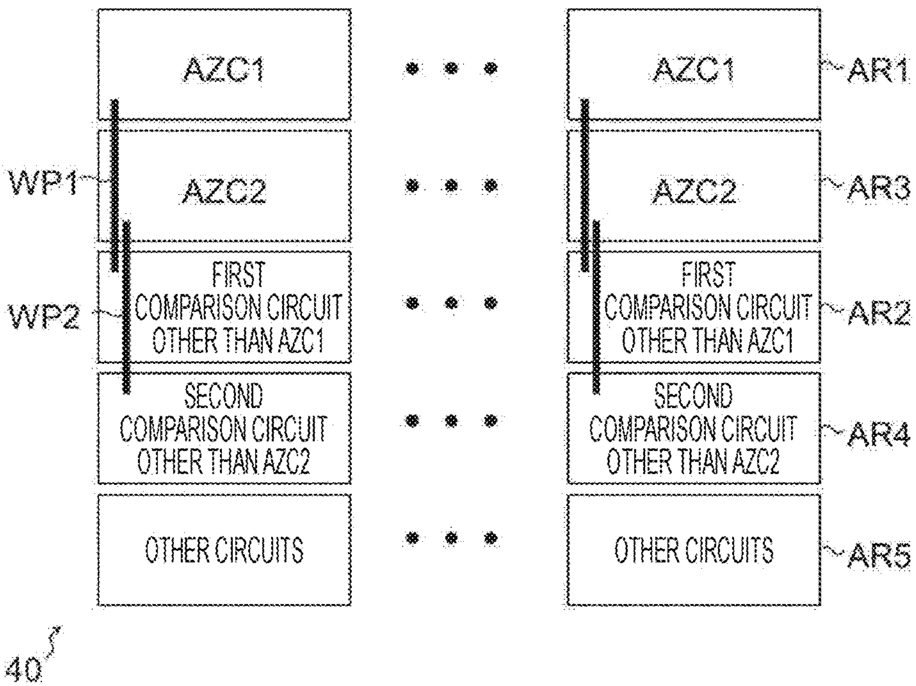
FIG. 28B is a schematic layout diagram of a comparator according to a comparative example.

FIG. 28A is a schematic layout diagram of the comparator 34 according to the eighth embodiment, and FIG. 28B is a schematic layout diagram of a comparator 40 according to a comparative example. FIG. 28A illustrates a schematic layout of the comparator 34 according to any of the first to seventh embodiments.

The comparator 34 of FIG. 28A roughly includes an arrangement region AR1 for the capacitive element AZC1 in the first comparison circuit 51, an arrangement region AR2 for the first comparison circuit 51 other than the capacitive element AZC1, an arrangement region AR3 for the capacitive element AZC2 in the second comparison circuit 52, an arrangement region AR4 for the second comparison circuit 52 other than the capacitive element AZC2, and an arrangement region AR5 for other circuits.

Note that the arrangement regions AR1 to AR5 in FIG. 28A are arranged by the number of pixels in the horizontal direction and the vertical direction of the pixel array section 11. Furthermore, in a case where the CMOS image sensor 1 is a flat type as illustrated in FIG. 3A, the pixel array section 11 is disposed above the arrangement region AR1 in FIG. 28A, and the counter 35 is disposed below the arrangement region AR5. Furthermore, in a case of the stacked type as illustrated in FIG. 3B, a connection portion to the semiconductor chip 44 is disposed above the arrangement region AR1 in FIG. 28A, and the counter 35 is disposed below the arrangement region AR5.

These arrangement regions AR1 to AR5 are connected to each other by wiring patterns. A wiring pattern WP1 connecting the arrangement regions AR1 and AR2 to each other, and a wiring pattern WP2 connecting the wiring regions AR3 and AR4 to each other are desirably made as short as possible.

For example, when the wiring pattern WP1 between the arrangement regions AR1 and AR2 becomes long, a parasitic capacitance of the gate of the input transistor Q1 in the first comparison circuit 51 increases, and the signal level of the first reference signal may be attenuated. When the signal level of the first reference signal is attenuated, a dynamic range of the analog-digital converter is narrowed. In order to suppress attenuation of the signal level of the first reference signal, it is conceivable to increase a size of the capacitive element AZC1, but when the size of the capacitive element AZC1 increases, downsizing becomes difficult.

Furthermore, the wiring pattern WP1 between the wiring regions AR1 and AR2 is easily affected by interference from an adjacent circuit, and crosstalk performance is likely to deteriorate when the wiring pattern WP1 becomes long.

In the comparative example of FIG. 28B, the capacitive elements AZC1 and AZC2 are arranged adjacent to each other, the switches and the transistors are arranged adjacent to each other, and specifically, the arrangement regions AR1, AR3, AR2, AR4, and AR5 are arranged in this order. In a case of FIG. 28B, the wiring pattern WP1 between the arrangement regions AR1 and AR2 is longer than that of FIG. 28A, and the wiring pattern WP2 between the arrangement regions AR3 and AR4 is also longer than that of FIG. 28A. Thus, the layout of FIG. 28B is more easily affected by interference from the adjacent circuit than the layout of FIG. 28A, and the crosstalk performance is likely to deteriorate.

As described above, when the circuit elements in the comparator 34 are arranged in a layout, it is desirable to arrange the circuit elements such that a length of a wiring pattern of a portion adversely affecting the performance is as short as possible.

<Application Example to Mobile Body>

The technology according to the present disclosure (the present technology) can be applied to various products. For example, the technology of the present disclosure may be implemented as a device to be mounted on a mobile body of any type, such as an automobile, an electric vehicle, a hybrid electric vehicle, a motorcycle, a bicycle, a personal mobility, an airplane, a drone, a ship, or a robot.

FIG. 29 is a block diagram illustrating an example of a schematic configuration of a vehicle control system as an example of a mobile body control system to which the technology according to the present disclosure can be applied.

The vehicle control system 12000 includes a plurality of electronic control units connected to each other via a communication network 12001. In the example illustrated in FIG. 29, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 29, an audio speaker 12061, a display section 12062, and an instrument panel 12063 are illustrated as output devices. The display section 12062 may, for example, include at least one of an on-board display and a head-up display.

Figure 30:
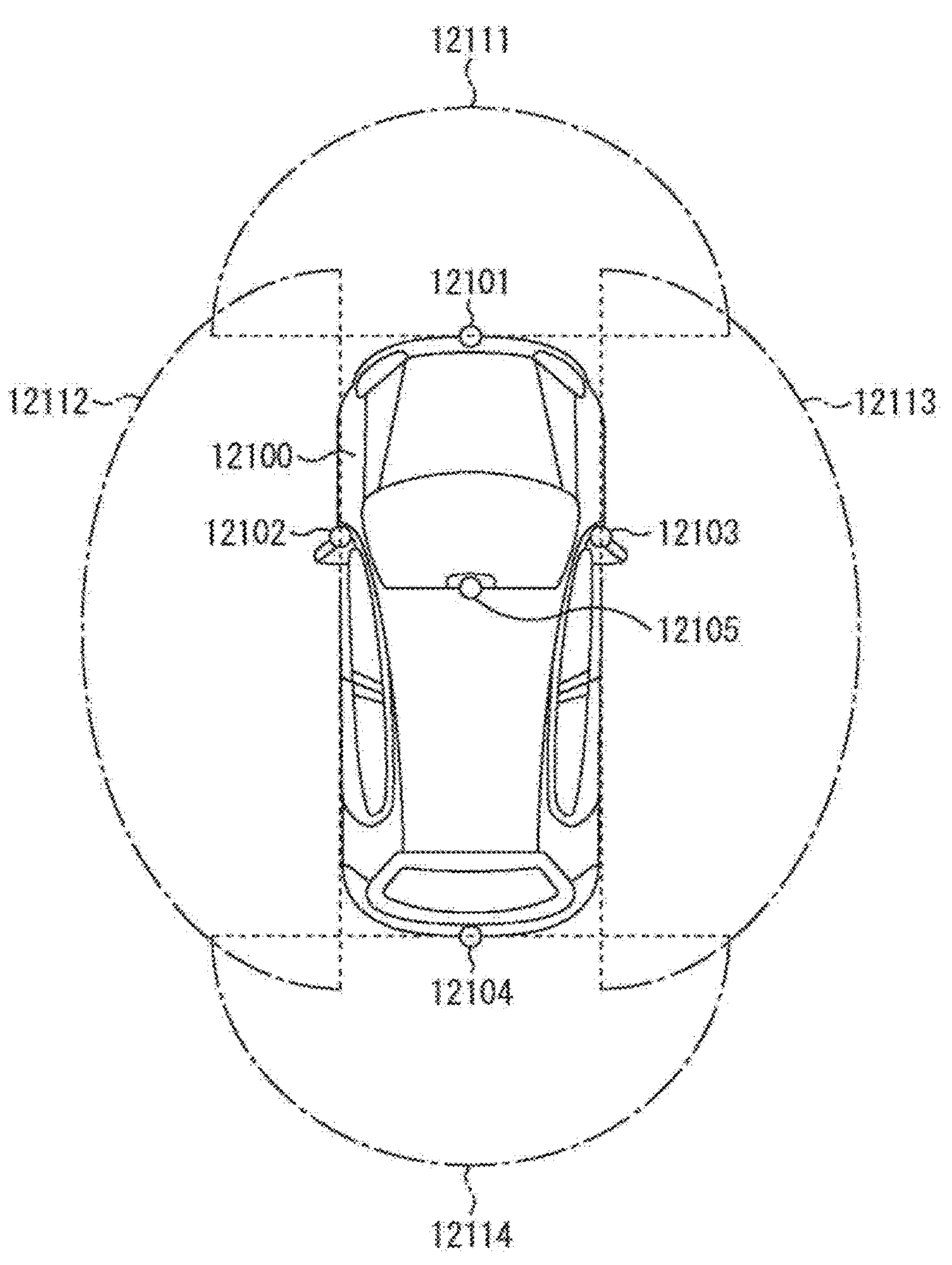
FIG. 30 is an explanatory diagram illustrating an example of installation positions of an outside-vehicle information detecting section and an imaging section.

FIG. 30 is a diagram illustrating an example of an installation position of the imaging section 12031.

In FIG. 30, imaging sections 12101, 12102, 12103, 12104, and 12105 are included as the imaging section 12031.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Note that, FIG. 30 illustrates an example of imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

In the above, an example has been described of the vehicle control system to which the technology according to the present disclosure can be applied. The technology according to the present disclosure can be applied to the imaging section 12031 and the like in the configuration described above. Specifically, the imaging device 1 of the present disclosure can be applied to the imaging section 12031. By applying the technology according to the present disclosure to the imaging section 12031, a clearer captured image can be obtained, so that driver's fatigue can be reduced.

Note that the present technology can have the following configurations.

(1) An imaging device including:

a first comparison circuit that outputs a first signal according to a result of comparison between signal levels of a first input signal and a first reference signal corresponding to a first gain;

a second comparison circuit that outputs a second signal according to a result of comparison between a second input signal and a second reference signal corresponding to a second gain having an amount of gain different from that of the first gain; and a third comparison circuit that outputs a third signal according to a result of comparison between signal levels of the first signal and the first input signal, and a fourth signal according to a result of comparison between the second signal and the second input signal, at timings different from each other.

(2) The imaging device according to (1), in which the first reference signal includes a signal period in which the signal level changes with a first slope according to a lapse of time, the second reference signal includes a signal period in which a signal level changes with a second slope different from the first slope according to a lapse of time, the first comparison circuit causes the signal level of the first signal to transition when the signal levels of the first reference signal and the first input signal coincide with each other, and the second comparison circuit causes a signal level of the second signal to transition when signal levels of the second reference signal and the second input signal coincide with each other.

(3) The imaging device according to (2), in which the first reference signal includes a first signal period in which the signal level changes with the first slope corresponding to a reset level and a second signal period in which the signal level changes with the first slope corresponding to the signal level, and the second reference signal includes a third signal period in which the signal level changes with the second slope corresponding to a reset level, and a fourth signal period in which the signal level changes with the second slope corresponding to the signal level.

(4) The imaging device according to (2) or (3), in which the second gain has the amount of gain larger than that of the first gain, and the first reference signal has an amount of signal change per unit time larger than that of the second reference signal.

(5) The imaging device according to (3) or (4), in which the first comparison circuit outputs the first signal according to a result of comparison between the first input signal and the first reference signal corresponding to the reset level, and the first signal according to a result of comparison between the first input signal and the first reference signal corresponding to the signal level, at respective different timings, and the second comparison circuit outputs the second signal according to a result of comparison between the second input signal and the second reference signal corresponding to the reset level, and the second signal according to a result of comparison between the second input signal and the second reference signal corresponding to the signal level, at respective different timings.

(6) The imaging device according to any one of (1) to (5), further including a reference signal generation circuit that generates the first reference signal and the second reference signal, in which the first signal output from the first comparison circuit and the second signal output from the second comparison circuit are input to the third comparison circuit via a common signal line.

(7) The imaging device according to (6), in which the reference signal generation circuit outputs the first reference signal for the reset level, the second reference signal for the reset level, the second reference signal for the signal level, and the first reference signal for the signal level in this order.

(8) The imaging device according to (6), in which the reference signal generation circuit outputs the second reference signal for the reset level, the first reference signal for the reset level, the first reference signal for the signal level, and the second reference signal for the signal level in this order.

(9) The imaging device according to any one of (6) to (8), in which the first comparison circuit performs processing of comparison with the first input signal and outputs the first signal during a period in which the reference signal generation circuit outputs the first reference signal, and stops outputting the first signal during a period in which the reference signal generation circuit outputs the second reference signal, and the second comparison circuit performs processing of comparison with the second input signal and outputs the second signal during a period in which the reference signal generation circuit outputs the second reference signal, and stops outputting the second signal during a period in which the reference signal generation circuit outputs the first reference signal.

(10) The imaging device according to any one of (1) to (9), in which the first comparison circuit includes:

a first transistor including a source to which the first input signal is supplied and a gate to which a voltage according to the first reference signal is supplied;

a first capacitor that is connected to the gate of the first transistor and holds a charge according to an initial voltage of the first reference signal;

a first switch that switches whether or not to short-circuit the gate and a drain of the first transistor; and a second switch that switches whether or not to supply a drain voltage of the first transistor to the third comparison circuit, and the second comparison circuit includes:

a second transistor including a source to which the second input signal is supplied and a gate to which a voltage according to the second reference signal is supplied;

a second capacitor that is connected to the gate of the second transistor and holds a charge according to an initial voltage of the second reference signal;

a third switch that switches whether or not to short-circuit the gate and a drain of the second transistor; and a fourth switch that switches whether or not to supply a drain voltage of the second transistor to the third comparison circuit.

(11) The imaging device according to (10), in which the second switch supplies the drain voltage of the first transistor to the third comparison circuit during a period in which the first reference signal and the first input signal are input to the first comparison circuit, and shuts off a connection path between the drain of the first transistor and the third comparison circuit during a period in which the second reference signal and the second input signal are input to the second comparison circuit, and the fourth switch supplies the drain voltage of the second transistor to the third comparison circuit during a period in which the second reference signal and the second input signal are input to the second comparison circuit, and shuts off a connection path between the drain of the second transistor and the third comparison circuit during a period in which the first reference signal and the first input signal are input to the first comparison circuit.

(12) The imaging device according to (10) or (11), in which the first comparison circuit includes:

a fifth switch that switches whether or not to supply the first reference signal to one end of the first capacitor; and a sixth switch that switches whether or not to supply a standard voltage of a predetermined voltage level to the one end of the first capacitor, the second comparison circuit includes:

a seventh switch that switches whether or not to supply the second reference signal to one end of the second capacitor; and an eighth switch that switches whether or not to supply the standard voltage to the one end of the second capacitor, during a period in which the first comparison circuit performs processing of comparison between the signal levels of the first reference signal and the first input signal, the fifth switch supplies the first reference signal to the one end of the first capacitor, the sixth switch does not supply the standard voltage to the one end of the first capacitor, the seventh switch does not supply the second reference signal to the one end of the second capacitor, and the eighth switch supplies the standard voltage to the one end of the second capacitor, and during a period in which the second comparison circuit performs processing of comparison between the signal levels of the second reference signal and the second input signal, the fifth switch does not supply the first reference signal to the one end of the first capacitor, the sixth switch supplies the standard voltage to the one end of the first capacitor, the seventh switch supplies the second reference signal to the one end of the second capacitor, and the eighth switch does not supply the standard voltage to the one end of the second capacitor.

(13) The imaging device according to any one of (10) to (12), in which the first comparison circuit includes a third capacitor connected between a connection node between the first capacitor and the gate of the first transistor and a standard voltage node, the second comparison circuit includes a fourth capacitor connected between a connection node between the second capacitor and the gate of the second transistor and the standard voltage node, and capacitances of the first capacitor, the second capacitor, the third capacitor, and the fourth capacitor are able to be variable.

(14) The imaging device according to any one of (10) to (13), in which the first comparison circuit includes a first buffer that buffers the first reference signal and supplies the first reference signal to the one end of the first capacitor, and the second comparison circuit includes a second buffer that buffers the second reference signal and supplies the second reference signal to the one end of the second capacitor.

(15) The imaging device according to any one of (10) to (14), further including one reference signal line that transmits the first reference signal and the second reference signal at respective different timings, and the reference signal line is connected to the one end of the first capacitor and the one end of the second capacitor.

(16) The imaging device according to any one of (10) to (14), further including: a first reference signal line that supplies the first reference signal to the one end of the first capacitor; and a second reference signal line that supplies the second reference signal to the one end of the second capacitor.

(17) The imaging device according to any one of (1) to (16), further including a fourth comparison circuit that outputs a fifth signal according to a result of comparison between a third input signal and a third reference signal corresponding to a third gain having an amount of gain different from those of the first gain and the second gain, in which the third comparison circuit outputs the third signal according to the result of comparison between the signal levels of the first signal and the first input signal, the fourth signal according to the result of comparison between the second signal and the second input signal, and a sixth signal according to a result of comparison between the fifth signal and the third input signal, at respective different timings.

(18) The imaging device according to any one of (1) to (17), further including:

a plurality of pixels that is arranged in a first direction and a second direction and each includes a pixel circuit that performs photoelectric conversion; and an analog-digital converter that converts an input signal based on a signal photoelectrically converted by two or more of the pixels arranged in the first direction into a digital signal, in which the analog-digital converter includes the first comparison circuit, the second comparison circuit, and the third comparison circuit for each of the two or more of the pixels arranged in the first direction.

(19) The imaging device according to (18), in which the pixel circuit includes a conversion efficiency switching circuit that switches photoelectric conversion efficiencies in synchronization with processing of comparison by the first comparison circuit and the second comparison circuit, and the conversion efficiency switching circuit makes a photoelectric conversion efficiency during a period in which the second comparison circuit performs processing of comparison higher than a photoelectric conversion efficiency during a period in which the first comparison circuit performs processing of comparison.

(20) The imaging device according to (18), in which a first region in which a first capacitor that holds a charge according to an initial voltage of the first reference signal in the first comparison circuit is disposed, a second region in which a circuit element other than the first capacitor in the first comparison circuit is disposed, a third region in which a second capacitor that holds a charge according to an initial voltage of the second reference signal in the second comparison circuit is disposed, a fourth region in which a circuit element other than the second capacitor in the second comparison circuit is disposed, and a fifth region in which the third comparison circuit is disposed, are arranged for each pixel in the second direction, the first region and the second region are arranged adjacent to each other along the first direction, and the third region and the fourth region are arranged adjacent to each other along the first direction.

Aspects of the present disclosure are not limited to the individual embodiments described above, but include various modifications that can be devised by those skilled in the art, and the effects of the present disclosure are not limited to the matters described above. That is, various additions, modifications, and partial deletions are possible without departing from the conceptual idea and spirit of the present disclosure derived from the matters defined in the claims and equivalents thereof.

REFERENCE SIGNS LIST

1 Imaging device
11 Pixel array section
12 Row selection section
13 Analog-digital conversion section
14 Logic circuit section
15 Timing control section
16 Reference signal generation circuit
20 Pixel (pixel circuit)
21 Photodiode
22 Transfer transistor
23 Reset transistor
24 Amplification transistor
25 Selection transistor
26 Conversion efficiency switching transistor
27 Charge accumulation section
31 Pixel control line
31*m* Pixel control line
32 Signal line (VSL)
32*n* Signal line (VSL)
33 Analog-digital converter
34 Comparator
35 Counter
40 Comparator
41 Semiconductor substrate
42 Pad
43 Semiconductor chip
44 Semiconductor chip
45 Bonding portion
46 Bonding portion
50 Buffer
51 First comparison circuit
52 Second comparison circuit
53 Third comparison circuit
54 First current source
55 Second current source
56 Fourth comparison circuit
311 Pixel control line
321 Signal line (VSL)

The invention claimed is:

1. An imaging device comprising:

a first comparison circuit that outputs a first signal according to a result of comparison between signal levels of a first input signal and a first reference signal corresponding to a first gain;

a second comparison circuit that outputs a second signal according to a result of comparison between a second input signal and a second reference signal corresponding to a second gain having an amount of gain different from that of the first gain; and a third comparison circuit that outputs a third signal according to a result of comparison between signal levels of the first signal and the first input signal, and a fourth signal according to a result of comparison between the second signal and the second input signal, at timings different from each other.

2. The imaging device according to claim 1, wherein the first reference signal includes a signal period in which the signal level changes with a first slope according to a lapse of time, the second reference signal includes a signal period in which a signal level changes with a second slope different from the first slope according to a lapse of time, the first comparison circuit causes the signal level of the first signal to transition when the signal levels of the first reference signal and the first input signal coincide with each other, and the second comparison circuit causes a signal level of the second signal to transition when signal levels of the second reference signal and the second input signal coincide with each other.

3. The imaging device according to claim 2, wherein the first reference signal includes a first signal period in which the signal level changes with the first slope corresponding to a reset level and a second signal period in which the signal level changes with the first slope corresponding to the signal level, and the second reference signal includes a third signal period in which the signal level changes with the second slope corresponding to a reset level, and a fourth signal period in which the signal level changes with the second slope corresponding to the signal level.

4. The imaging device according to claim 2, wherein the second gain has the amount of gain larger than that of the first gain, and the first reference signal has an amount of signal change per unit time larger than that of the second reference signal.

5. The imaging device according to claim 3, wherein the first comparison circuit outputs the first signal according to a result of comparison between the first input signal and the first reference signal corresponding to the reset level, and the first signal according to a result of comparison between the first input signal and the first reference signal corresponding to the signal level, at respective different timings, and the second comparison circuit outputs the second signal according to a result of comparison between the second input signal and the second reference signal corresponding to the reset level, and the second signal according to a result of comparison between the second input signal and the second reference signal corresponding to the signal level, at respective different timings.

6. The imaging device according to claim 1, further comprising a reference signal generation circuit that generates the first reference signal and the second reference signal, wherein the first signal output from the first comparison circuit and the second signal output from the second comparison circuit are input to the third comparison circuit via a common signal line.

7. The imaging device according to claim 6, wherein the reference signal generation circuit outputs the first reference signal for the reset level, the second reference signal for the reset level, the second reference signal for the signal level, and the first reference signal for the signal level in this order.

8. The imaging device according to claim 6, wherein the reference signal generation circuit outputs the second reference signal for the reset level, the first reference signal for the reset level, the first reference signal for the signal level, and the second reference signal for the signal level in this order.

9. The imaging device according to claim 6, wherein the first comparison circuit performs processing of comparison with the first input signal and outputs the first signal during a period in which the reference signal generation circuit outputs the first reference signal, and stops outputting the first signal during a period in which the reference signal generation circuit outputs the second reference signal, and the second comparison circuit performs processing of comparison with the second input signal and outputs the second signal during a period in which the reference signal generation circuit outputs the second reference signal, and stops outputting the second signal during a period in which the reference signal generation circuit outputs the first reference signal.

10. The imaging device according to claim 1, wherein the first comparison circuit includes:

a first transistor including a source to which the first input signal is supplied and a gate to which a voltage according to the first reference signal is supplied;

a first capacitor that is connected to the gate of the first transistor and holds a charge according to an initial voltage of the first reference signal;

a first switch that switches whether or not to short-circuit the gate and a drain of the first transistor; and a second switch that switches whether or not to supply a drain voltage of the first transistor to the third comparison circuit, and the second comparison circuit includes:

a second transistor including a source to which the second input signal is supplied and a gate to which a voltage according to the second reference signal is supplied;

a second capacitor that is connected to the gate of the second transistor and holds a charge according to an initial voltage of the second reference signal;

a third switch that switches whether or not to short-circuit the gate and a drain of the second transistor; and a fourth switch that switches whether or not to supply a drain voltage of the second transistor to the third comparison circuit.

11. The imaging device according to claim 10, wherein the second switch supplies the drain voltage of the first transistor to the third comparison circuit during a period in which the first reference signal and the first input signal are input to the first comparison circuit, and shuts off a connection path between the drain of the first transistor and the third comparison circuit during a period in which the second reference signal and the second input signal are input to the second comparison circuit, and the fourth switch supplies the drain voltage of the second transistor to the third comparison circuit during a period in which the second reference signal and the second input signal are input to the second comparison circuit, and shuts off a connection path between the drain of the second transistor and the third comparison circuit during a period in which the first reference signal and the first input signal are input to the first comparison circuit.

12. The imaging device according to claim 10, wherein the first comparison circuit includes:

a fifth switch that switches whether or not to supply the first reference signal to one end of the first capacitor; and a sixth switch that switches whether or not to supply a standard voltage of a predetermined voltage level to the one end of the first capacitor, the second comparison circuit includes:

a seventh switch that switches whether or not to supply the second reference signal to one end of the second capacitor; and an eighth switch that switches whether or not to supply the standard voltage to the one end of the second capacitor, during a period in which the first comparison circuit performs processing of comparison between the signal levels of the first reference signal and the first input signal, the fifth switch supplies the first reference signal to the one end of the first capacitor, the sixth switch does not supply the standard voltage to the one end of the first capacitor, the seventh switch does not supply the second reference signal to the one end of the second capacitor, and the eighth switch supplies the standard voltage to the one end of the second capacitor, and during a period in which the second comparison circuit performs processing of comparison between the signal levels of the second reference signal and the second input signal, the fifth switch does not supply the first reference signal to the one end of the first capacitor, the sixth switch supplies the standard voltage to the one end of the first capacitor, the seventh switch supplies the second reference signal to the one end of the second capacitor, and the eighth switch does not supply the standard voltage to the one end of the second capacitor.

13. The imaging device according to claim 10, wherein the first comparison circuit includes a third capacitor connected between a connection node between the first capacitor and the gate of the first transistor and a standard voltage node, the second comparison circuit includes a fourth capacitor connected between a connection node between the second capacitor and the gate of the second transistor and the standard voltage node, and capacitances of the first capacitor, the second capacitor, the third capacitor, and the fourth capacitor are able to be variable.

14. The imaging device according to claim 10, wherein the first comparison circuit includes a first buffer that buffers the first reference signal and supplies the first reference signal to the one end of the first capacitor, and the second comparison circuit includes a second buffer that buffers the second reference signal and supplies the second reference signal to the one end of the second capacitor.

15. The imaging device according to claim 10, further comprising one reference signal line that transmits the first reference signal and the second reference signal at respective different timings, and the reference signal line is connected to the one end of the first capacitor and the one end of the second capacitor.

16. The imaging device according to claim 10, further comprising:

a first reference signal line that supplies the first reference signal to the one end of the first capacitor; and a second reference signal line that supplies the second reference signal to the one end of the second capacitor.

17. The imaging device according to claim 1, further comprising a fourth comparison circuit that outputs a fifth signal according to a result of comparison between a third input signal and a third reference signal corresponding to a third gain having an amount of gain different from those of the first gain and the second gain, wherein the third comparison circuit outputs the third signal according to the result of comparison between the signal levels of the first signal and the first input signal, the fourth signal according to the result of comparison between the second signal and the second input signal, and a sixth signal according to a result of comparison between the fifth signal and the third input signal, at respective different timings.

18. The imaging device according to claim 1, further comprising:

a plurality of pixels that is arranged in a first direction and a second direction and each includes a pixel circuit that performs photoelectric conversion; and an analog-digital converter that converts an input signal based on a signal photoelectrically converted by two or more of the pixels arranged in the first direction into a digital signal, wherein the analog-digital converter includes the first comparison circuit, the second comparison circuit, and the third comparison circuit for each of the two or more of the pixels arranged in the first direction.

19. The imaging device according to claim 18, wherein the pixel circuit includes a conversion efficiency switching circuit that switches photoelectric conversion efficiencies in synchronization with processing of comparison by the first comparison circuit and the second comparison circuit, and the conversion efficiency switching circuit makes a photoelectric conversion efficiency during a period in which the second comparison circuit performs processing of comparison higher than a photoelectric conversion efficiency during a period in which the first comparison circuit performs processing of comparison.

20. The imaging device according to claim 18, wherein a first region in which a first capacitor that holds a charge according to an initial voltage of the first reference signal in the first comparison circuit is disposed, a second region in which a circuit element other than the first capacitor in the first comparison circuit is disposed, a third region in which a second capacitor that holds a charge according to an initial voltage of the second reference signal in the second comparison circuit is disposed, a fourth region in which a circuit element other than the second capacitor in the second comparison circuit is disposed, and a fifth region in which the third comparison circuit is disposed, are arranged for each pixel in the second direction, the first region and the second region are arranged adjacent to each other along the first direction, and the third region and the fourth region are arranged adjacent to each other along the first direction.

* * * * *